United States Patent
Maeda et al.

(10) Patent No.: US 7,466,478 B2
(45) Date of Patent: Dec. 16, 2008

(54) OPTICAL-LEVEL CONTROL METHOD, OPTICAL-LEVEL CONTROL APPARATUS AND WAVELENGTH-MULTIPLEXING OPTICAL NETWORK

(75) Inventors: Takuji Maeda, Kawasaki (JP); Haruki Tanaka, Yokohama (JP); Hisayuki Ojima, Yokohama (JP); Hiroaki Tomofuji, Kawasaki (JP); Hideaki Sugiya, Kawasaki (JP); Koji Batou, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/079,426

(22) Filed: Mar. 15, 2005

(65) Prior Publication Data

US 2005/0168806 A1 Aug. 4, 2005

Related U.S. Application Data

(63) Continuation of application No. PCT/JP03/05575, filed on May 1, 2003.

(30) Foreign Application Priority Data

Dec. 19, 2002 (JP) .............................. 2002-368508

(51) Int. Cl.
H04B 10/17 (2006.01)
(52) U.S. Cl. .................................................. 359/341.4
(58) Field of Classification Search ................. None
See application file for complete search history.

(56) References Cited

U.S. PATENT DOCUMENTS

| 5,600,474 | A | * | 2/1997 | Tomesen et al. ............ 398/205 |
| 5,661,585 | A | * | 8/1997 | Feldman et al. ............... 398/63 |
| 5,841,557 | A | * | 11/1998 | Otsuka et al. ................. 398/65 |
| 6,031,659 | A | * | 2/2000 | Okiyama ................ 359/341.42 |
| 6,038,063 | A | | 3/2000 | Tsuda et al. ............ 359/341.41 |
| 6,094,296 | A | * | 7/2000 | Kosaka ................... 359/341.41 |

(Continued)

FOREIGN PATENT DOCUMENTS

JP 9-247093 9/1997

(Continued)

*Primary Examiner*—Jack W Keith
*Assistant Examiner*—Ari M Diacou
(74) *Attorney, Agent, or Firm*—Staas & Halsey LLP

(57) ABSTRACT

An optical-level control apparatus includes a plurality of variable optical attenuators each used for attenuating an input optical signal included in a wavelength division multiplexing signal as a component having a specific wavelength by applying a variable attenuation quantity, a plurality of control units each used for executing automatic control for automatically controlling the attenuation quantity in order to adjust the optical level of an optical signal output by a corresponding one of the variable optical attenuators to a target level in an ordinary normal state of the input optical signal, and a detection unit for detecting a loss of light failure of an optical signal input to each of the variable optical attenuators and detecting disappearance of the loss of light failure. When the detection unit detects the loss of light failure, a corresponding one of the control units executes first attenuation quantity locking control to adjust the attenuation quantity to a first predetermined value and as the detection unit detects the disappearance of the loss of light, the corresponding control unit executes second attenuation quantity locking control to adjust the attenuation quantity to a second predetermined value.

5 Claims, 71 Drawing Sheets

U.S. PATENT DOCUMENTS

| | | | |
|---|---|---|---|
| 6,236,500 B1* | 5/2001 | Suzuki et al. | 359/337.5 |
| 6,310,716 B1* | 10/2001 | Evans et al. | 359/334 |
| 6,347,008 B1* | 2/2002 | Vodhanel | 359/337.4 |
| 6,639,716 B1* | 10/2003 | Tomofuji | 359/337.12 |
| 6,760,532 B1* | 7/2004 | Livas et al. | 385/140 |
| 6,917,467 B2* | 7/2005 | Howell et al. | 359/337.13 |
| 7,202,996 B2* | 4/2007 | Popov et al. | 359/337.11 |
| 7,202,997 B2* | 4/2007 | Iizuka et al. | 359/341.41 |
| 2001/0050804 A1* | 12/2001 | Chung et al. | 359/341.2 |
| 2001/0050805 A1* | 12/2001 | Ohshima et al. | 359/341.3 |
| 2002/0024723 A1* | 2/2002 | Sekiya et al. | 359/337.1 |
| 2002/0027703 A1* | 3/2002 | Kinoshita et al. | 359/337.1 |
| 2002/0039226 A1* | 4/2002 | Murakami et al. | 359/337 |
| 2002/0075562 A1* | 6/2002 | Youn et al. | 359/341.41 |
| 2003/0189751 A1* | 10/2003 | Inagaki et al. | 359/337.4 |
| 2003/0223728 A1* | 12/2003 | Maeda et al. | 385/140 |
| 2003/0231379 A1* | 12/2003 | Komaki et al. | 359/337.4 |
| 2004/0027651 A1* | 2/2004 | Balland et al. | 359/341.41 |
| 2004/0036958 A1* | 2/2004 | Sugaya et al. | 359/341.3 |
| 2004/0042063 A1* | 3/2004 | Ohtani et al. | 359/341.3 |
| 2005/0047781 A1* | 3/2005 | El-Reedy et al. | 398/37 |

FOREIGN PATENT DOCUMENTS

| | | |
|---|---|---|
| JP | 10-051057 | 2/1998 |
| JP | 11-112435 | 4/1999 |
| JP | 11-121848 | 4/1999 |
| JP | 11-261490 | 9/1999 |
| JP | 2000-312185 | 11/2000 |
| JP | 2002-198912 | 7/2002 |
| JP | 2002-271269 | 9/2002 |

* cited by examiner

OPTICAL-LEVEL CONTROL METHOD, OPTICAL-LEVEL CONTROL APPARATUS AND WAVELENGTH-MULTIPLEXING OPTICAL NETWORK

This is a continuation of PCT International Application NO. PCT/JP03/05575, filed May 1, 2003, which was not published in English.

BACKGROUND OF THE INVENTION

1. Field of the Invention

The present invention relates to an optical-level control apparatus for controlling the optical level of an optical signal to reduce the length of time it takes to recover the optical level to the original normal level in a switching operation and a recovery from a failure and a wavelength division multiplexing optical network comprising a plurality of nodes each employing the optical-level control apparatus.

2. Description of the Related Art

As the number of users utilizing the Internet and cellular phones increases, the amount of traffic also rises as well. In addition, services are also diversified from electronic business transactions and emails to distributions of moving pictures. On top of that, broadband communication becomes predominant and communication capacity also increases substantially. In consequence, a network having a large communication capacity is absolutely indispensable to communication. For this reason, introduction of an optical communication network is being carried forward. In particular, WDM (Wavelength Division Multiplexing) networks adopting a WDM technology are constructed at a very high pace. In addition, in consequence of increased communication capacities, contentions between carriers become severe and the cost of communication becomes higher considerably than the cost incurred so far. At the optical level, the technology of an optical node capable of handling wavelengths is a technology of importance. Examples of the optical node are an OADM (Optical Add Drop Multiplexing) node and an OXC (Optical Cross Connect) node.

As one of problems encountered in the conventional technology, in characteristics of optical components including an optical fiber and an optical amplifier, there are variations in optical power level among components of a wavelength division multiplexing signal, and these variations deteriorate the quality of transmission. In particular, if an optical node combining a variety of optical components is used, the variations become worse, requiring a function for adjusting the optical levels. In order to adjust the optical levels, an optical attenuator is introduced. Due to the operation of the optical attenuator, however, it takes time to restore the optical level of an output optical signal to the original normal level in a switching operation or in recovery from a failure.

FIG. 87 is a diagram showing a typical configuration of an optical node having a function for controlling levels of optical signals. A demultiplexer WDMUX $2\#i$ demultiplexes an input WDM (wavelength division multiplexing) signal having wavelengths $\lambda 1$ to $\lambda n$ into its optical components with the wavelengths $\lambda 1$ to $\lambda n$ and supplies the optical components to a switch SW $4\#i$. If this optical node is an add node, the optical node has a transponder (TRPN) transmitter $6\#i$ having a double configuration comprising a 0-system transmitter $6\#i0$ and a 1-system transmitter $6\#i1$. In the transponder TRPN transmitter $6\#i$, one of the transmitters $6\#i0$ and $6\#i1$ is used for a work (W) system whereas the other transmitter is used for a protection (P) system. Typically, the 0-system transmitter $6\#i0$ is used for a work (W) system whereas the 1-system transmitter $6\#i1$ is used for a protection (P) system. Both the 0-system transmitter $6\#i0$ and the 1-system transmitter $6\#i1$ supply subscriber optical signals received from a subscriber to a switch SW $8\#i$. The switch SW $8\#i$ selects an optical signal output by the work 0-system transmitter $6\#0$ and outputs the selected signal to a switch SW $4\#i$. It is to be noted that, if a failure occurs in the work 0-system transmitter $6\#i0$ of the TRPN transmitter $6\#i$, the operation is switched from the work 0-system transmitter $6\#i$ to the protection 1-system transmitter $6\#i1$.

The switch SW $4\#i$ passes on optical signals received from the demultiplexer $2\#i$ and the switch SW $8\#i$ as signals having different wavelengths to a transponder (TRPN) receiver $10\#i$ or a first splitter SPL $12\#ij$ where $j=1, 2$ and so on. If this optical node is a drop node, the transponder (TRPN) receiver $10\#i$ receives the optical signals and passes on the signals to a subscriber.

The first splitter SPL $12\#ij$ splits an input optical signal into two partial optical signals and supplies the partial optical signals to a variable optical attenuator VOA $14\#ij$ and a first monitor PD $16\#ij$ respectively. The output of the variable optical attenuator VOA $14\#ij$ is connected to a second splitter SPL $18\#ij$. The second splitter SPL $18\#ij$ further splits an optical signal output of the variable optical attenuator VOA $14\#ij$ into two partial optical signals and supplies the partial optical signals to a multiplexer WMUX $20\#i$ and a second monitor PD $22\#ij$ respectively. The first monitor PD $16\#ij$ and the second monitor PD $22\#ij$ each detect an optical level and output an optical-level detection signal representing the detected optical level.

A control circuit $24\#ij$ controls the variable optical attenuator VOA $14\#ij$ to adjust the optical level of the signal output by the variable optical attenuator VOA $14\#ij$ to a target level on the basis of the optical-level detection signals generated by the first monitor PD $16\#ij$ and the second monitor PD $22\#ij$. The variable optical attenuator VOA $14\#ij$ attenuates the optical signal received from the first splitter SPL $12\#ij$ by applying an attenuation (ATT) quantity controlled by the control circuit $24\#ij$ and outputs the attenuated optical signal to the SPL $18\#ij$. The multiplexer WMUX $20\#i$ multiplexes optical signals having the wavelengths $\lambda 1$ to $\lambda n$ and outputs a wavelength division multiplexing signal obtained as a result of the multiplexing to an optical fiber.

FIG. 88 is a diagram showing a transmission of an optical signal in a normal state. A node $30\#1$ is an add node, nodes $30\#2$ and $30\#3$ are each a thru node whereas a node $30\#4$ is a drop node. In a state where no failure occurs in the TRPN 0-system transmitter $6\#10$ employed in the node $30\#1$, as shown in FIG. 88, an added optical signal is supplied to the variable optical attenuator VOA $14\#11$ by way of the switch SW $4\#1$ and attenuated in the variable optical attenuator VOA $14\#11$ to a target level. By the same token, an optical signal output by the node $30\#1$ is supplied to the variable optical attenuator VOA $14\#21$ by way of the switch SW $4\#2$ and attenuated in the variable optical attenuator VOA $14\#21$ to a target level in the node $30\#2$. In the same way, an optical signal output by the node $30\#2$ is supplied to the variable optical attenuator VOA $14\#31$ by way of the switch SW $4\#3$ and attenuated in the variable optical attenuator VOA $14\#31$ to a target level in the node $30\#3$. Finally, an optical signal output by the node $30\#3$ is supplied to the TRPN receiver $10\#4$ by way of the switch SW $4\#4$ and dropped by the TRPN receiver $10\#4$ to a subscriber in the node $30\#4$.

FIG. 89 is a diagram showing a transmission of an optical signal in a state where a failure occurs. If a failure occurs in the TRPN 0-system transmitter $6\#10$ employed in the node $30\#1$ breaking an optical path including the TRPN 0-system transmitter 6#10 employed in the node 30#1, an optical beam transmitted to the node 30#2 to the node 30#4 disappears. Thus, the attenuation (ATT) quantities of the variable optical attenuator VOA 14#11, the variable optical attenuator VOA 14#21 and the variable optical attenuator VOA 14#31 become zero, which opens the variable optical attenuator VOA 14#11, the variable optical attenuator VOA 14#21 and the variable optical attenuator VOA 14#31 respectively. When the optical path is switched from the TRPN 0-system transmitter 6#10 to the TRPN 1-system transmitter 6#11 by the switch SW 8#1, the variable optical attenuator VOA 14#11, the variable optical attenuator VOA 14#21 and the variable optical attenuator VOA 14#31 have already been completely opened, causing an optical beam with a quantity greater than the normal one to enter the TRPN receiver 10#4 of the receiving node 30#4. In some cases, this optical beam damages the TRPN receiver 10#4. In addition, in the case of a WDM signal, the optical level of an optical signal transmitted to a channel involved in the failure becomes higher than the normal level at the recovery time so that, in some cases, it is quite within the bounds of possibility that this higher level has an effect on other channels.

In addition, if an optical loss of light failure of an optical signal causes the ATT quantity of a VOA to be increased, shutting down the VOA, no large difference in level between the normal condition and a failure-recovery state is resulted in. In this case, however, after the recovery from the failure, the VOAs need to adjust one signal level after another starting from the node 30#1. Documents describing technologies prior to the present invention include patent document 1, which discloses operations to increase the ATT quantity of a variable optical attenuator when a loss of light failure of an optical signal is detected and confirmed but decrease the ATT quantity of the variable optical attenuator when the input optical signal is restored to a normal state.

Nevertheless, the conventional technology has the following problems. Since one variable optical attenuator is activated after activation of the preceding one in a sequence of activations starting from node 1 as described above, the ATT quantity of the variable optical attenuator employed in the next node cannot be controlled correctly until the preceding node outputs an optical signal at a target level. Thus, the attenuation quantities of the variable optical attenuators employed in all nodes in the network cannot be controlled correctly either. The length of time it takes to correctly control the attenuation quantities of the variable optical attenuators employed in all nodes in the network is proportional to the number of nodes. In addition, it is difficult to operate the variable optical attenuator employed in each node in the network in a stable state and shorten the rise-time of the activation of each variable optical attenuator. This difficulty and the long rise-time of the activations raise another problem of an extremely long period of recovery time required in the event of a failure.

On top of that, if an optical signal disappears instantaneously on a temporary basis and recovered immediately in a state where optical signals are being communicated, in accordance with control of the ATT quantity of a variable optical attenuator to adjust the output quantity a fixed value, the ATT quantity of the variable optical attenuator is temporarily reduced in order to compensate for a drop in optical-signal level. When the worst comes to worst, however, the ATT quantity of the variable optical attenuator is excessively reduced to a minimum value. Then, when the loss of light state caused by the temporary loss of light failure disappears, the ATT quantity remains at a magnitude smaller than a normal value due to reasons including a delayed operation so that the optical level of an optical signal output by the variable optical attenuator rises, inducing an optical surge. It thus takes more time to restore the optical level of the optical signal output by the variable optical attenuator to the target level. Even if a function is provided for shutting down the variable optical attenuator in the event of a loss of light of optical signal, the optical level of the optical signal output by the variable optical attenuator must be restored to the target level in a recovery from a shut-down state (that is, a state of a maximum ATT quantity) in the same way. Thus, the conventional technology has a problem that it takes time to restore the optical level of the optical signal output by the variable optical attenuator to the target level from a shut-down state as is the case with the operation to recover from a failure as described above.

In addition, in accordance with patent document 1, control is executed to increase the ATT quantity in the event of a loss of light of an optical signal. Thus, the conventional technology disclosed in the document has a problem that it takes time to restore the optical level of an optical signal output by a variable optical attenuator to a normal level after the loss of light state disappears.

SUMMARY OF THE INVENTION

It is thus an object of the present invention to provide an optical-level control method capable of reducing the length of time it takes to recover from a failure, preventing an optical surge from being induced due to an LOL (Loss of Light) failure of an optical signal and reducing the length of time it takes to make a recovery after disappearance of a temporary LOL failure of an optical signal as well as provide an optical-level control apparatus adopting the optical-level control method and a wavelength division multiplexing network comprising a plurality of nodes each employing the optical-level control apparatus.

In accordance with an aspect of the present invention, there is provided an optical-level control apparatus comprising: a plurality of variable optical attenuators each used for attenuating an input optical component signal included in a wavelength division multiplexing signal as a component signal having a unique wavelength by applying a variable ATT (attenuation) quantity; and a plurality of control units each used for automatically controlling the ATT quantity of an associated one of the variable optical attenuators so as to make the optical level of an optical signal output by the variable optical attenuator associated with the control unit equal to a target level in an ordinary state with a normal input optical signal, wherein: the optical-level control apparatus further has a detection unit for detecting an LOL state of an optical signal input to any of the variable optical attenuators and detecting disappearance of the LOL state; when the detection unit detects an LOL state of an optical signal input to a specific one of the variable optical attenuators, the control unit associated with the specific variable optical attenuator adjusts the ATT quantity of the specific variable optical attenuator to a first predetermined value; and when the detection unit detects disappearance of the LOL state of the optical signal input to the specific variable optical attenuator, the control unit associated with the specific variable optical attenuator adjusts the ATT quantity of the specific VOA variable optical attenuator to a second predetermined value prior to a transition to the automatic control.

In accordance with another aspect of the present invention, there is provided an optical-level control apparatus comprising: a variable optical attenuator for attenuating input optical components signal included in a wavelength division multiplexing signal as component signals having different wavelengths by applying a variable ATT (attenuation) quantity; and a control unit for automatically controlling the ATT quantity of the variable optical attenuator so as to make the optical level of an output of the variable optical attenuator equal to a target level in an ordinary state with a normal input optical signal, wherein: the optical-level control apparatus further has a detection unit for detecting an LOL state of an optical signal input to the variable optical attenuator and detecting disappearance of the LOL state; when the detection unit detects an LOL state of an optical signal input the variable optical attenuator, the control unit adjusts the ATT quantity of the variable optical attenuator to a constant value by applying an ATT quantity used right before the optical LOL state; and when the detection unit detects disappearance of an LOL state of the optical signal input to the variable optical attenuator, the control unit makes a transition to the automatic control.

In accordance with a further aspect of the present invention, there is provided an optical-level control apparatus comprising: a variable optical attenuator for attenuating input optical components signal included in a wavelength division multiplexing signal as component signals having different wavelengths by applying a variable ATT (attenuation) quantity; and a control unit for automatically controlling the ATT quantity of the variable optical attenuator so as to make the optical level of an output of the variable optical attenuator equal to a target level in an ordinary state with a normal input optical signal, wherein the control unit executes automatic control at such a long cycle that the ATT quantity does not become smaller than a fixed value within a period having a length estimated to be equal to the length of a required period between detection of an LOL state of any one of the input optical signals and disappearance of the LOL state.

The above and other objects of the present invention, its features and advantages thereof as well as the manner of realizing them will become more apparent, whereas the present invention itself will be best understood from a study of the following description and claims appended thereto with reference to attached drawings showing some embodiments of the present invention.

DETAILED DESCRIPTION OF THE PREFERRED EMBODIMENTS

Figure 1A:
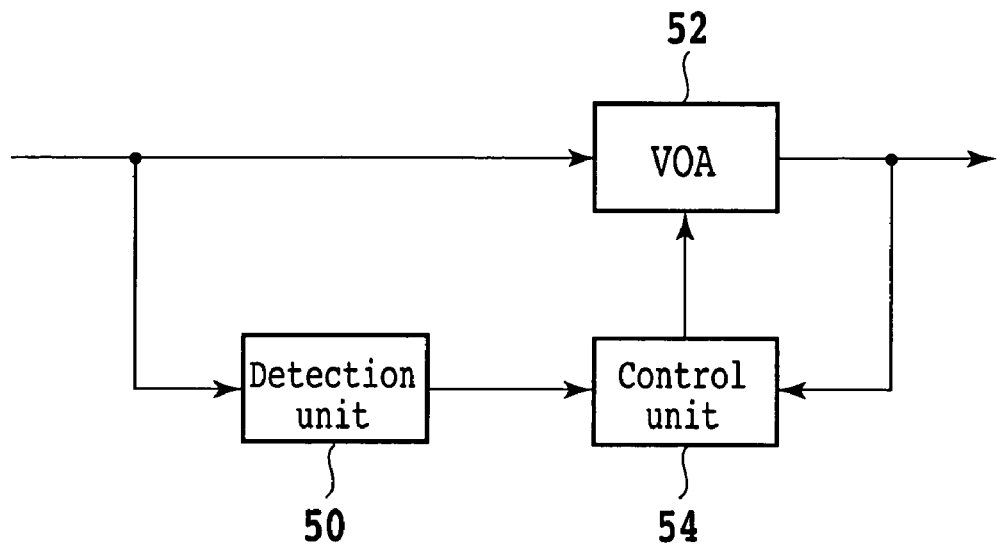
FIG. 1A is a block diagram showing the principle of operation of the present invention.
Figure 2:
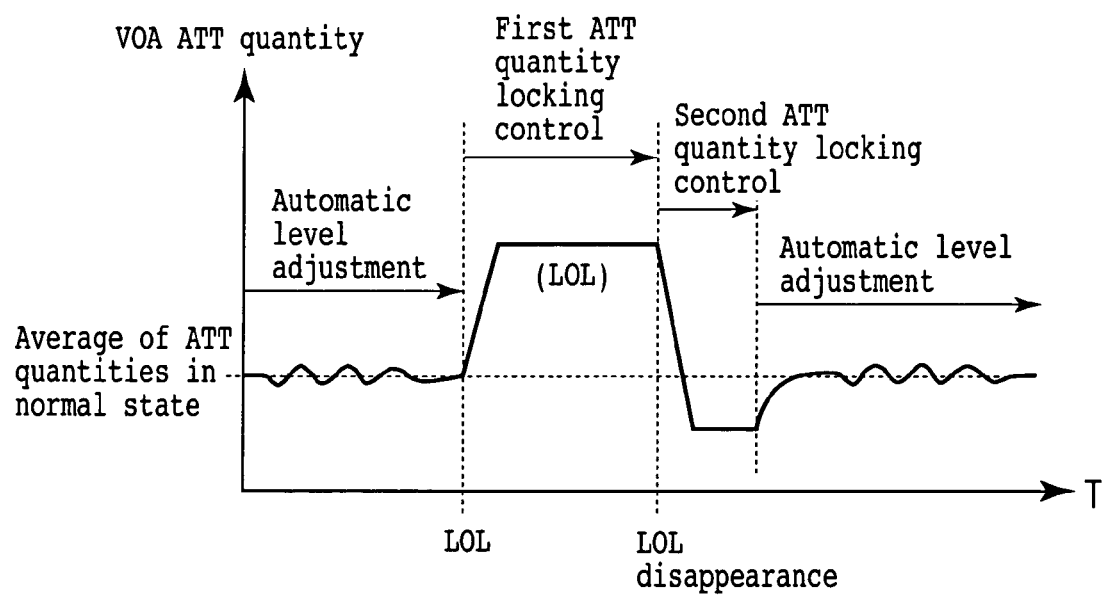
FIG. 2 is an explanatory diagram referred to in describing principle of operation of the present invention.
Figure 3:
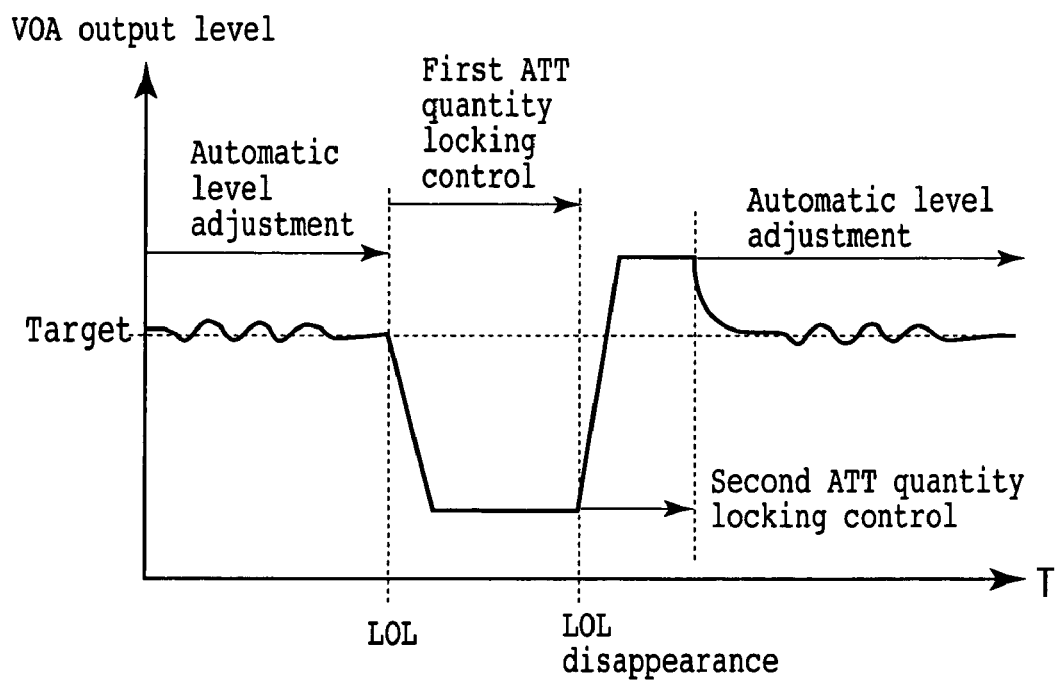
FIG. 3 is an explanatory diagram referred to in describing principle of operation of the present invention.

Prior to description of embodiments of the present invention, the principle of operation of the present invention is explained. FIG. 1A is a block diagram showing the principle of operation of an optical-level control apparatus provided by the present invention. FIG. 2 is an explanatory diagram showing variations of an attenuation (ATT) quantity of a variable optical attenuator (VOA). FIG. 3 is an explanatory diagram showing variations of the optical level of an optical signal output by a VOA. As shown in FIG. 1, the optical-level control apparatus comprises a detection unit 50, a VOA 52 and a control unit 54. The VOA 52 is a component for attenuating an input optical signal by applying an ATT quantity controlled by the control unit 54. The detection unit 50 is a component for detecting a loss of light state of the input optical signal and disappearance of a loss of light state on the basis of the optical level of the optical signal input to the VOA 52.

When the detection unit 50 detects no loss of light state of the input optical signal, the control unit 54 executes automatic control of the optical level of the optical signal output by the VOA 52 so as to adjust the optical level to a target level as shown in FIGS. 2 and 3. When the detection unit 50 detects a loss of light state of the input optical signal, on the other hand, the control unit 54 makes a transition to fixed-ATT control 1 to set the ATT quantity at a fixed value other than 0 as shown in FIGS. 2 and 3. Since the ATT quantity is set at a fixed value other than 0 in the event of a loss of light state in this way, it is possible to solve a problem of an excessively high optical level of the optical signal during a period of time following an optical recovery from the loss of light state.

Then, as the detection unit 50 detects disappearance of the loss of light state of the input optical signal, the control unit 54 makes a transition to fixed-ATT control 2 to set the ATT quantity at a fixed value close to an average of normal optical levels before re-execution of the automatic optical-level adjustment as shown in FIGS. 2 and 3. In this way, as the loss of light state disappears, the control unit 54 makes a transition to fixed-ATT control 2 prior to re-execution of the automatic optical-level adjustment. Thus, convergence toward the target level is fast.

Figure 1B:
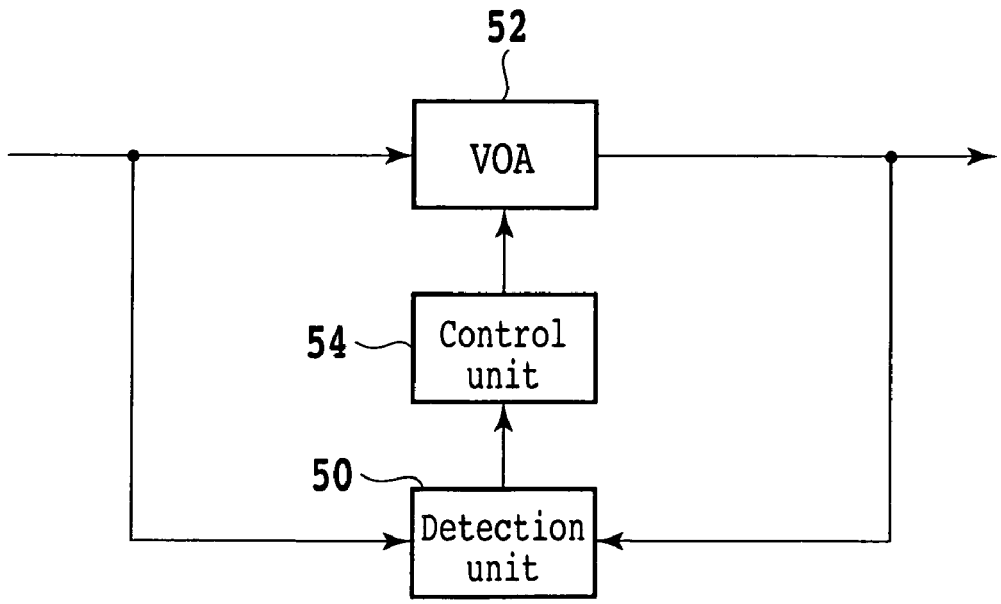
FIG. 1B is another block diagram showing the principle of operation of the present invention.

FIG. 1B is another block diagram showing the principle of operation of the present invention. As shown in FIG. 1B, the detection unit 50 may detect a loss of light state of the input optical signal and disappearance of the loss of light state at detection points before and after the VOA 52 or only a detection point after the VOA 52.

First Embodiment

Figure 4:
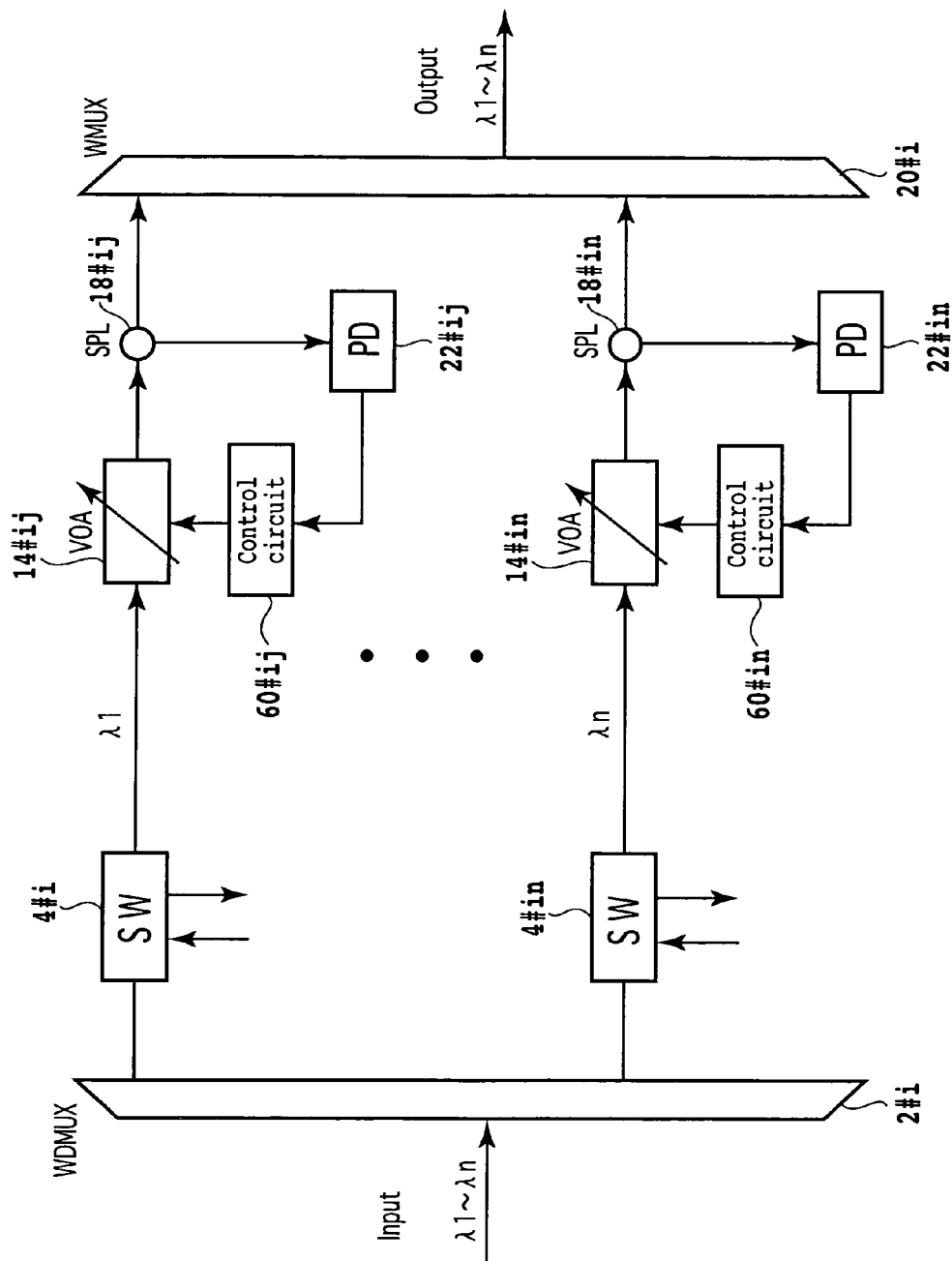
FIG. 4 is a diagram showing the configuration of a node implemented by a first embodiment of the present invention.
Figure 87:
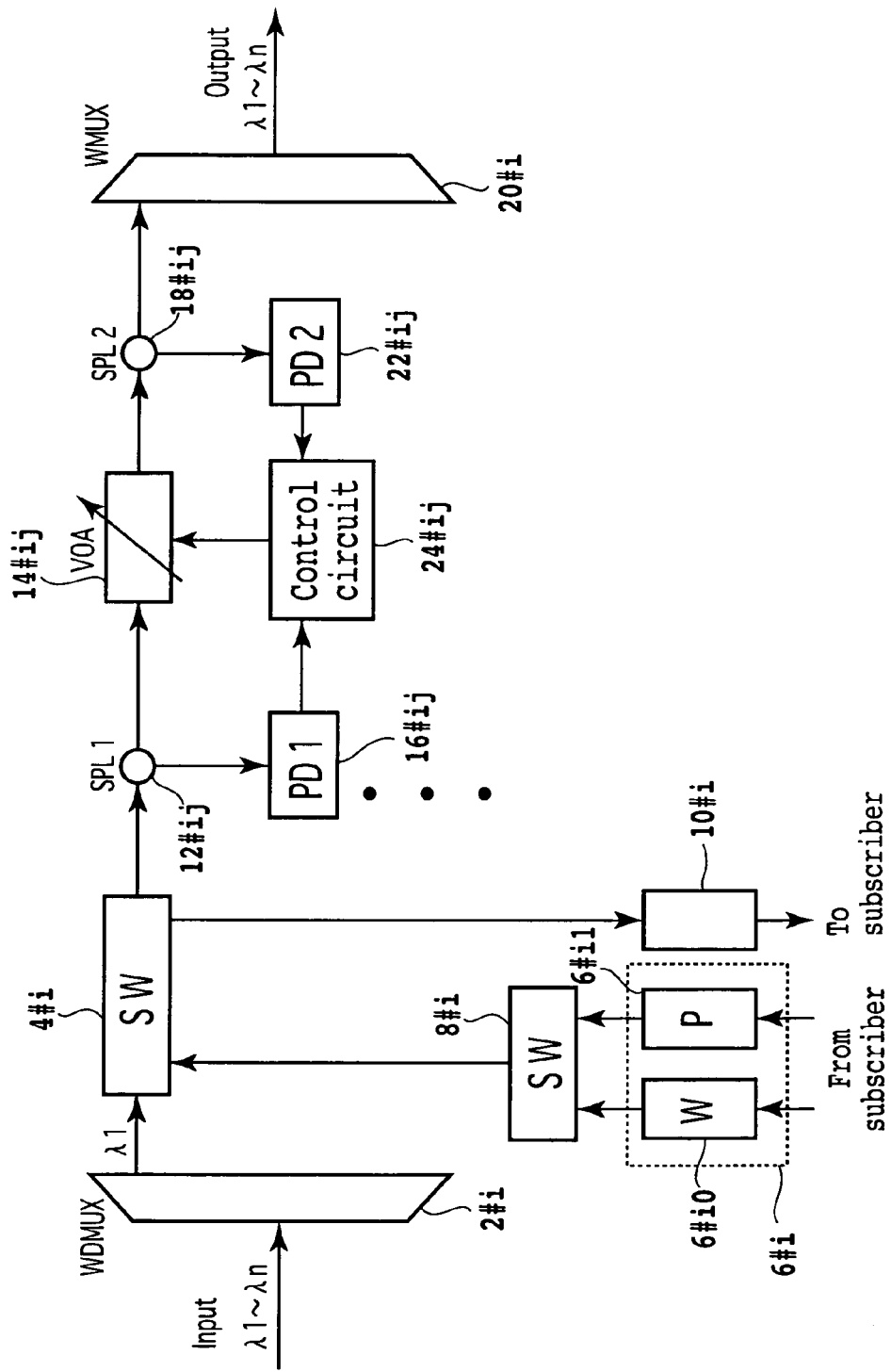
FIG. 87 is a diagram showing the configuration of the conventional node.
Figure 88:
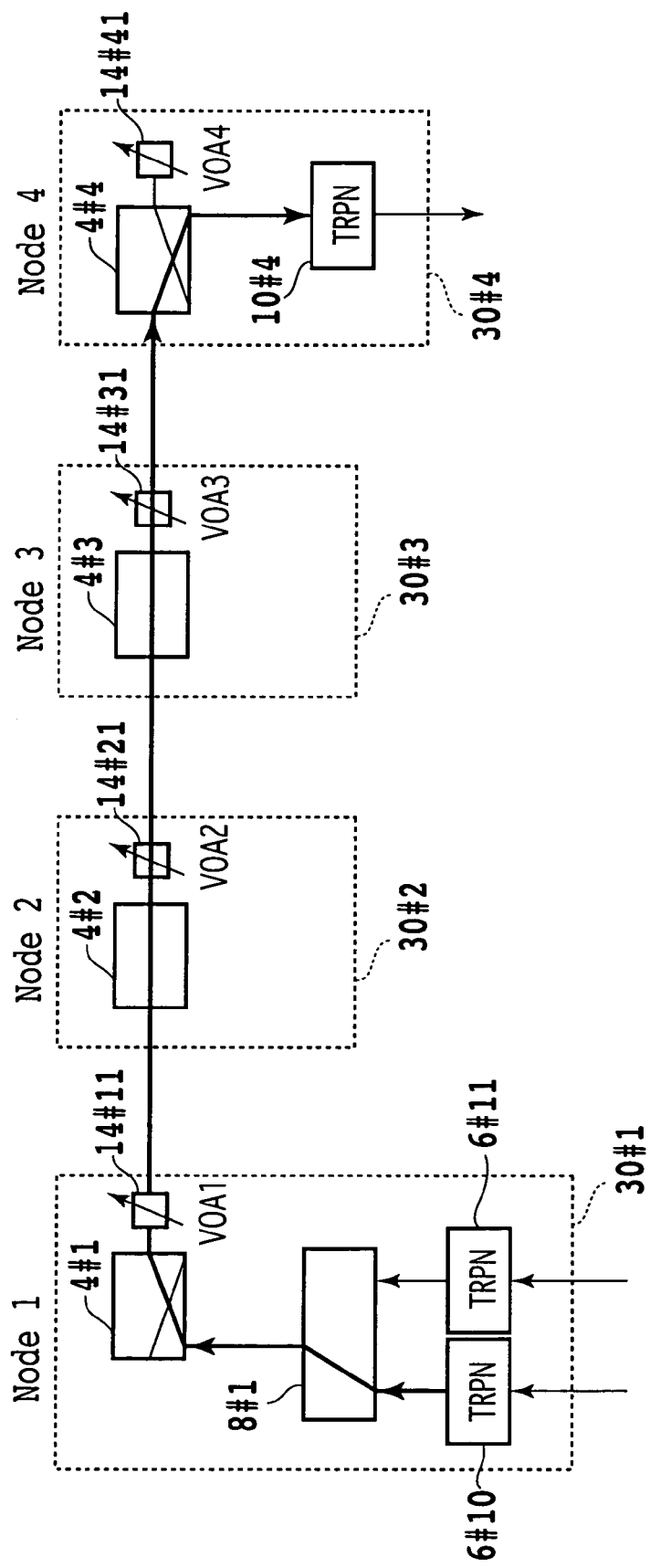
FIG. 88 is an explanatory diagram referred to in describing operations carried out in the conventional normal state.
Figure 89:
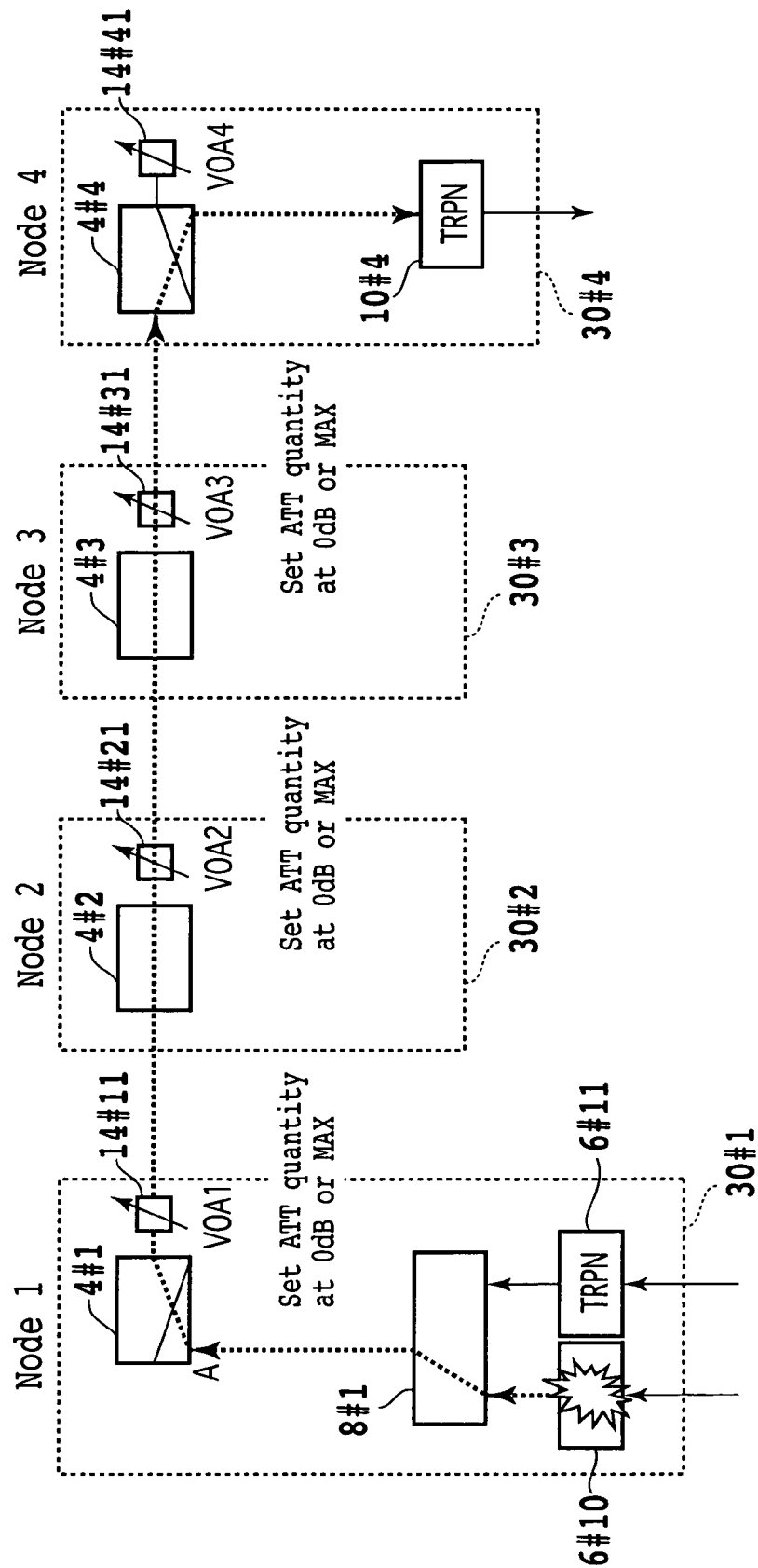
FIG. 89 is an explanatory diagram referred to in describing operations carried out in the event of a failure in accordance with the conventional technology.

FIG. 4 is a diagram showing the configuration of a node apparatus implemented by a first embodiment of the present invention. In this figure, components virtually identical with their counterparts shown in FIG. 87 are denoted by the same reference numerals as the counterparts. This node apparatus has add and drop functions. In the configuration shown in FIG. 4, a demultiplexer WDMUX 2#i demultiplexes an input WDM (wavelength division multiplexing) signal into components with wavelengths λ1 to λn. Each of the components with wavelengths λ1 to λn is supplied to a variable optical attenuator VOA 14#ij where j=1, 2 ... n by way of a switch SW 4#i. An optical signal output by the variable optical attenuator VOA 14#ij is supplied to a multiplexer WMUX 20#i by way of a splitter SPL 18#ij.

The splitter SPL 18#ij splits an optical signal input thereto into optical signals having a specific wavelength. One of the optical signals is supplied to the multiplexer WMUX 20#i while the other is supplied to a monitor PD 22#ij. The monitor PD 22#ij detects the optical level of the optical signal supplied thereto and supplies a result of the detection to a control circuit 60#ij. The control circuit 60#ij executes optical variable attenuation control to be described later and feedback control to vary an ATT quantity of the variable optical attenuator VOA 14#ij in accordance with the optical level of an optical signal output by the variable optical attenuator VOA 14#ij. By varying the ATT quantity of the variable optical attenuator VOA 14#ij, the optical level of an optical signal output by the variable optical attenuator VOA 14#ij can be adjusted to a fixed value.

Figure 5:
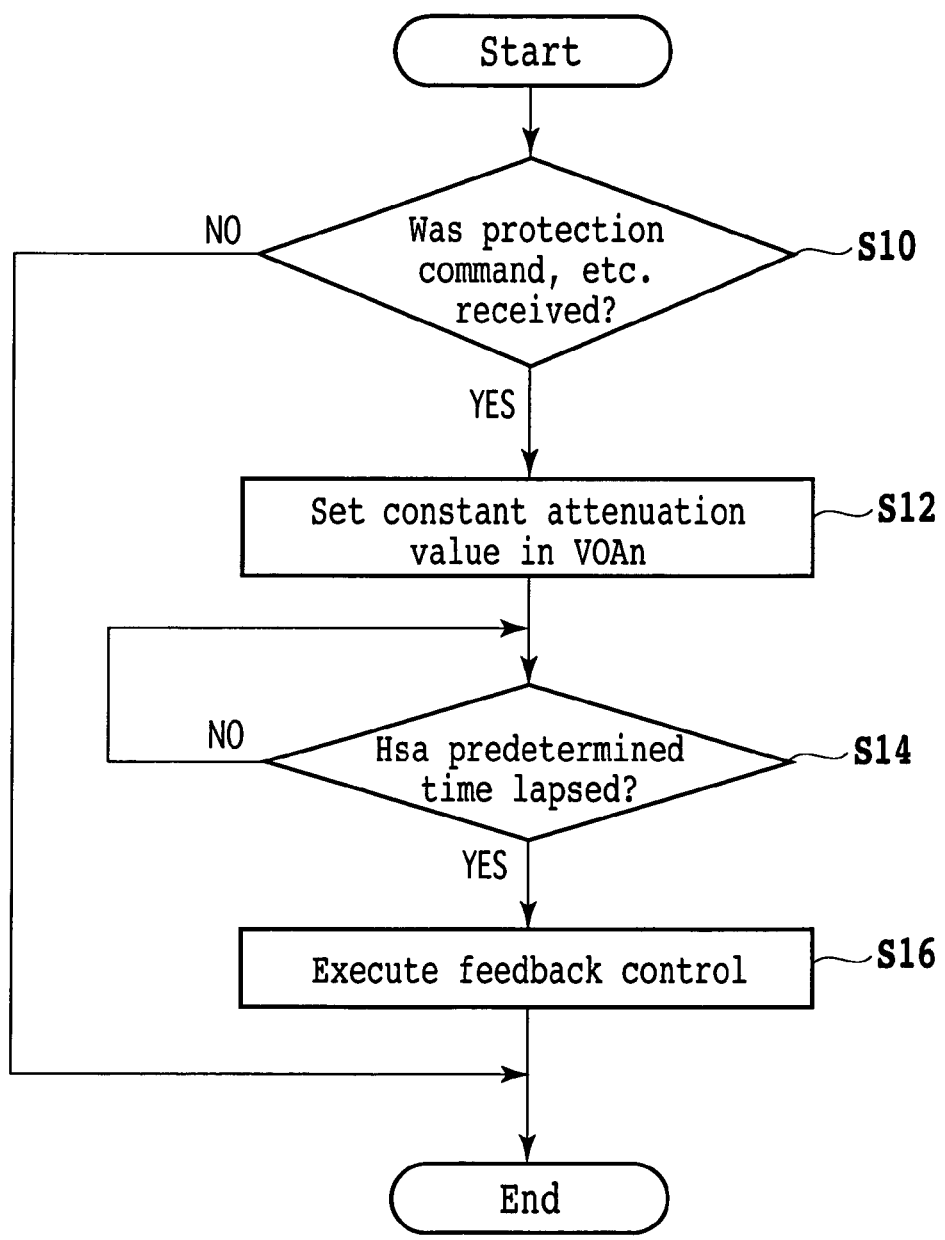
FIG. 5 shows a flowchart representing optical variable attenuation processing carried out in accordance with the first embodiment of the present invention.

FIG. 5 shows a flowchart representing optical variable attenuation processing carried out by the control circuit 60#ij in accordance with the first embodiment of the present invention. This optical variable attenuation processing is carried out repeatedly at fixed time intervals.

As shown in the figure, the flowchart begins with a step S10 at which the control circuit 60#ij determines whether or not a protection command or a notice of a failure has been received. If a protection command or a notice of a failure has been received, the flow of the processing goes on to a step S12 at which the control circuit 60#*ij* reads out a locked ATT quantity of the variable optical attenuator VOA 14#*ij* from a memory embedded in the control circuit 60#*ij* and sets the locked ATT quantity in the variable optical attenuator VOA 14#*ij*. The variable optical attenuator VOA 14#*ij* uses the locked ATT quantity of the variable optical attenuator VOA 14#*ij* to carry out a coarse adjustment. If the determination result produced at the step S10 reveals that a protection command or a notice of a failure has not been received, on the other hand, the processing cycle is ended.

The flow of the processing then goes from the step S12 to a step S14 at which the control circuit 60#*ij* determines whether or not a predetermined period of time has lapsed since reception of the protection command or the notice of the failure. If the predetermined period of time has lapsed since reception of the protection command or the notice of the failure, the flow of the processing goes to a step S16 at which the feedback control described above is executed to finely adjust the variable optical attenuator VOA 14#*ij*. Then, the processing cycle is ended. It is to be noted that the predetermined period of time is set at a value sufficiently longer than the time it takes to supply an optical signal to the variable optical attenuator VOA 14#*ij* employed in every node apparatus.

Figure 6:
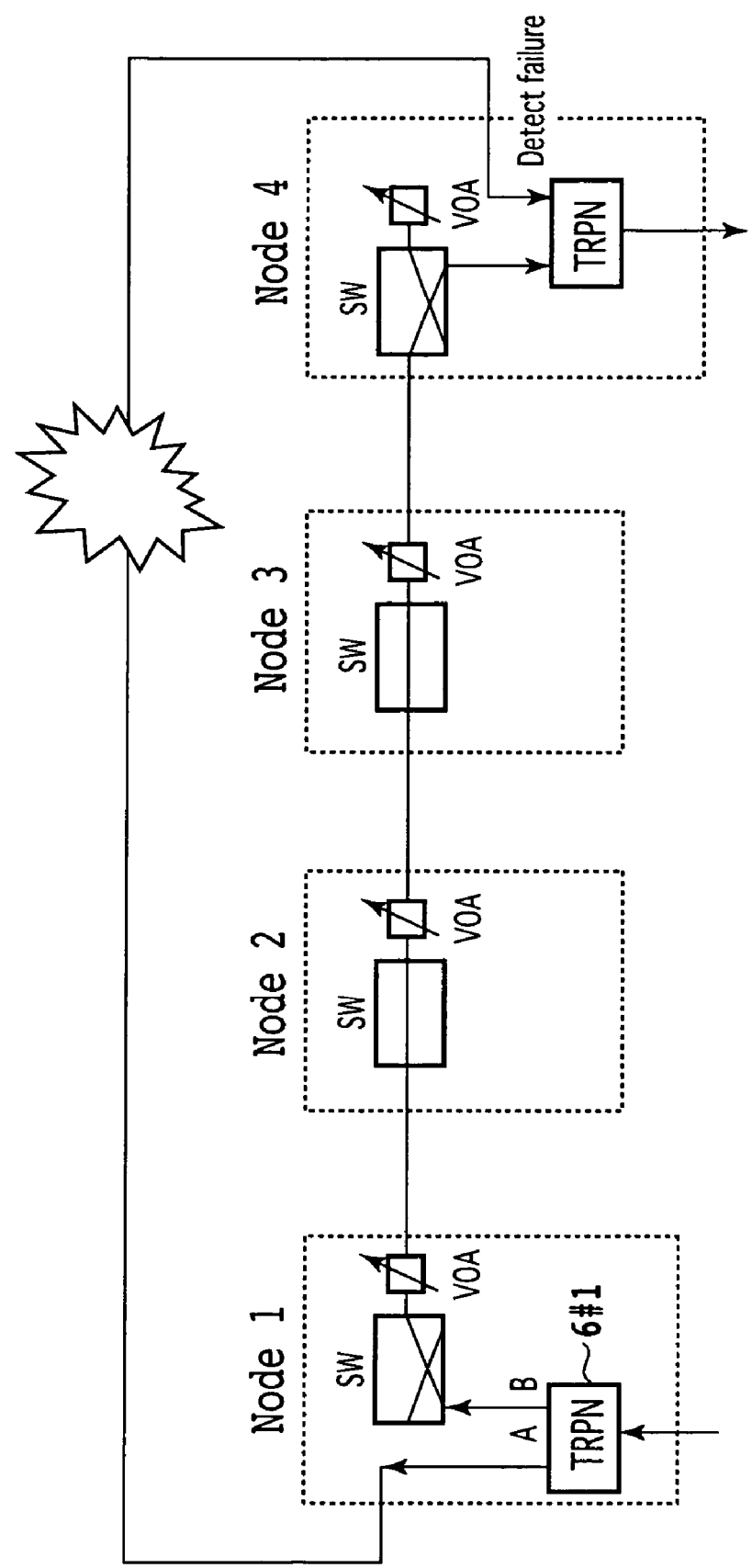
FIG. 6 is an explanatory diagram referred to in describing operations carried by each node in a recovery from a failure.
Figure 7:
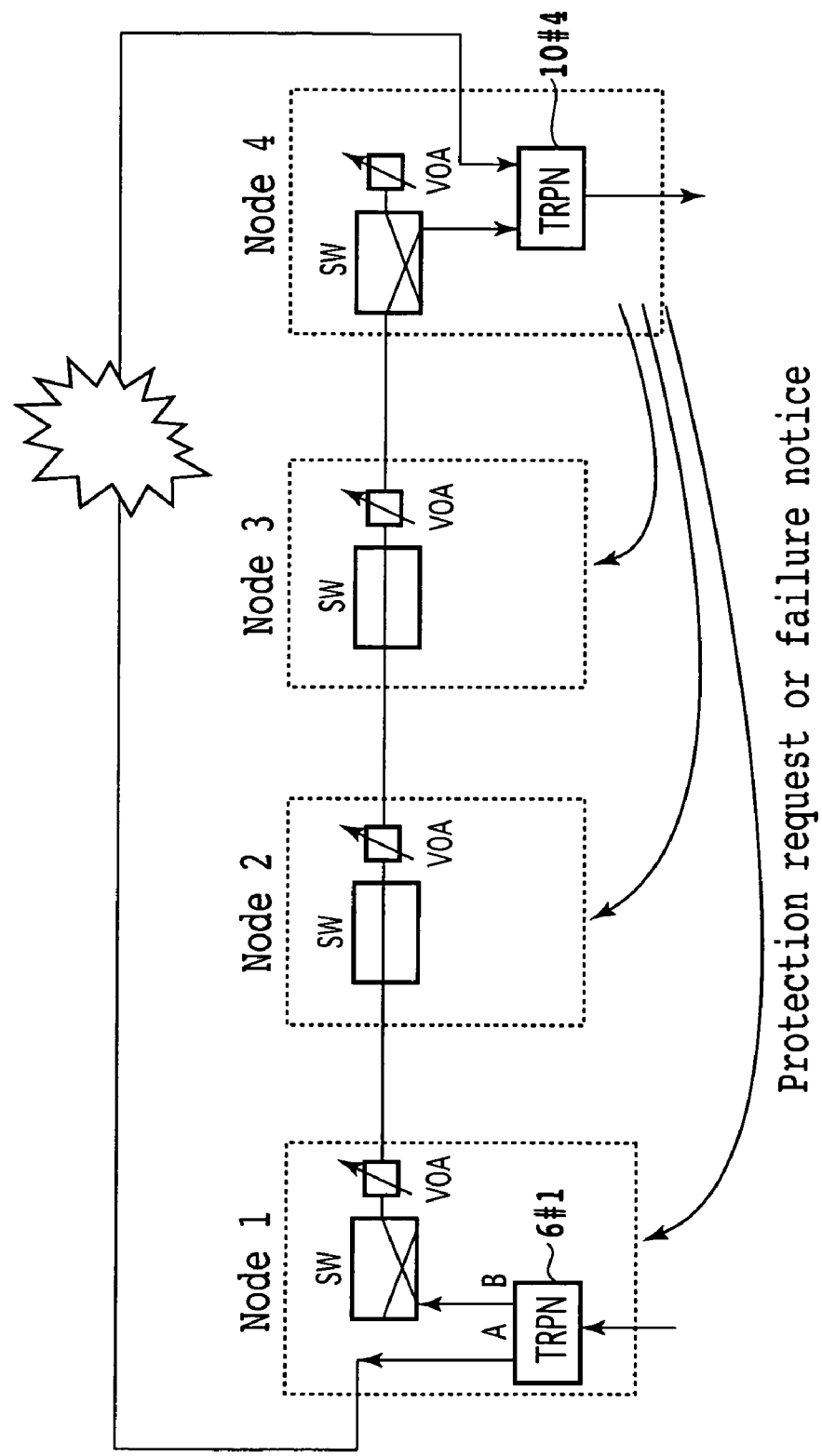
FIG. 7 is another explanatory diagram referred to in describing operations carried by each node in a recovery from a failure.
Figure 8:
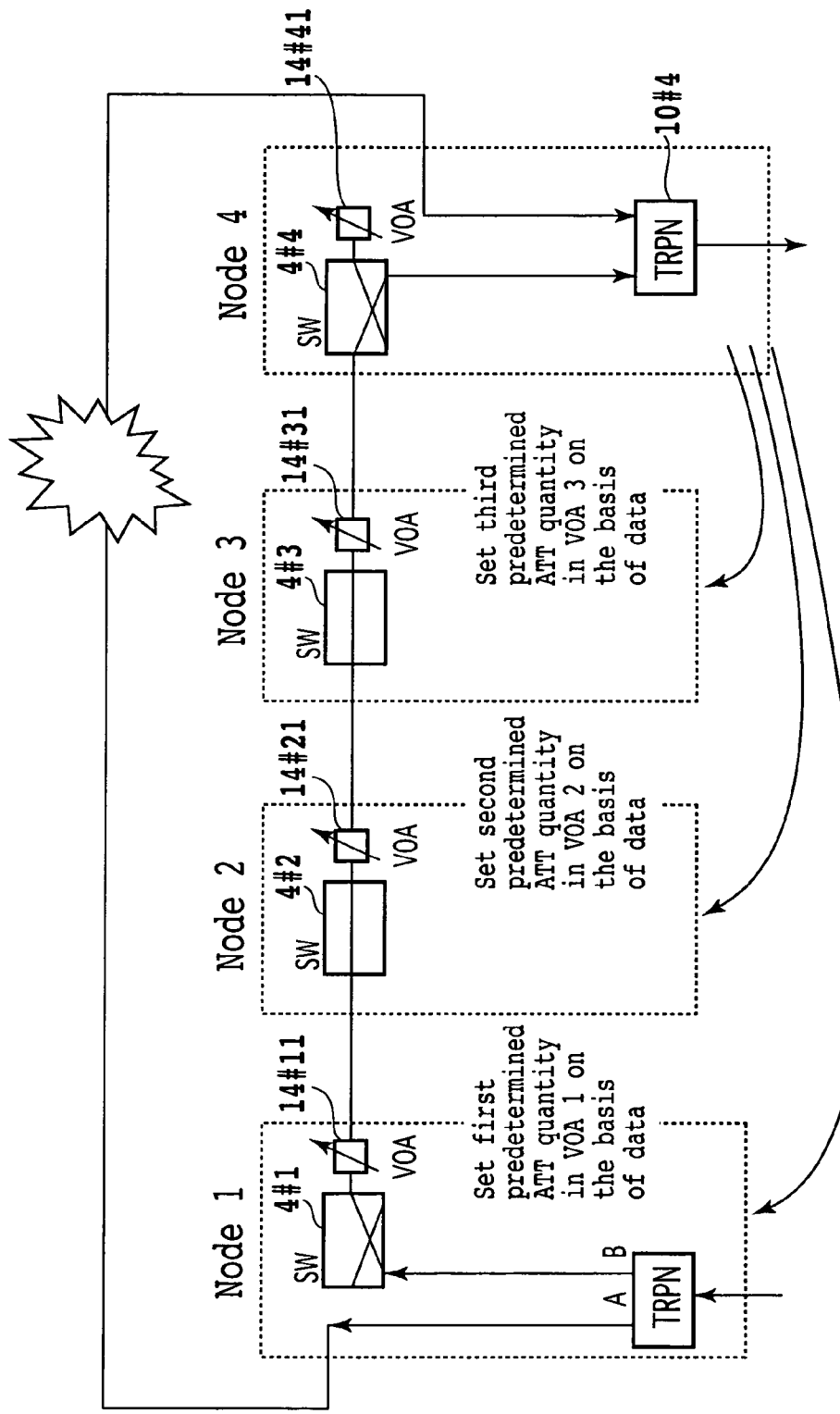
FIG. 8 is a further explanatory diagram referred to in describing operations carried by each node in a recovery from a failure.

FIGS. 6 to 8 are diagrams each showing operations carried out in the event of a failure occurring on a work route. FIG. 6 shows a state in which, while node 1 is transmitting an optical signal added in the transponder (TRPN) transmitter 6#1 employed in node 1 to node 4, a failure occurs between nodes 1 and 4. In this case, as shown in FIG. 7, the optical signal needs to be detoured through a protection route passing through nodes 1 to 4. Thus, a node detecting the failure transmits a protection command or a notice of the failure to the other nodes on the protection route. In this example, the node detecting the failure is node 4 whereas the other nodes on the protection route are nodes 1 to 3. It is to be noted that a protection command or a notice of a failure is transmitted to the nodes as an APS (Automatic Protection Switch) through an OSC (Optical Supervisor Channel) for monitoring.

With the protection command (or the notice of the failure) used as a trigger, as shown in FIG. 8, control circuits 60#11, 60#21 and 60#31 employed in nodes 1, 2 and 3 respectively set constant ATT quantities in variable optical attenuators 14#11, 14#21 and 14#31 respectively. The constant ATT quantities have been stored in advance in memories embedded in the control circuits 60#11, 60#21 and 60#31. Triggered by the protection command or the notice of the failure, nodes 1 to 3 each set the locked ATT quantity of the variable optical attenuator VOA 14#*ij* in the variable optical attenuator VOA 14#*ij* without regard to existence of an input optical signal. The constant ATT quantities stored in the memories embedded in nodes 1 to 3 are not necessarily equal to each other though. For example, the constant ATT quantities stored in the memories embedded in nodes 1 to 3 are 10 dB, 11 dB and 9 dB respectively. In node 1, an optical signal added in a transponder (TRPN) 6#1 is supplied to a switch SW 4#1 and, in node 4, an optical signal output by a switch SW 4#4 is supplied to a TRPN 10#4.

Thereafter, when an optical signal is supplied to the variable optical attenuator VOA 14#*ij* employed in node i, the control circuit 60#*ij* of node i switches the variable optical attenuator VOA 14#*ij* to feedback control in order to adjust the optical level of an optical signal output by the variable optical attenuator VOA 14#*ij* to a constant value.

Figure 9A:
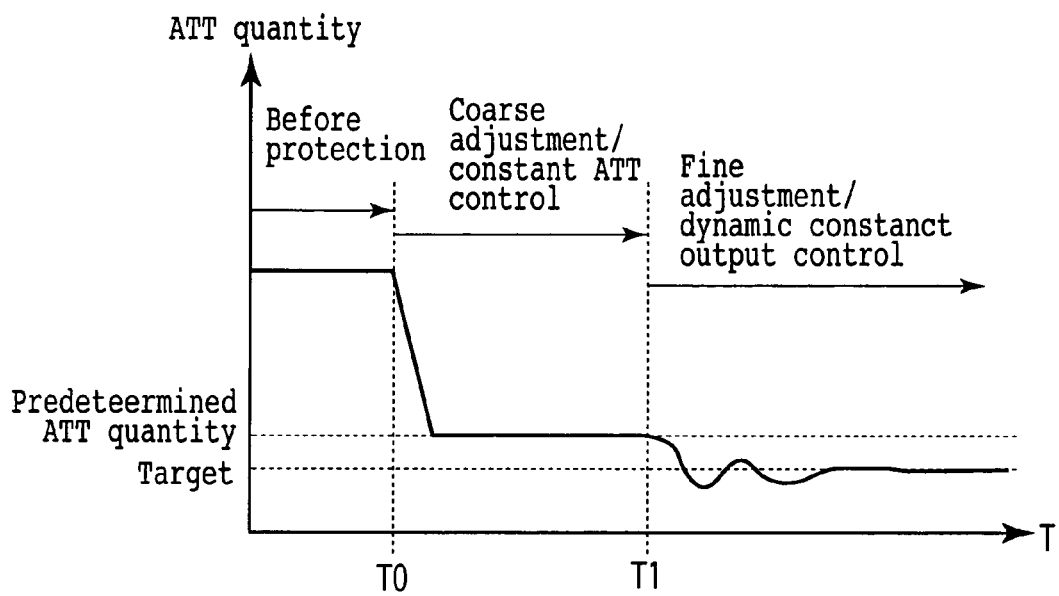
FIG. 9A is a diagram showing variations of an attenuation (ATT) quantity of a variable optical attenuator (VOA) employed in each node as variations with the lapse of time.
Figure 9B:
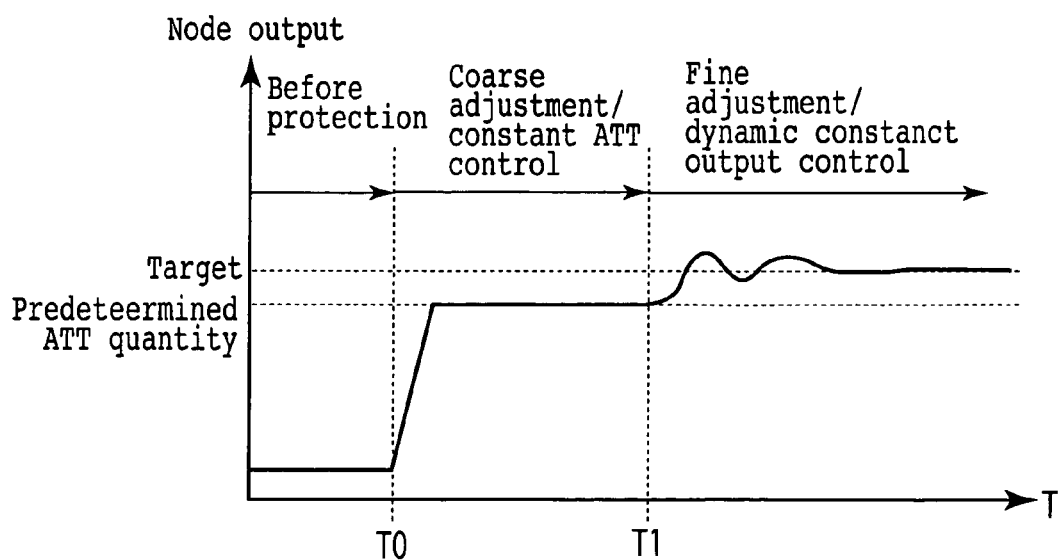
FIG. 9B is a diagram showing variations of the optical level of an optical signal output by a VOA employed in each node as variations with the lapse of time.

FIG. 9A is a diagram showing variations of the ATT quantity of the variable optical attenuator VOA 14#*ij* employed in each node subjected to the control represented by the flowchart shown in FIG. 5 as variations with the lapse of time, whereas FIG. 9B is a diagram showing variations of the optical level of an optical signal output by the variable optical attenuator VOA 14#*ij* employed in each node subjected to the control represented by the flowchart shown in FIG. 5 as variations with the lapse of time. In the figure, symbol T0 denotes a point of time at which the protection command (or the notice of the failure) cited above is received as a trigger. Symbol T1 denotes a point of time ending a predetermined period of time lapsing since the trigger reception time T0. Typically, the length of the predetermined period of time from T0 to T1 is 10 msec. In FIG. 9A, a predetermined ATT quantity of the variable optical attenuator VOA 14#*ij* and a target ATT quantity of the variable optical attenuator VOA 14#*ij* are set at typical values of 10 dB and 9 dB respectively. In FIG. 9B, on the other hand, a predetermined optical level and a target optical level are set at typical values of −1 dB and 0 dB respectively.

Thus, if only the trigger is received, the variable optical attenuators 14#*ij* employed in all the nodes start operations at the same time so that the time it takes to attain the target values can be shortened and the control is simple. In addition, the variable optical attenuator VOA 14#*ij* adjusts the optical signal approximately to a desired optical level, allowing the signal to arrive at the last node in a short period of time. Thus, the optical signal can be communicated between the nodes. On top of that, since an optical beam is supplied to the variable optical attenuator VOA 14#*ij*, the constant-quantity control and the fine adjustment can be carried out.

Second Embodiment

Figure 10A:
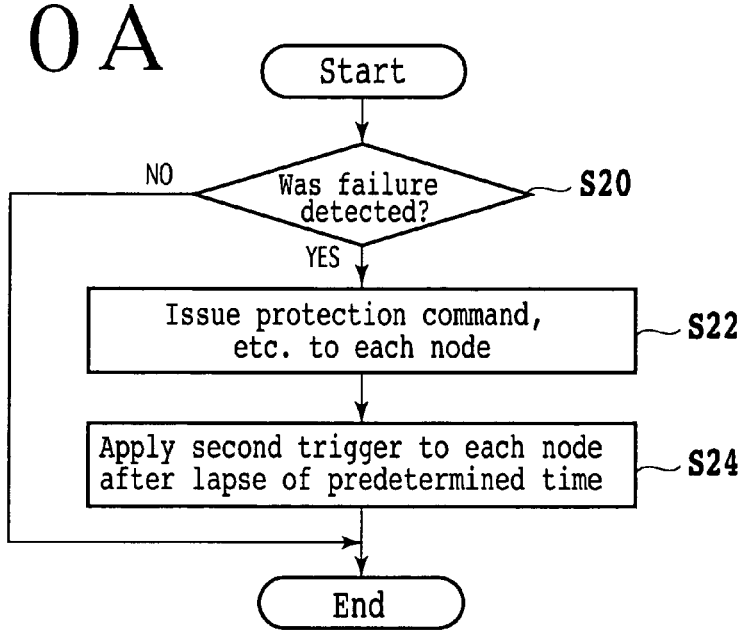
FIG. 10A shows a flowchart representing processing to detect a failure in accordance with a second embodiment of the present invention.
Figure 10B:
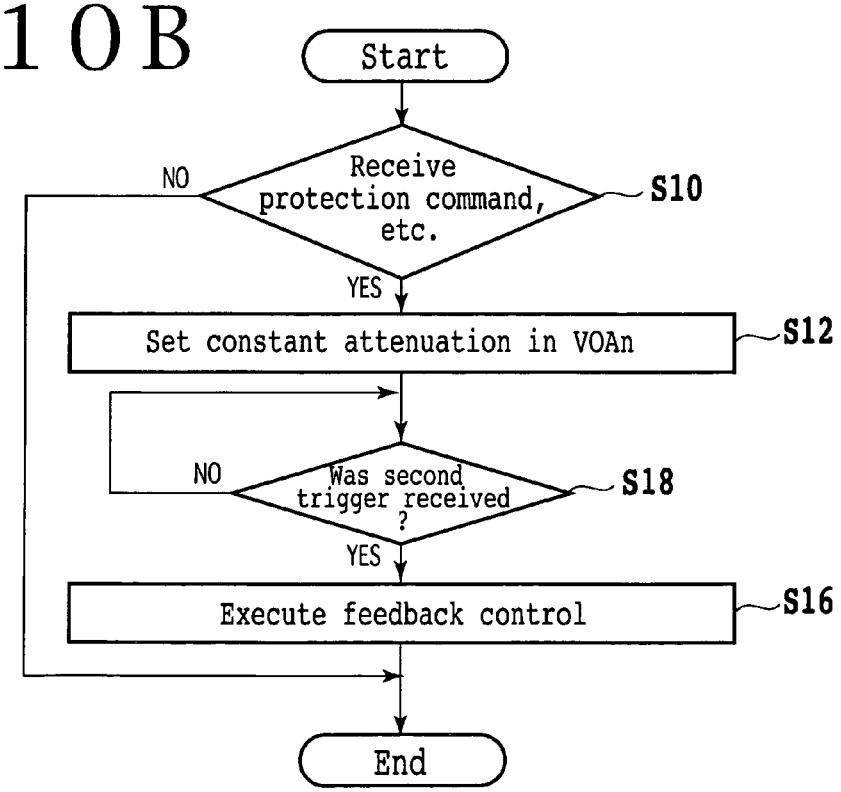
FIG. 10B shows a flowchart representing processing to control variable optical attenuation in accordance with the second embodiment of the present invention.

FIG. 10A shows a flowchart representing processing carried out by the control circuit 60#*ij* to detect a failure in accordance with a second embodiment of the present invention whereas FIG. 10B shows a flowchart representing processing carried out by the control circuit 60#*ij* to control variable optical attenuation in accordance with the second embodiment of the present invention. These pieces of processing are carried out repeatedly at fixed time intervals. In the flowcharts shown in these figures, steps identical with their counterparts of the flowchart shown in FIG. 5 are denoted by the same reference numerals as the counterparts.

The flowchart shown in FIG. 10A begins with a step S20 at which the control circuit 60#*ij* determines whether or not a failure has occurred on a line connected to the node of its own. A failure is detected as a line alarm or an AIS-P (Alarm Indication Signal-Path). Examples of the line alarm and the AIS-P are a LOL (Loss Of Light), a LOS (Loss Of Signal), a LOF (Loss of Frame) and an AIS-L (Alarm Indication Signal-Line).

If a failure of a transmission line has been detected, the flow of the processing goes on to a step S22 at which the control circuit 60#*ij* transmits a protection command or a notice of the failure to at least nodes on a protection route. Then, at the next step S24, the control circuit 60#*ij* enters a state of waiting for a predetermined period of time to lapse before transmitting a second trigger to each node on the protection route. It is to be noted that the second trigger is also transmitted as an APS through an OSC.

The flowchart shown in FIG. 10B begins with a step S10 at which the control circuit 60#*ij* determines whether or not a protection command or a notice of a failure has been received. If a protection command or a notice of a failure has been received, the flow of the processing goes on to a step S12 at which the control circuit 60#*ij* reads out a locked ATT quantity from a memory embedded in the control circuit 60#*ij* and sets the locked ATT quantity of the variable optical attenuator VOA 14#*ij*. The variable optical attenuator VOA 14#*ij* uses the locked ATT quantity to carry out a coarse adjustment. If the determination result produced at the step S10 reveals that a protection command or a notice of a failure has not been received, on the other hand, the processing cycle is ended.

The flow of the processing then goes from the step S12 to a step S18 at which the control circuit 60#*ij* determines whether or not a second trigger has been received. If a second trigger has been received, the flow of the processing goes to a step S16 at which the feedback control described above is executed to finely adjust the variable optical attenuator VOA 14#*ij*. Then, the processing cycle is ended.

Figure 11A:
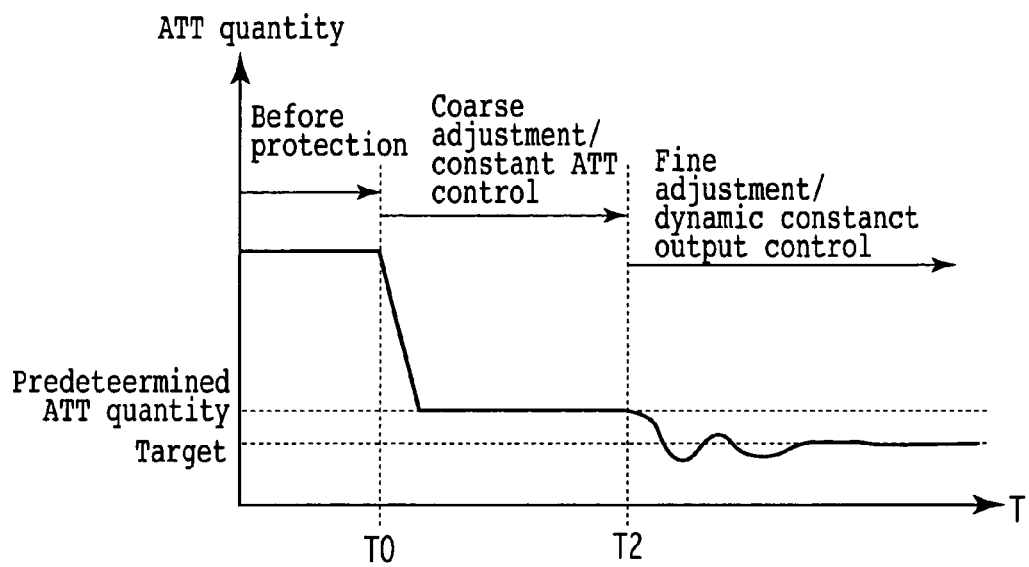
FIG. 11A is a diagram showing variations of an ATT quantity of a VOA employed in each node as variations with the lapse of time.
Figure 11B:
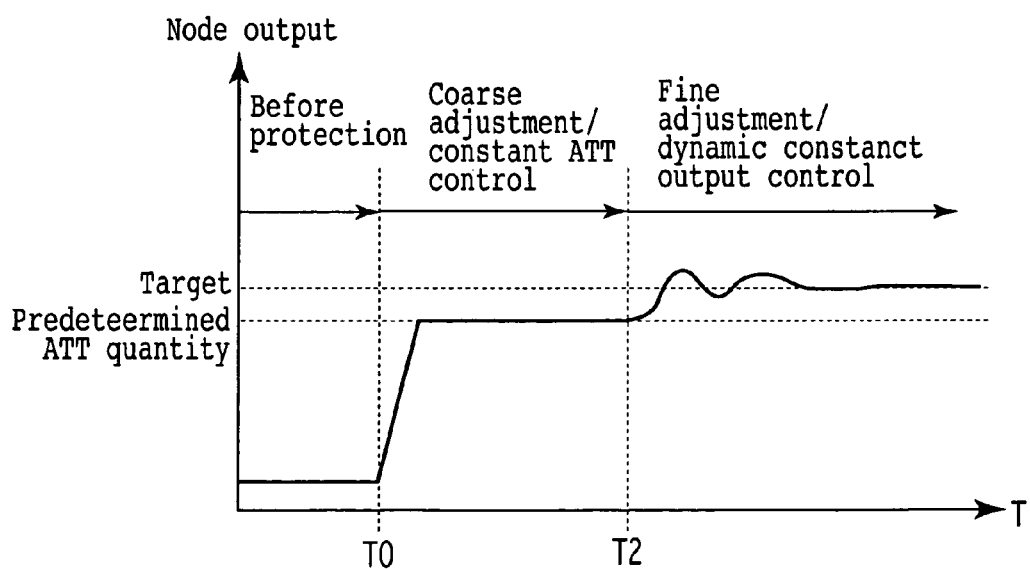
FIG. 11B is a diagram showing variations of the optical level of an optical signal output by a VOA employed in each node as variations with the lapse of time.

FIG. 11A is a diagram showing variations of an ATT quantity of the variable optical attenuator VOA 14#*ij* employed in a node, in which the control circuit 60#*ij* carries out processing represented by the flowchart shown in FIG. 10B to control variable optical attenuation, as variations with the lapse of time. FIG. 11B is a diagram showing variations of the optical level of an optical signal output by the variable optical attenuator VOA 14#*ij* employed in a node, in which the control circuit 60#*ij* carries out processing represented by the flowchart shown in FIG. 10B to control variable optical attenuation, as variations with the lapse of time. In these figures, symbol T0 denotes a point of time at which the protection command (or the notice of the failure) cited above is received as a trigger. Symbol T2 denotes a point of time at which a second trigger is received.

Thus, independence of the number of nodes and the network configuration, a state transition can be made at an optimum time so that flexible optical variable-attenuation control can be executed. If the network control and the node control are executed at a high speed, a recovery from a failure can be carried out in a short period of time.

Third Embodiment

Figure 12:
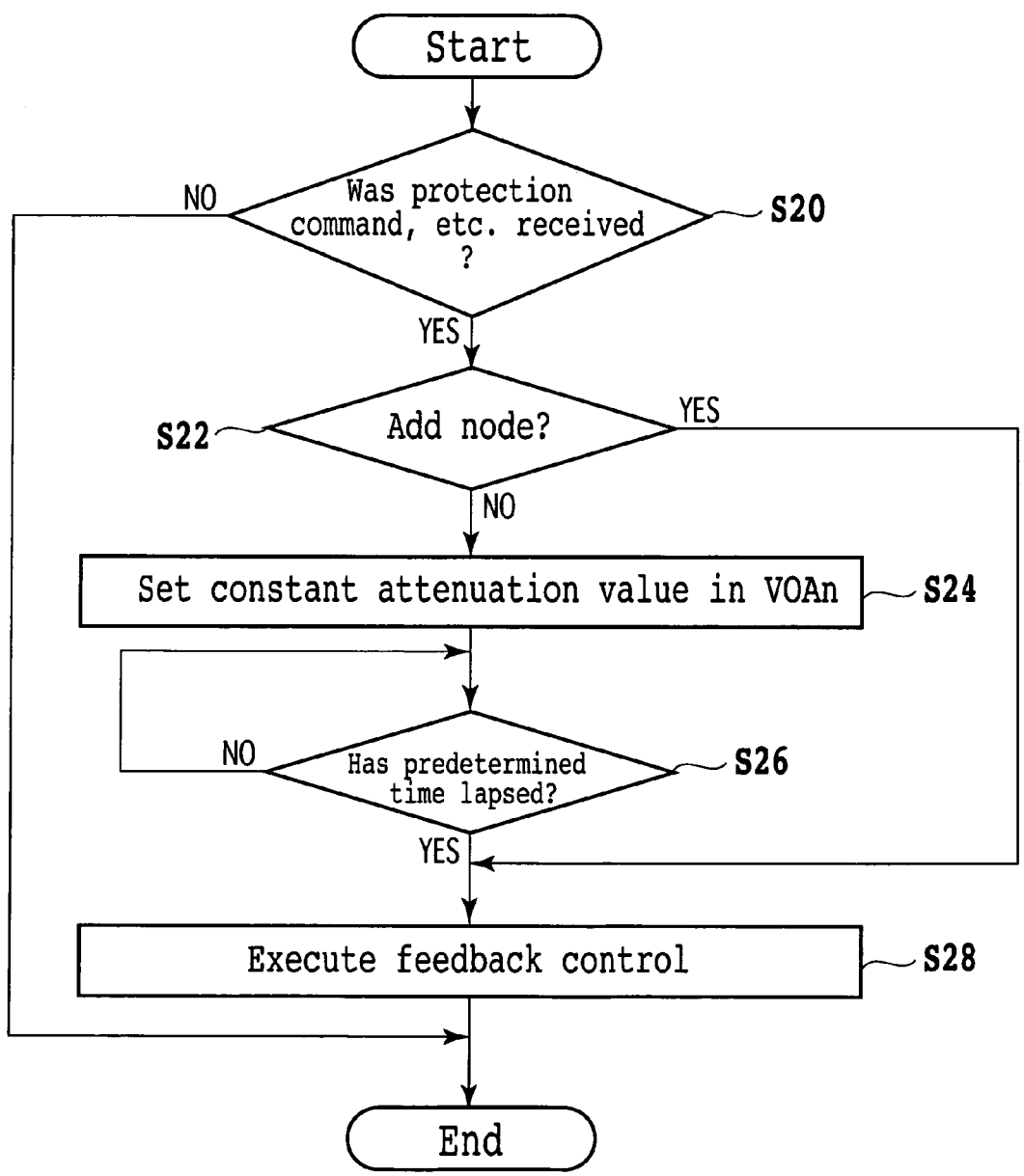
FIG. 12 shows a flowchart representing processing to detect a failure in accordance with a third embodiment of the present invention.

FIG. 12 shows a flowchart representing processing carried out by a control circuit 60#*ij* to detect a failure in accordance with a third embodiment of the present invention. This processing to detect a failure is carried out repeatedly at fixed time intervals.

As shown in the figure, the flowchart begins with a step S20 at which the control circuit 60#*ij* determines whether or not a protection command or a notice of a failure has been received. If a protection command or a notice of a failure has been received, the flow of the processing goes on to a step S22 at which the control circuit 60#*ij* determines whether or not the node of its own functions as an add node. If the node of its own functions as an add node, the flow of the processing goes on to a step S28 at which feedback control is executed and, then, the processing cycle is ended. If the determination result produced at the step S20 reveals that a protection command or a notice of a failure has not been received, on the other hand, the processing cycle is ended.

If the determination result produced at the step S22 reveals that the node of its own is not an add node, on the other hand, the flow of the processing goes on to a step S24 at which a constant attenuation value is read out from a memory embedded in the control circuit 60#*ij* and set in the variable optical attenuator VOA 14#*ij*The variable optical attenuator VOA 14#*ij* uses the locked ATT quantity to carry out a coarse adjustment.

The flow of the processing then goes to a step S26 at which the control circuit 60#*ij* determines whether or not a predetermined period of time has lapsed since reception of the protection command or the notice of the failure. If the predetermined period of time has lapsed since reception of the protection command or the notice of the failure, the flow of the processing goes to a step S28 at which the feedback control described above is executed to finely adjust the variable optical attenuator VOA 14#*ij*. Then, the processing cycle is ended. It is to be noted that the predetermined period of time is set at a value sufficiently longer than the time it takes to supply an optical signal to the variable optical attenuator VOA 14#*ij* employed in every node apparatus.

Figure 13:
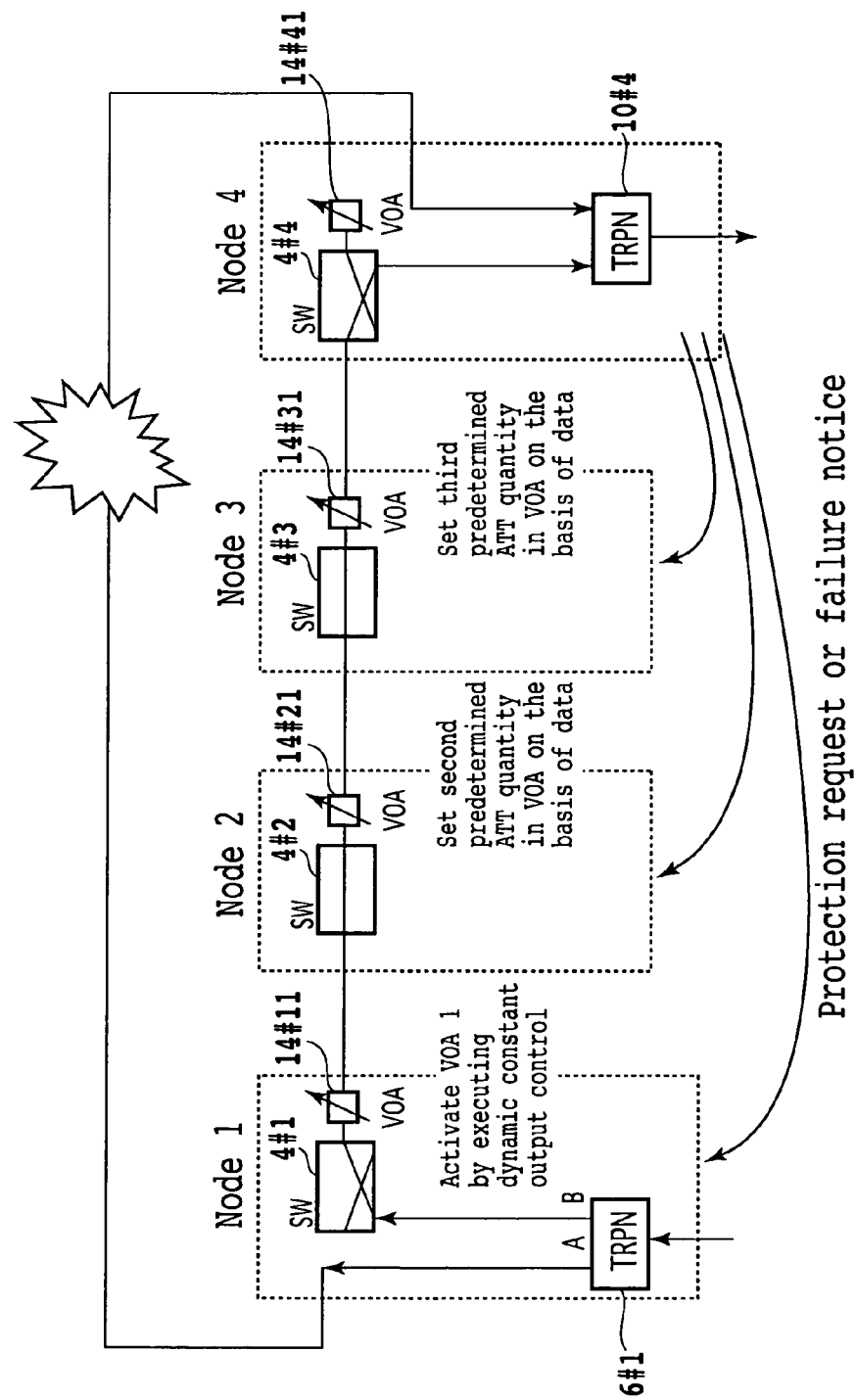
FIG. 13 is an explanatory diagram referred to in describing operations carried out by every node in the event of a failure.

If the node of its own is not an add node, the node functions as a thru node. In this case, triggered by the protection command or the failure notice, as shown in FIG. 13, the control circuits 60#21 and 60#31 employed respectively in nodes 2 and 3 each serving as a thru node read out constant attenuation values from embedded memories and set the values in variable optical attenuators 14#21 and 14#31 respectively. In the case of node 1 serving as an add node on the protection route, the control circuit 60#11 executes feedback control from the beginning to adjust the optical level of the optical signal output by the variable optical attenuator VOA 14#11 to a fixed level.

Figure 14A:
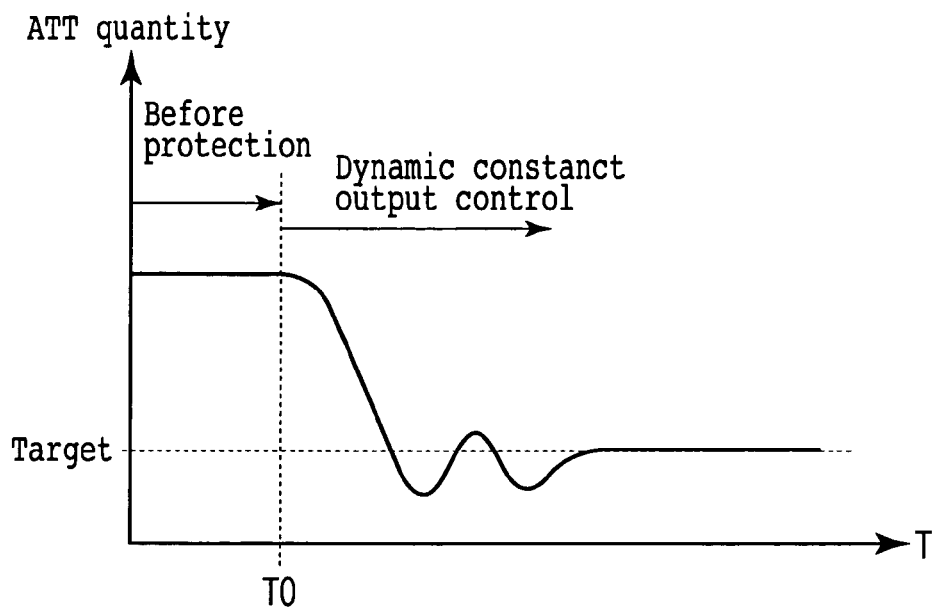
FIG. 14A is a diagram showing variations of an ATT quantity of a VOA employed in an add node as variations with the lapse of time.
Figure 14B:
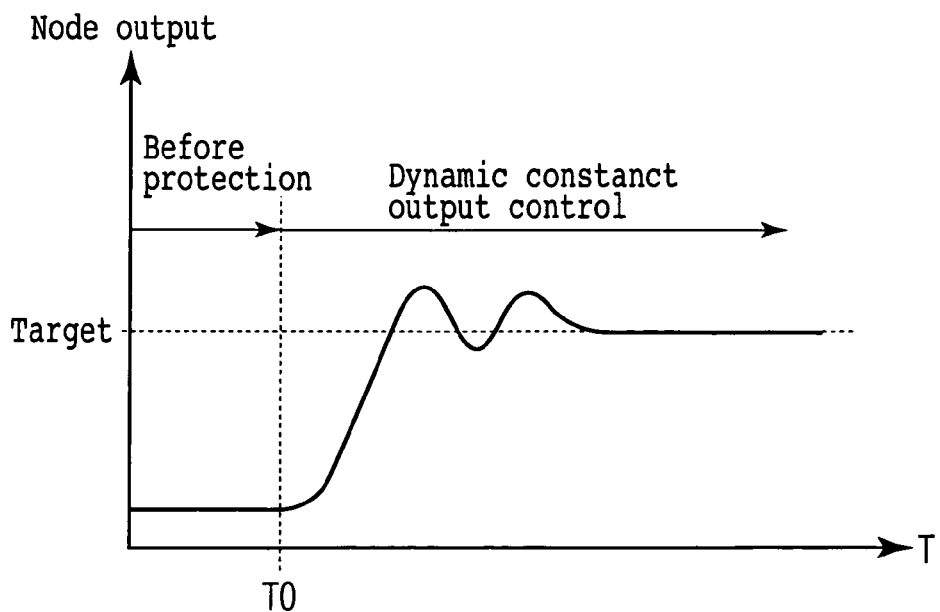
FIG. 14B is a diagram showing variations of the optical level of an optical signal output by a VOA employed in an add node as variations with the lapse of time.

FIG. 14A is a diagram showing variations of an ATT quantity of the variable optical attenuator VOA 14#*ij* employed in an add node carrying out the variable-attenuation optical attenuation control represented by the flowchart shown in FIG. 12 as variations with the lapse of time. FIG. 14B is a diagram showing variations of the optical level of an optical signal output by the variable optical attenuator VOA 14#*ij* employed in an add node carrying out the variable-attenuation optical attenuation control represented by the flowchart shown in FIG. 12 as variations with the lapse of time. In these figures, symbol T0 denotes a point of time at which the protection command (or the notice of the failure) cited above is received as a trigger.

Figure 15:
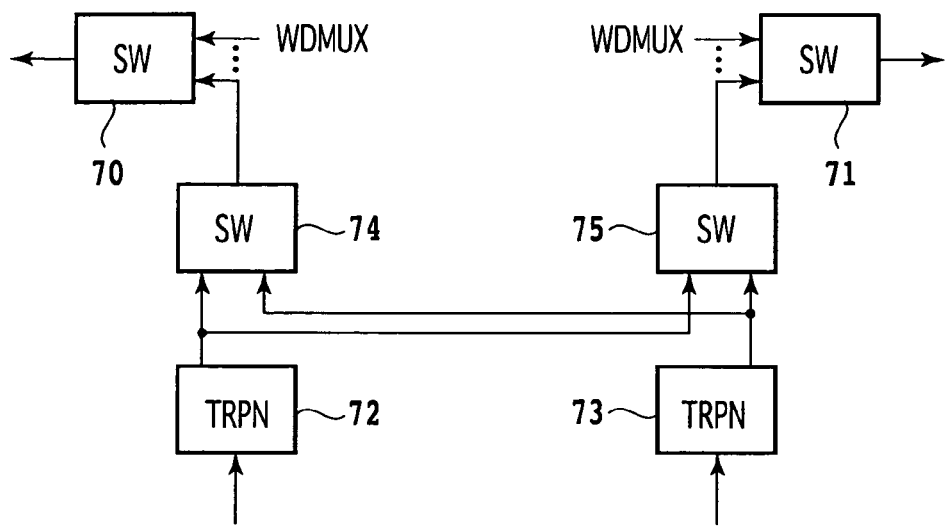
FIG. 15 is a diagram showing the configuration of an add node.

In this case, as shown in FIG. 15, the add node includes a transponder 72 and an optical switch 74 associated with an optical switch 70 for the optical switch SW 4#*i* for a path turning to the left. The add node also includes a transponder 73 and an optical switch 75 associated with an optical switch 71 for the optical switch SW 4#*i* for a path turning to the right. In this configuration, the optical switch 71 receives an optical signal from a demultiplexer (WDMUX) and an optical signal supplied by the transponder 72 or 73 by way of the optical switch 75. However, a loss incurred by the optical switch 75 causes a difference in optical-power level between the optical signal from the demultiplexer (WDMUX) and the optical signal supplied by the transponder 72 or 73 by way of the optical switch 75.

Also in such a case, an add node employed in this embodiment executes feedback control from the beginning so that post-switching differences in optical-power level can be absorbed. The post-switching differences in optical-power level are caused by, among others, variations in loss incurred on a route inside the add node. In addition, for every node, in accordance with a path inside a network and the location of a failure, two cases are conceivable. In one of cases, its own node functions as an add node while, in the other case, its own node functions as a node other than an add node. In either case, it is necessary to have data for the case. By execution of this control, however, this necessity is not required.

Fourth Embodiment

Figure 16:
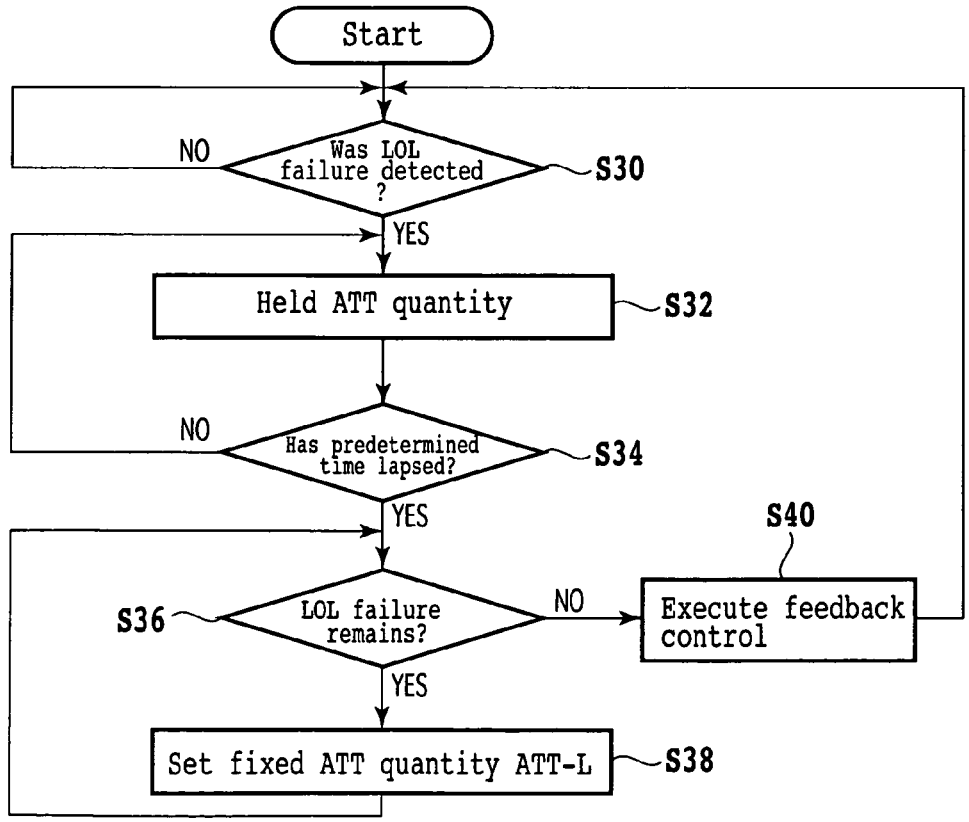
FIG. 16 shows a flowchart representing control processing carried out in the event of a temporary loss of light state of an optical signal in accordance with a fourth embodiment of the present invention.

FIG. 16 shows a flowchart representing control processing carried out by a control circuit 60#*ij* in the event of a temporary LOL (Loss Of Light) failure of an optical signal in accordance with a fourth embodiment of the present invention. As shown in the figure, the flowchart begins with a step S30 at which the control circuit 60#*ij* determines whether or not an LOL failure has been detected in the node of its own. If an LOL failure has been detected in the node of its own, the flow of the processing goes on to a step S32 at which the control circuit 60#*ij* stores an attenuation value of the variable optical attenuator VOA 14#*ij* executing the feedback control in an embedded memory and sets the attenuation value in the variable optical attenuator VOA 14#*ij*.

Then, at the next step S34, the control circuit 60#*ij* determines whether or not a predetermined period of time has lapsed. If the predetermined period of time has not lapsed, the flow of the processing goes on to the step S32 and, then, the processes of the step S32 and S34 are carried out again. The processing of the step S34 is carried out repeatedly. As the predetermined period of time lapses, the flow of the processing goes on to a step S36. If the predetermined period of time has lapsed, at the step 36, the control circuit 60#*ij* determines whether or not an LOL failure has been detected. If an LOL failure has been detected in the node of its own at the step S36, the flow of the processing goes on to a step S38 at which the control circuit 60#*ij* sets a constant attenuation value ATT-L in the variable optical attenuator VOA 14#*ij*, then the processing goes back to the step S36. The constant attenuation value ATT-L is greater than an attenuation value for the normal feedback control. If a determination result produced at the step S36 reveals that an LOL failure has been corrected, the flow of the processing goes on to a step S40 at which the control circuit 60#*ij* executes the feedback control. Then, the flow of the processing goes back to a step S30.

Assume for example that a client signal supplied to the transponder 72 is passed on to the optical switch 71 by way of the optical switch 75 as shown in FIG. 15. In this state, assume that a failure occurs on the client side. In this case, the optical switch 75 replaces the client signal supplied from the transponder 72 with a client signal supplied from the transponder 73, and time it takes to switch the optical switch 75 from the client signal to the other results in a temporary LOL failure state of the client signal supplied to the optical switch 71.

Figure 17A:
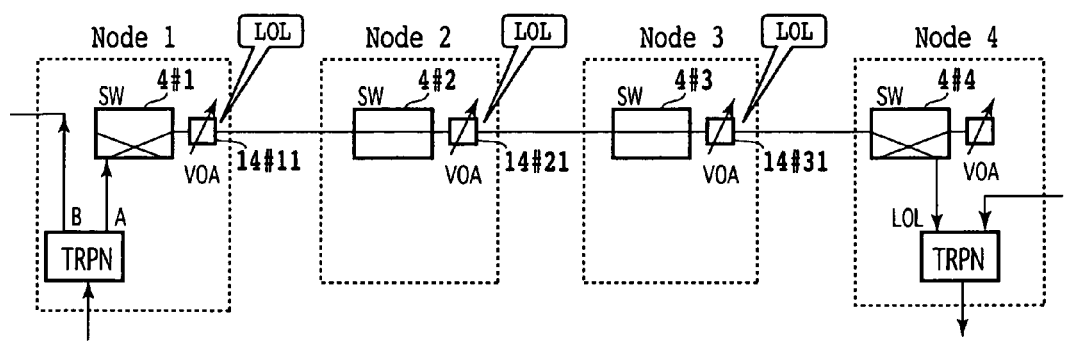
FIG. 17A is a diagram showing operations, which are performed when an optical signal disappears on a temporary basis as the control processing carried out in the event of a temporary loss of light state.
Figure 17B:
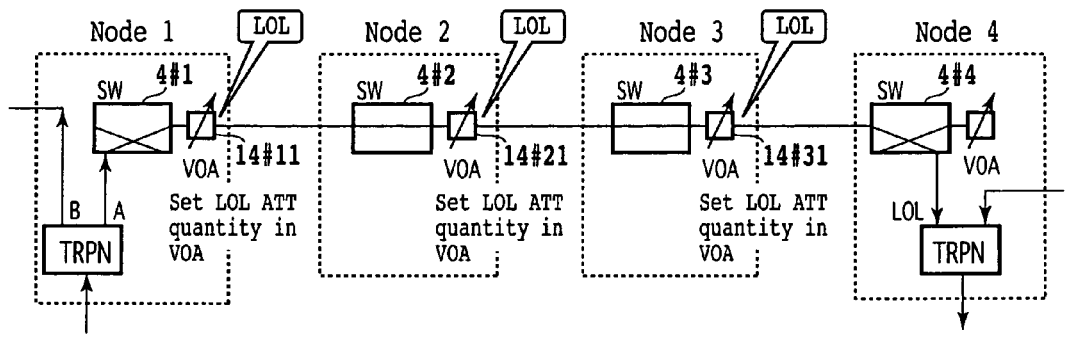
FIG. 17B is another diagram showing operations, which are performed when an optical signal disappears on a temporary basis as the control processing carried out in the event of a temporary loss of light state.
Figure 17C:
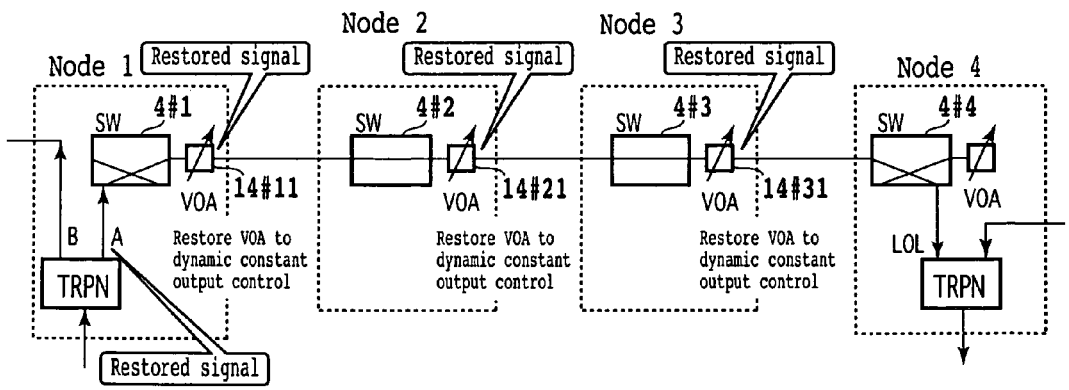
FIG. 17C is a further diagram showing operations, which are performed when an optical signal disappears on a temporary basis as the control processing carried out in the event of a temporary loss of light state.

FIGS. 17A, 17B and 17C are each a diagram showing operations, which are performed when an optical signal disappears on a temporary basis as the control processing carried out in the event of a temporary LOL failure state. To be more specific, FIG. 17A shows a case in which a temporary LOL failure of an optical signal occurs in a work route comprising nodes 1, 2, 3 and 4. In this case, the control circuits 60#*ij* where i=1, 2 and 3 employed in nodes 1, 2 and 3 respectively detects LOL failures independently of each other.

Then, as shown in FIG. 17B, the control circuits 60#*ij* where i=1, 2 and 3 employed in nodes 1, 2 and 3 respectively hold attenuation values of the variable optical attenuators 14#*ij* where i=1, 2 and 3 in embedded memories and set the attenuation values respectively in the variable optical attenuators 14#*ij* where i=1, 2 and 3.

After that, as the temporary LOL failure state of the optical signal is ended, the control circuits 60#*ij* where i=1, 2 and 3 employed in nodes 1, 2 and 3 respectively make transitions to the feedback control of the variable optical attenuators 14#*ij* where i=1, 2 and 3 to adjust the levels of optical signals output by the variable optical attenuators 14#*ij* where i=1, 2 and 3 to a constant value as shown in FIG. 17C.

Figure 18A:
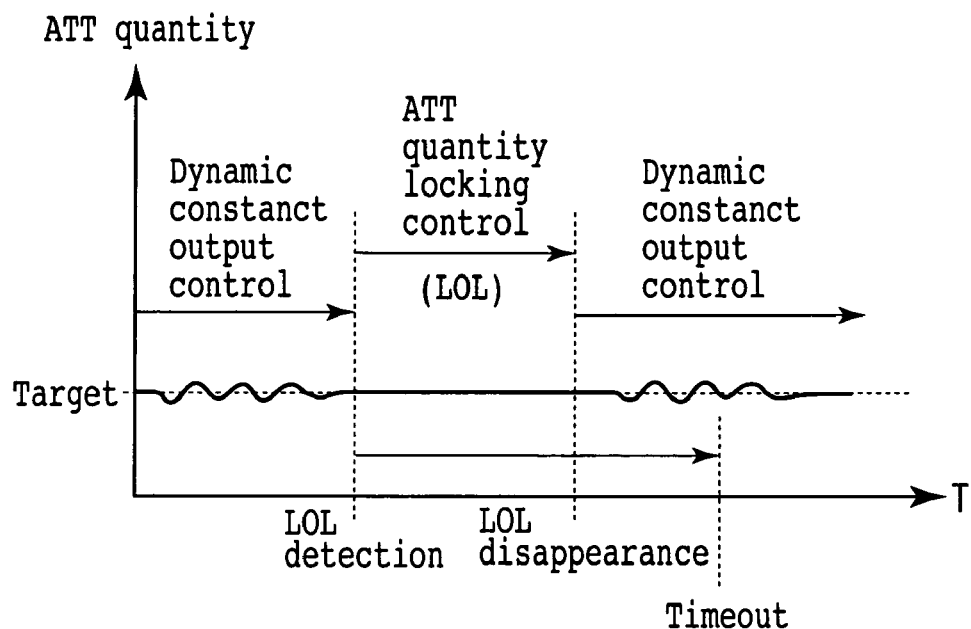
FIG. 18A is a diagram showing variations of an ATT quantity of a VOA employed in each node as variations with the lapse of time during the control processing carried out in the event of a temporary loss of light state.
Figure 18B:
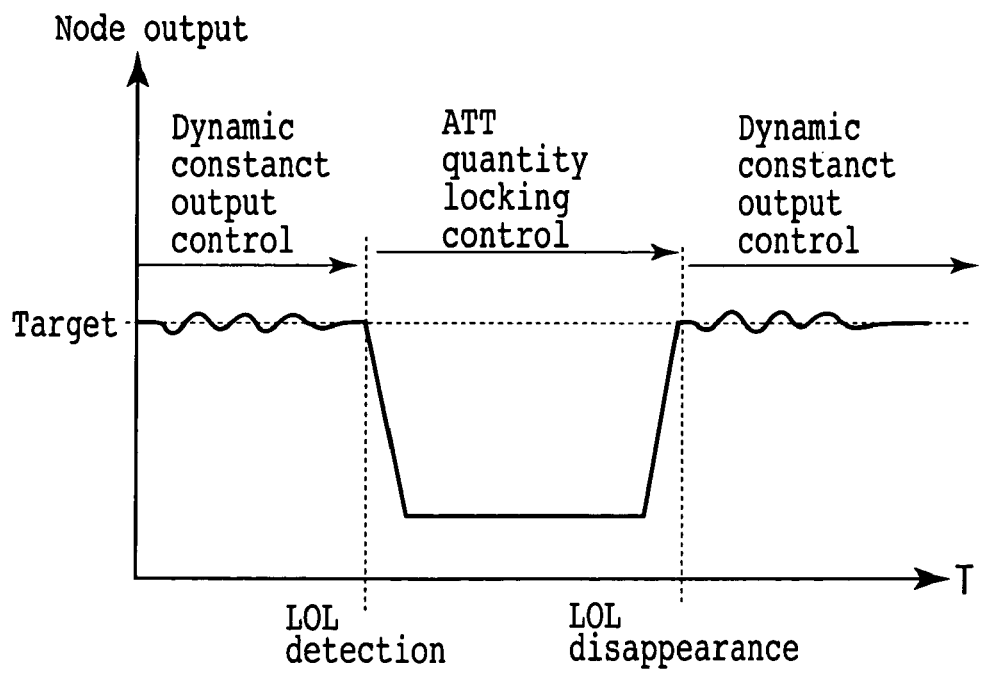
FIG. 18B is a diagram showing variations of the optical level of an optical signal output by a VOA employed in each node as variations with the lapse of time during the control processing carried out in the event of a temporary loss of light state.

FIG. 18A is a diagram showing variations of the ATT quantity of the variable optical attenuator VOA 14#*ij* carrying out the LOL failure control processing represented by the flowchart shown in FIG. 16 in a node as variations with the lapse of time during the control processing carried out in the event of a temporary LOL failure. FIG. 18B is a diagram showing variations of the optical level of an optical signal output by the variable optical attenuator VOA 14#*ij* carrying out the LOL failure control processing represented by the flowchart shown in FIG. 16 in a node as variations with the lapse of time during the control processing carried out in the event of a temporary LOL failure. In the diagrams of FIGS. 18A and 18B, a period of time between detection of a temporary LOL failure and disappearance of the temporary LOL failure is equal to or shorter than a predetermined period of time.

Figure 19A:
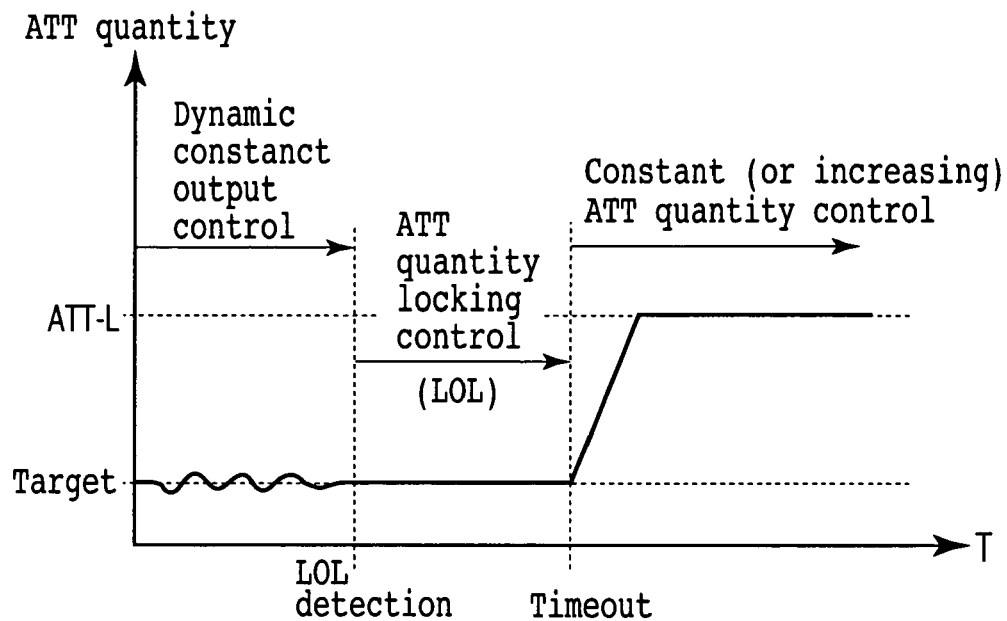
FIG. 19A is another diagram showing variations of an ATT quantity of a VOA employed in each node as variations with the lapse of time during the control processing carried out in the event of a temporary loss of light state.
Figure 19B:
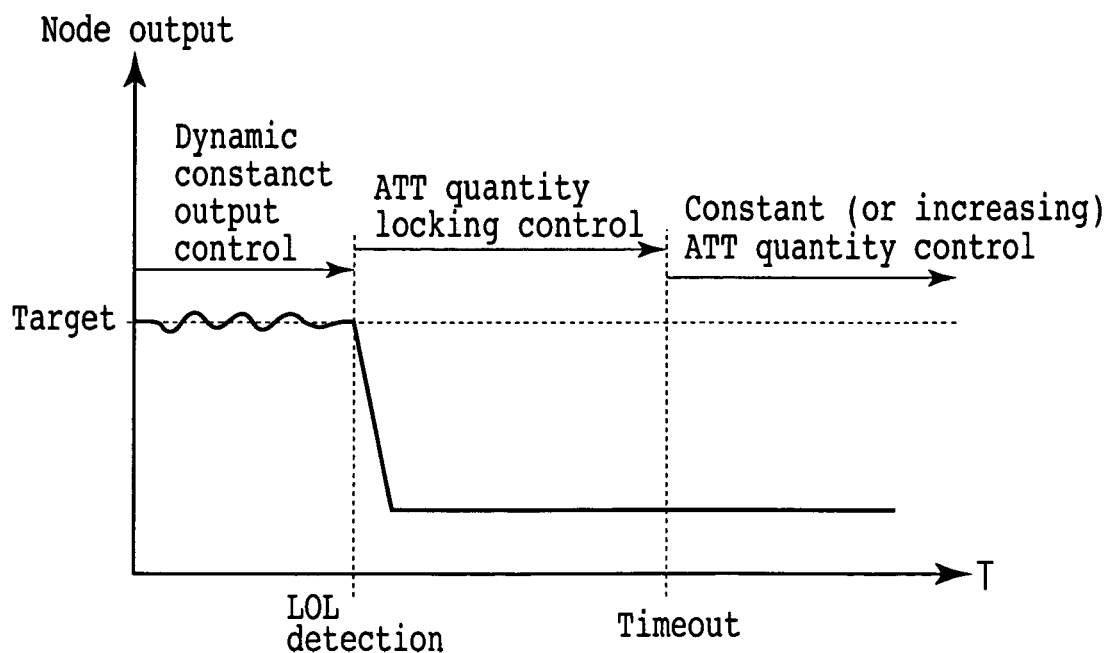
FIG. 19B is another diagram showing variations of the optical level of an optical signal output by a VOA employed in each node as variations with the lapse of time during the control processing carried out in the event of a temporary loss of light state.

FIG. 19A is another diagram showing variations of the ATT quantity of the variable optical attenuator VOA 14#*ij* carrying out the LOL failure control processing represented by the flowchart shown in FIG. 16 in a node as variations with the lapse of time during the control processing carried out in the event of a temporary LOL failure. FIG. 19B is another diagram showing variations of the optical level of an optical signal output by the variable optical attenuator VOA 14#*ij* carrying out the LOL failure control processing represented by the flowchart shown in FIG. 16 in a node as variations with the lapse of time during the control processing carried out in the event of a temporary LOL failure. In the diagrams of FIGS. 19A and 19B, a timeout occurs after a predetermined period of time lapses since the start of the temporary LOL failure state with the temporary LOL failure remaining uncorrected.

Thus, it is possible to get rid of an optical surge caused by the fact that, in the event of an LOL failure, the variable optical attenuator VOA 14#*ij* reduces the ATT quantity of the variable optical attenuator VOA 14#*ij* without discretion and, as the optical signal is recovered from the LOL failure state, the ATT quantity of the variable optical attenuator VOA 14#*ij* remains at an insufficient value. In addition, if a large change in optical level does not remain after the optical signal is recovered from the LOL failure state, the magnitude of the fine adjustment is small so that the optical power can be adjusted to a target level in a short period of time.

Fifth Embodiment

Figure 20:
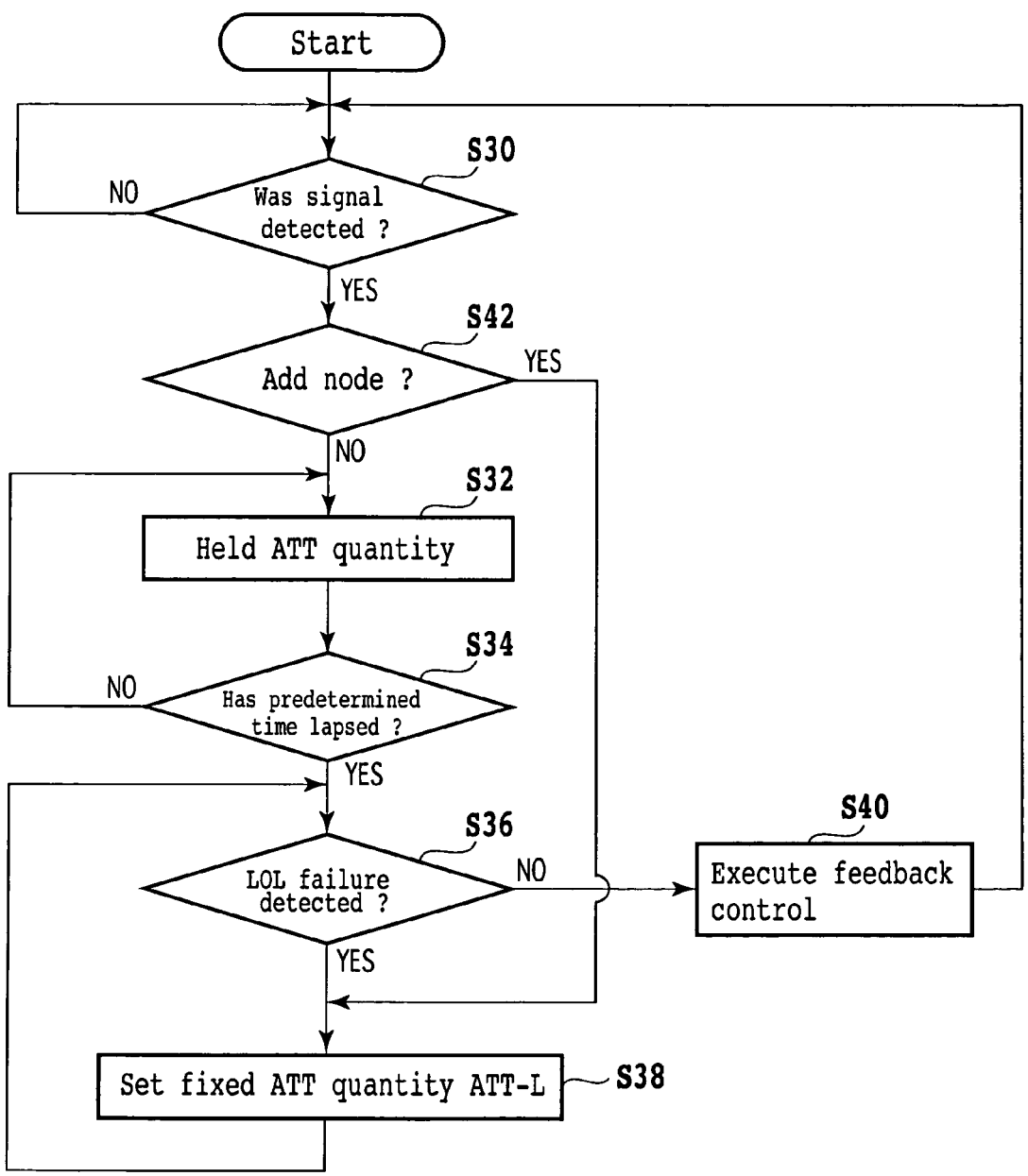
FIG. 20 shows a flowchart representing control processing carried out in the event of a temporary loss of light state of an optical signal in accordance with a fifth embodiment of the present invention.

FIG. 20 shows a flowchart representing control processing carried out by a control circuit 60#*ij* in the event of a temporary LOL failure of an optical signal in accordance with a fifth embodiment of the present invention. In the flowchart shown in this figure, steps identical with their counterparts of the flowchart shown in FIG. 16 are denoted by the same reference numerals as the counterparts. The flowchart shown in FIG. 20 begins with a step S30 at which the control circuit 60#*ij* determines whether or not a LOL failure has been detected in the node of its own. If a LOL failure has been detected in the node of its own, the flow of the processing goes on to a step S42 at which the control circuit 60#*ij* determines whether or not the node of its own functions as an add node. If the node of its own functions as an add node, the flow of the processing goes on to a step S38 at which the control circuit 60#*ij* sets a constant attenuation value ATT-L in the variable optical attenuator VOA 14#*ij*.

If the node of its own does not function as an add node, the flow of the processing goes on to a step S32 at which the control circuit 60#*ij* stores an attenuation value of the variable optical attenuator VOA 14#*ij* executing the feedback control in an embedded memory and sets the attenuation value in the variable optical attenuator VOA 14#*ij*. Then, at the next step S34, the control circuit 60#*ij* determines whether or not a predetermined period of time has lapsed. If the predetermined period of time has not lapsed, the flow of the processing goes back to the step S32 and, then, the processing of the step S32 and S34 is carried out again. The processing of the step S34 is carried out repeatedly in a state of waiting for the predetermined period of time to lapse. As the predetermined period of time lapses, the flow of the processing goes on to a step S36 at which the control circuit 60#*ij* determines whether or not an LOL failure remains uncorrected. If an LOL failure remains uncorrected, the flow of the processing goes on to a step S38 at which the control circuit 60#*ij* sets a constant attenuation value ATT-L in the variable optical attenuator VOA 14#*ij*.

If a determination result produced at the step S36 reveals that an LOL failure has been corrected, that is, if the LOL failure state has disappeared, the flow of the processing goes on to a step S40 at which the control circuit 60#*ij* executes the feedback control. Then, the flow of the processing goes back to the step S30.

Figure 21A:
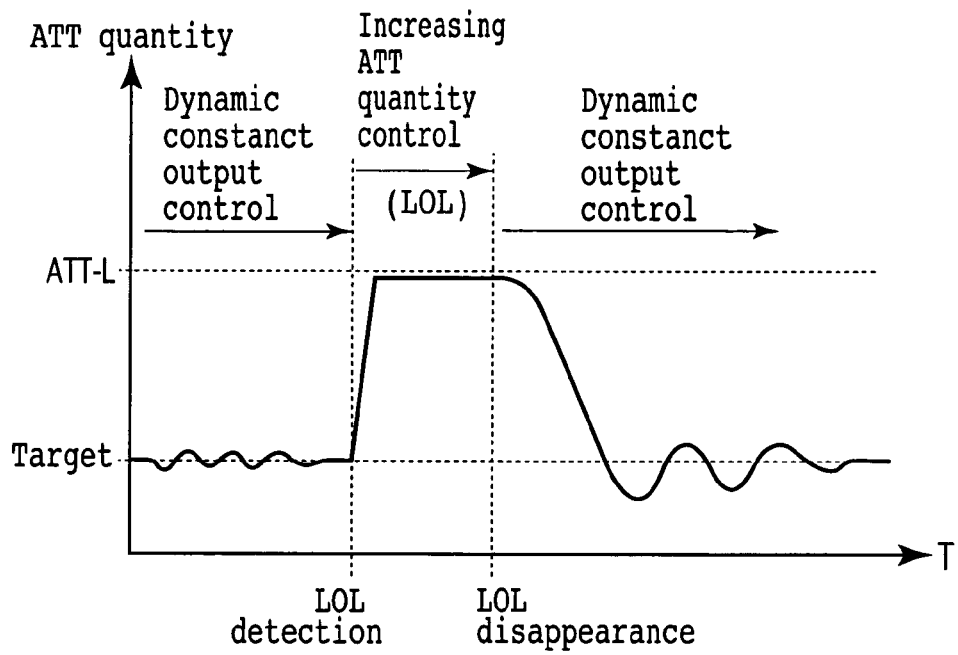
FIG. 21A is a diagram showing variations of an ATT quantity of a VOA employed in each node as variations with the lapse of time during the control processing carried out in the event of a temporary loss of light state.
Figure 21B:
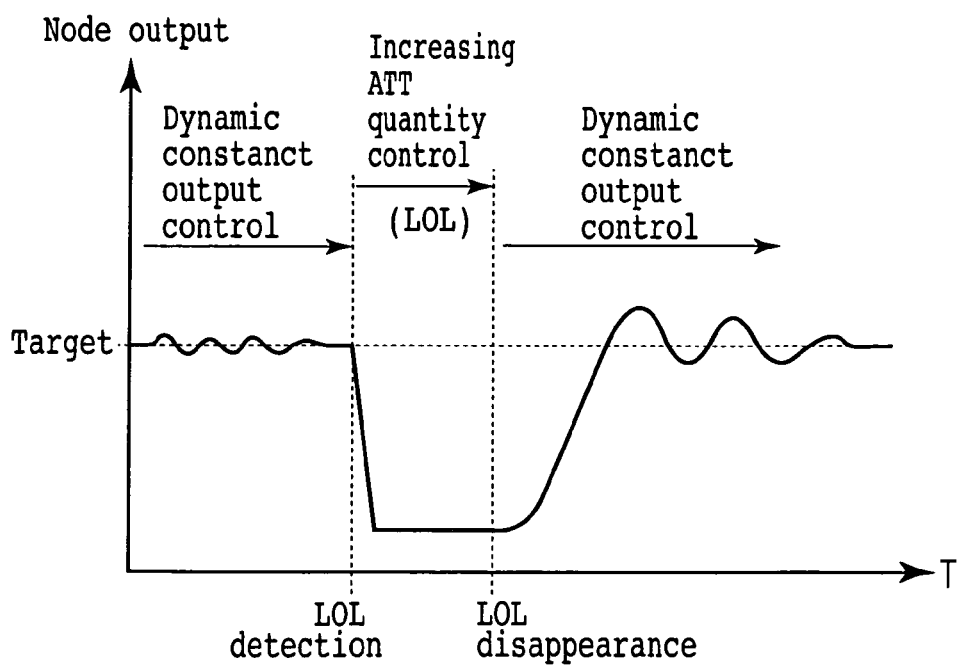
FIG. 21B is a diagram showing variations of the optical level of an optical signal output by a VOA employed in each node as variations with the lapse of time during the control processing carried out in the event of a temporary loss of light state.

FIG. 21A is a diagram showing variations of an ATT quantity of the variable optical attenuator VOA 14#*ij* employed in a node as variations with the lapse of time during the control processing represented by the flowchart shown in FIG. 20 as processing carried out in the event of a temporary LOL failure. FIG. 21B is a diagram showing variations of the optical level of an optical signal output by the variable optical attenuator VOA 14#*ij* as variations with the lapse of time during the control processing represented by the flowchart shown in FIG. 20 as processing carried out in the event of a temporary LOL failure.

Figure 22A:
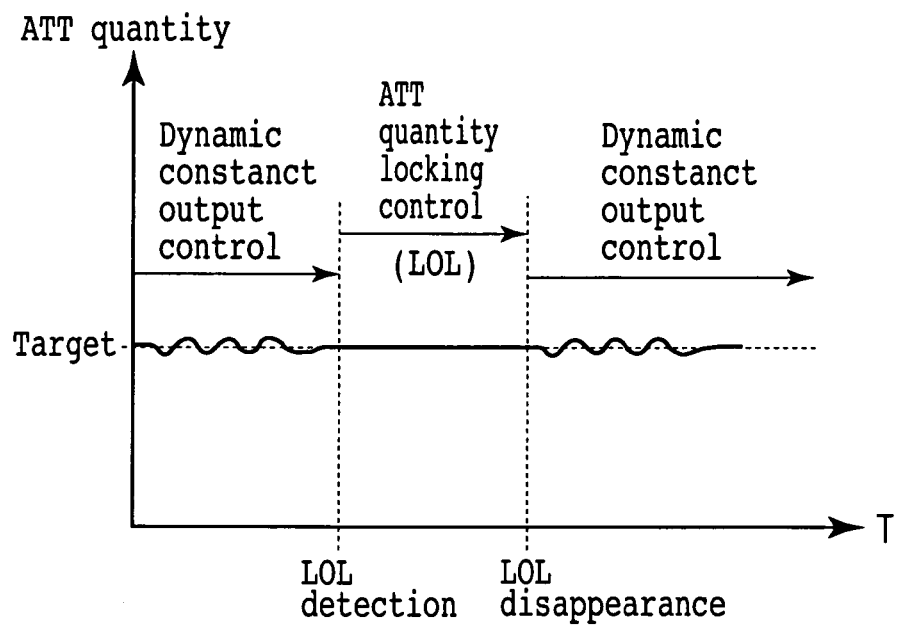
FIG. 22A is another diagram showing variations of an ATT quantity of a VOA employed in each node as variations with the lapse of time during the control processing carried out in the event of a temporary loss of light state.
Figure 22B:
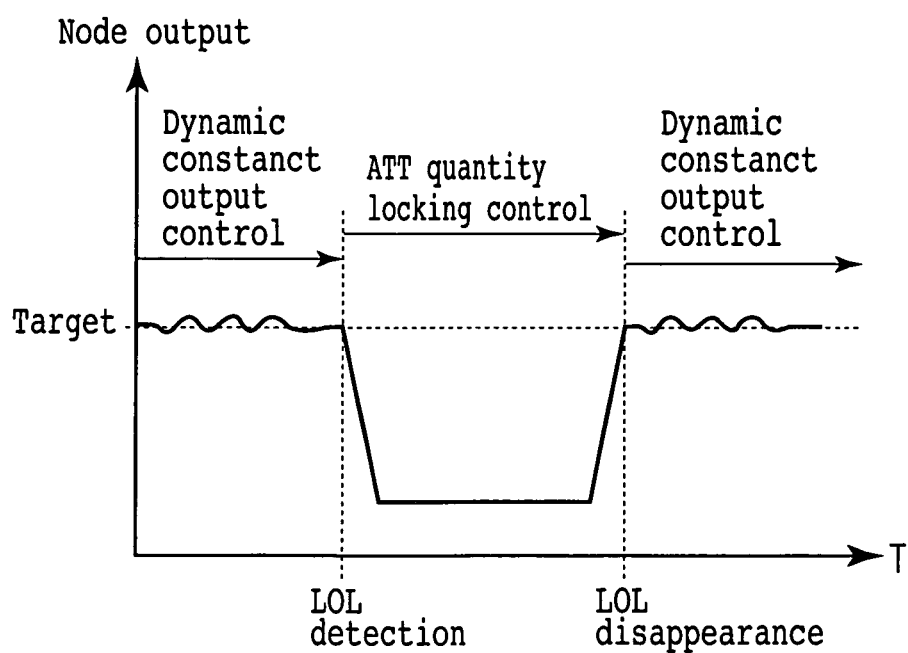
FIG. 22B is another diagram showing variations of the optical level of an optical signal output by a VOA employed in each node as variations with the lapse of time during the control processing carried out in the event of a temporary loss of light state.

As described above, a LOL failure causes a constant attenuation value ATT-L close to a maximum to be set in the variable optical attenuator VOA 14#*ij* of an add node so that, when the node receives an optical signal having a high optical level after the LOL failure disappears, induction of an optical surge can be avoided. By the way, much like FIGS. 21A and 21B, FIG. 22A is also a diagram showing variations of an ATT quantity of the variable optical attenuator VOA 14#*ij* employed in a node as variations with the lapse of time during the control processing represented by the flowchart shown in FIG. 20 as processing carried out in the event of a temporary LOL failure state whereas FIG. 22B is also a diagram showing variations of the optical level of an optical signal output by the variable optical attenuator VOA 14#*ij* employed in a node as variations with the lapse of time during the control processing represented by the flowchart shown in FIG. 20 as processing carried out in the event of a temporary LOL failure state. In the case of FIGS. 22A and 22B, however, the steps S36 and S38 are eliminated from the processing represented by the flowcharts shown FIGS. 16 and 20 and, if the determination result produced at the step S36 reveals that the LOL failure remains, the flow of the processing returns to the step S36 to repeat the determination processing of the step S36. The determination processing of the step S36 is carried out repeatedly in a state of waiting for the LOL failure to disappear.

As described above, during the period of an LOL failure, the attenuation value held in the event of the LOL failure is set in the variable optical attenuator VOA 14#*ij* to reduce the length of time it takes to make an adjustment when the LOL failure disappears.

Figure 23:
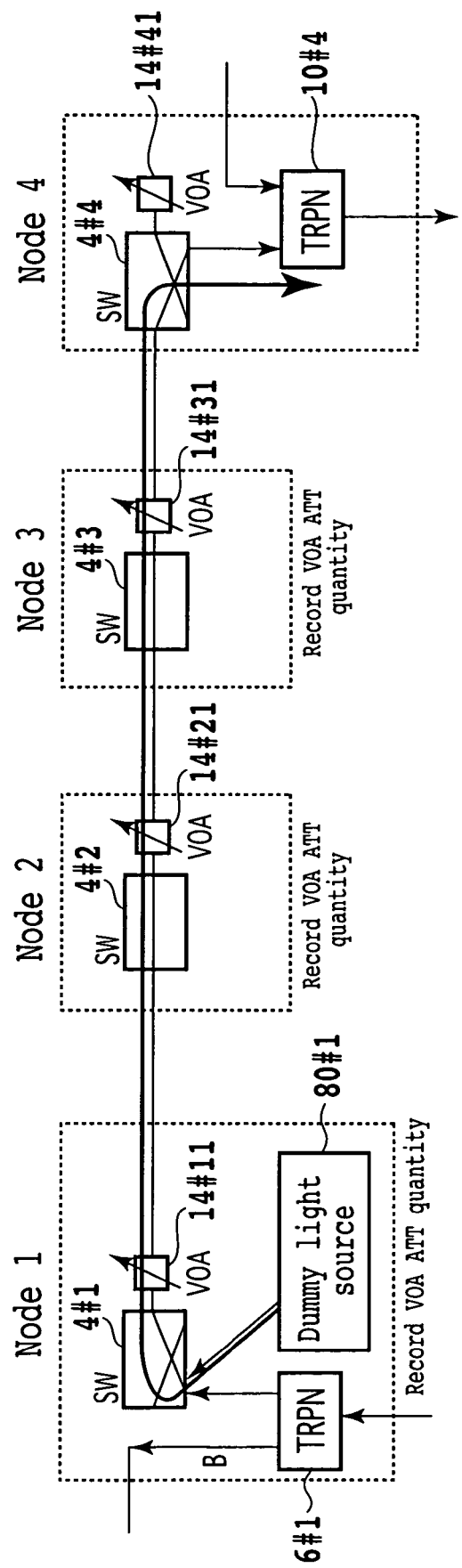
FIG. 23 is an explanatory diagram referred to in describing a method to determine a constant attenuation value.

FIG. 23 is an explanatory diagram showing a method to determine a constant attenuation value to be stored in a memory embedded in the control circuit 60#*ij* employed in each node. A dummy optical beam generated by a dummy-light source 80#1 employed in node 1 serving as an add node is supplied to the optical switch SW 4#1 in advance prior to system activation periodically or non-periodically and propagated to node 4 through an optical path passing through nodes 2 and 3. Typically a timer is used to monitor the period if the optical beam is supplied to the optical switch SW 4#1 periodically. On the other hand, the optical beam is supplied manually in a non-periodical manner.

While the dummy optical beam is being supplied, the control circuits 60#11, 60#21 and 60#31 employed in nodes 1, 2 and 3 respectively each execute feedback control to adjust the optical signals output by the variable optical attenuators VOA 14#11, 14#21 and 14#31 respectively to a constant level. At a later point of time, the attenuation values of the variable optical attenuators VOA 14#11, 14#13 and 14#13 are each taken as a constant attenuation value and stored in memories embedded in the control circuits 60#11, 60#21 and 60#31 respectively. It is to be noted that the dummy-light source can be a dedicated or shared optical-beam source.

Sixth Embodiment

Figure 24:
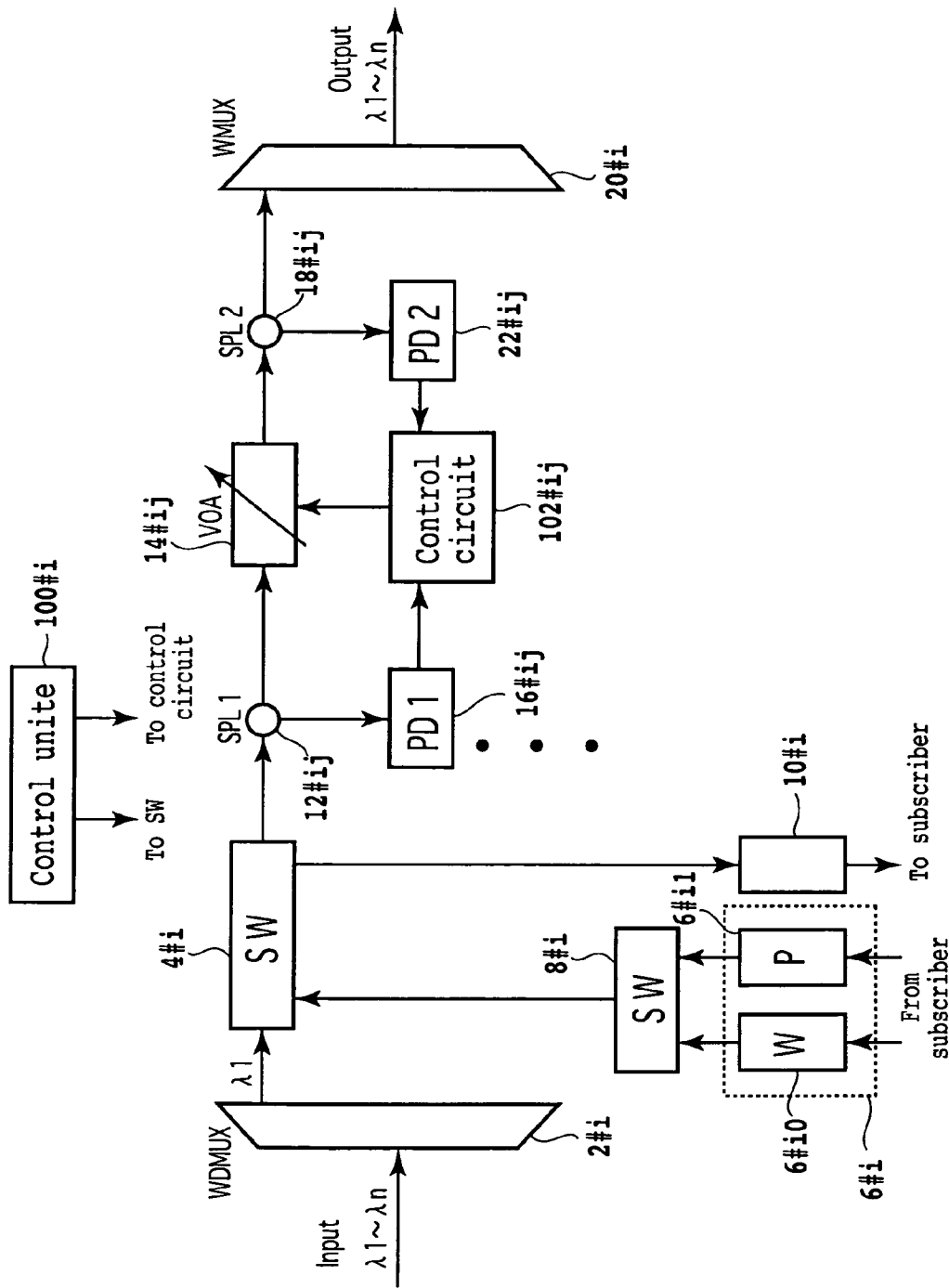
FIG. 24 is a diagram showing the configuration of a node implemented by a sixth embodiment of the present invention.
Figure 86:
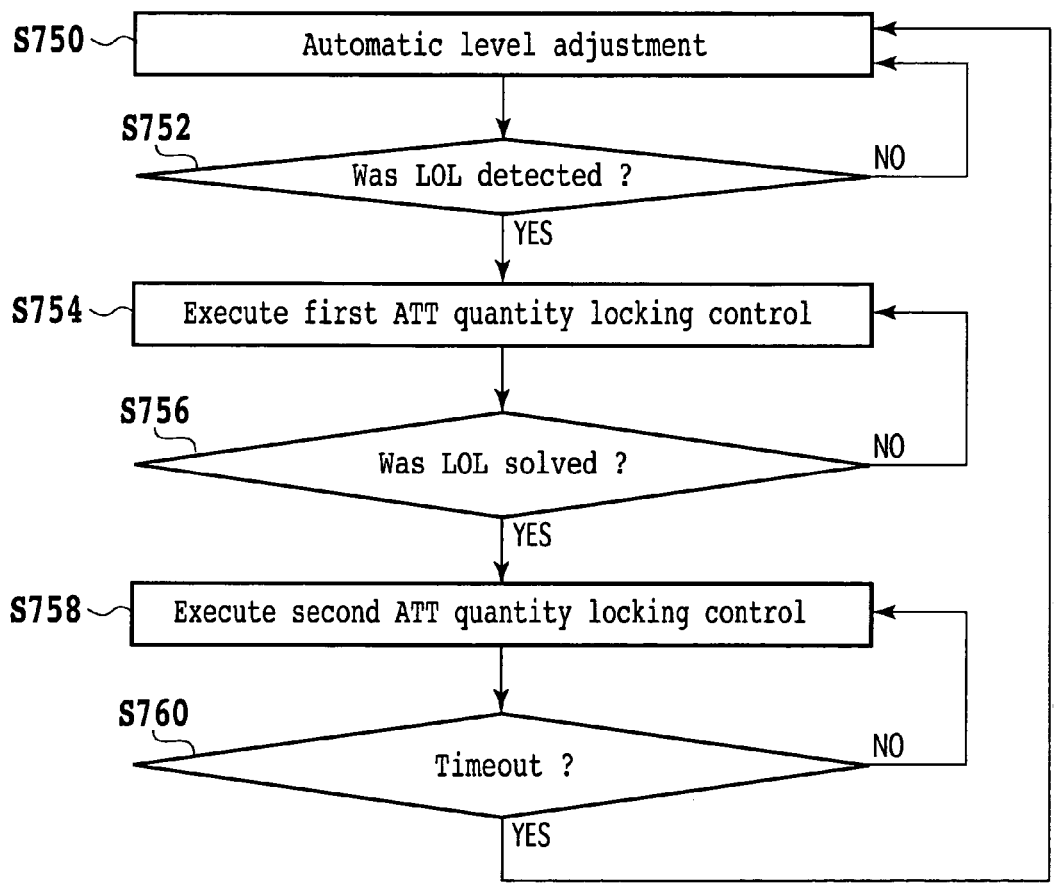
FIG. 86 shows a flowchart representing operations carried out by a control circuit employed in an add node implemented by a fourteenth embodiment of the present invention.

FIG. 24 is a diagram showing the configuration of a node implemented by a sixth embodiment of the present invention. In this figure, configuration elements virtually identical with their respective counterparts employed in the configuration shown in FIG. 86 are denoted by the same reference numerals as the counterparts. As shown in the figure, the node comprises a demultiplexer WDMUX 2#*i*, an optical switch SW 4#*i*, a transponder (TRPN) transmitter 6#*i*, an optical switch SW 8#*i*, a transponder (TRPN) receiver 10#*i*, a first optical splitter SPL 12#*ij* where j=1 to n, a variable optical attenuator VOA 14#*ij* where j=1 to n, a first monitor PD 16#*ij* where j=1 to n, a second optical splitter SPL 18#*ij* where j=1 to n, a multiplexer WMUX 20#*i*, a second monitor PD 22#*ij* where j=1 to n, a control unit 100#*i* and a control circuit 102#*ij* where j=1 to n.

The control unit 100#*i* controls and monitors information on all failures and operations carried out by all elements employed in the entire node including the switches and other functional units. To put it concretely, the control unit 100#*i* has the following functions:

(1): manage information on failures generated internally and notices received from other nodes as information on failures generated in the other nodes;

(2): control the optical switch SW 8#*i* on the basis of information on a failure in order to switch an optical path from the work system to a protection system; and (3): notify the control circuit 102#*ij* of whether the node functions as an add or thru node of an optical signal subjected to control executed by the control circuit 102#*ij* as control of the ATT quantity.

Figure 25:
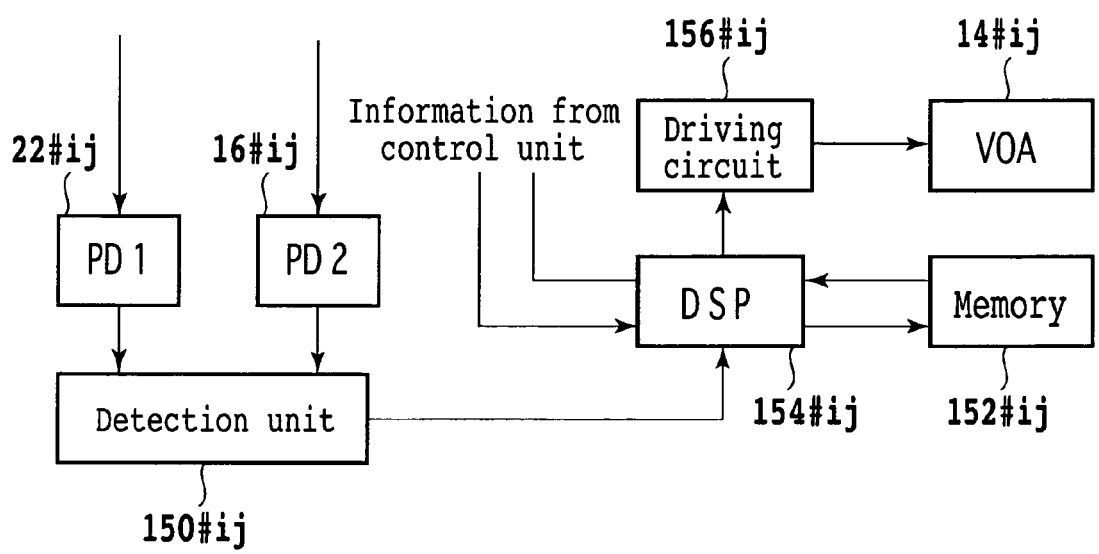
FIG. 25 is a diagram showing the configuration of a control circuit employed in the sixth embodiment shown in FIG. 24.

FIG. 25 is a diagram showing the configuration of the control circuit 102#*ij* employed in the node implemented by the sixth embodiment shown in FIG. 24. As shown in FIG. 25, the control circuit 102#*ij* comprises a detection unit 150#*ij*, a memory 152#*ij*, a DSP (Digital Signal Processor) 154#*ij* and a driving circuit 156#*ij*. The detection unit 150#*ij* has the following functions:

(1): detect an LOL failure from electrical signals or information conveyed by the signals obtained as a result of converting the levels of optical signals output by the first monitor PD 16#*ij* and the second monitor PD 22#*ij* and output an LOL failure detection signal;

(2): detect disappearance of an LOL failure from electrical signals or information conveyed by the signals obtained as a result of converting the levels of optical signals output by the first monitor PD 16#*ij* and the second monitor PD 22#*ij* and output a detection signal indicating the disappearance of the LOL failure; and (3): detect a difference between the level of an optical signal and a target level in automatic adjustment of the optical level. However, it may be the DSP 154#*ij* that detects the difference in some implementations.

If the node functions as an add node of an optical signal subjected to control of an optical level, the memory 152#*ij* is used for storing a constant value of the ATT quantity of the variable optical attenuator VOA 14#*ij*. This constant value is used in control of the optical level in the event of an LOL failure. The memory 152#*ij* is also used for storing another constant value of the ATT quantity of the variable optical attenuator VOA 14#*ij*. This other constant value is used in control of the optical level when the LOL failure disappears. If the node functions as a thru node, on the other hand, the memory 152#*ij* is used for storing an ATT quantity of the variable optical attenuator VOA 14#*ij* and a target value. This ATT quantity of the variable optical attenuator VOA 14#*ij* is an ATT quantity applied right after an LOL failure. However, these values may be stored in a memory embedded in the DSP 154#*ij* in some cases. In addition, the memory 152#*ij* or the memory embedded in the DSP 154#*ij* may also be used for storing data such as information indicating whether the node functions as an add or thru node, a threshold level for the LOL failure and a threshold level for the recovery from an LOL failure. The driving circuit 156#*ij* is a component for driving the variable optical attenuator VOA 14#*ij* in accordance with control executed by the DSP 154#*ij*.

Figure 26:
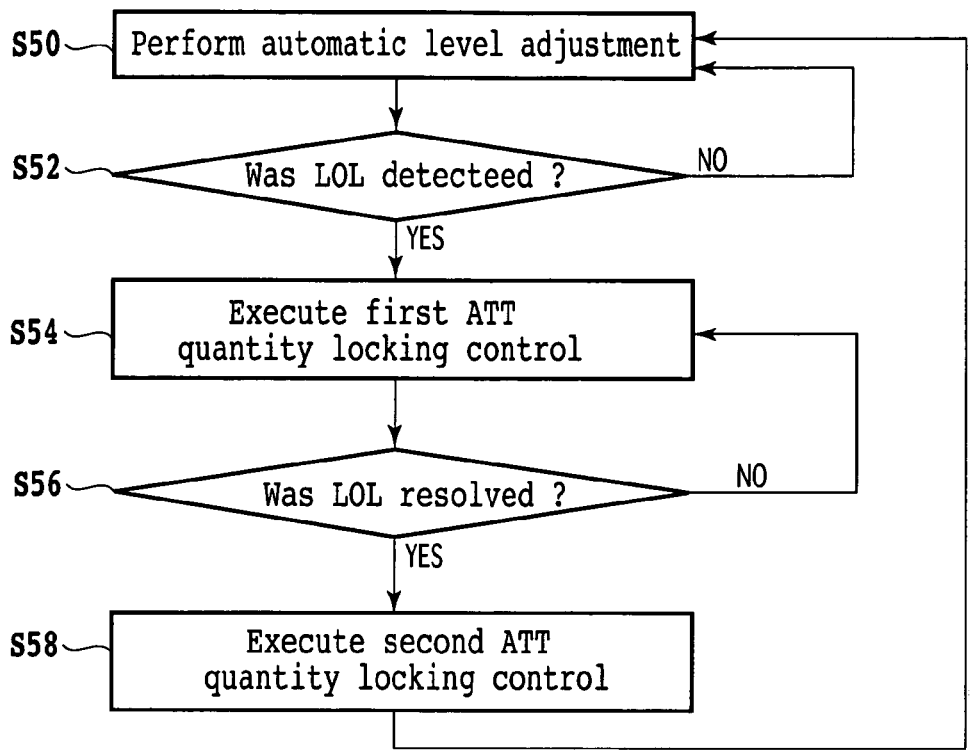
FIG. 26 shows a flowchart representing operations carried out by the control circuit employed in an add node.
Figure 27:
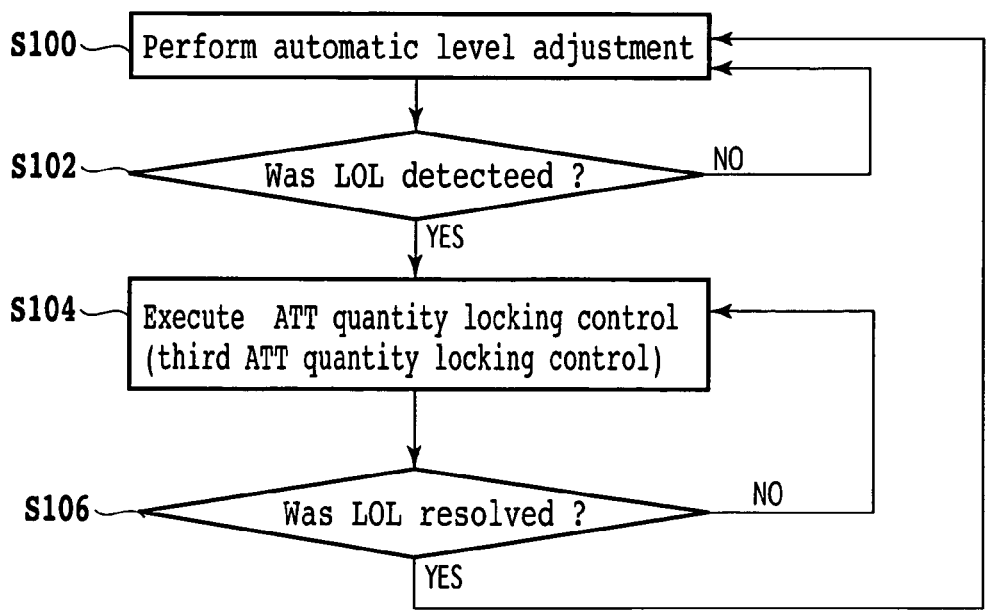
FIG. 27 shows a flowchart representing operations carried out by the control circuit employed in a thru node.

FIG. 26 shows a flowchart representing operations, which are carried out by the DSP 154#*ij* if the node employing the DSP 154#*ij* functions as an add node. FIG. 27 shows a flowchart representing operations, which are carried out by the DSP 154#*ij* if the node employing the DSP 154#*ij* functions as a thru node. The control unit 102#*i* informs the control circuit 100#*ij* of whether the node functions as an add or thru node. The DSP 154#*ij* can also be implemented as an MPU and software executed by the MPU or as hardware such a FPGA or an ASIC.

(1): The Node Functions as an Add Node.

The flowchart shown in FIG. 26 begins with a step S50. At this step, the DSP 154#*ij* carries out automatic adjustment of the optical level of an optical signal output by the variable optical attenuator VOA 14#*ij* to set the optical level of the optical signal at a target level on the basis of optical levels of optical signals output by the first monitor PD 16#*ij* and the second monitor PD 22#*ij* in a normal state in which neither an LOL failure detection signal nor an LOL failure-disappearance detection signal are output. Then, at the next step S52, the DSP 154#*ij* determines whether or not an LOL failure detection signal has been output to indicate an LOL failure. If an LOL failure detection signal has been output to indicate an LOL failure, the flow of the processing goes back to the step S54. If an LOL failure detection signal has not been output to indicate an LOL failure, the flow of the processing goes back to the step S50 at which the DSP 154#*ij* continues the automatic adjustment of the optical level. At the step S54, the DSP 154#*ij* executes ATT quantity locking control applying a first locked ATT quantity of the variable optical attenuator VOA 14#*ij*. The first locked ATT quantity has been stored in advance in the memory 152#*ij*. The ATT quantity locking control is also referred to hereafter as first ATT quantity locking control. The first locked ATT quantity of the variable optical attenuator VOA 14#*ij* has a value that avoids the problem of an excessively high optical level of the optical signal, which is output by the variable optical attenuator VOA 14#*ij* when the optical beam recovers from the LOL failure.

Then, at the next step S56, the DSP 154#*ij* determines whether or not an LOL failure-disappearance detection signal has been output to indicate disappearance of the LOL failure. If an LOL failure-disappearance detection signal has not been output to indicate disappearance of the LOL failure, the flow of the processing goes back to the step S54 at which the DSP 154#*ij* continues the first ATT quantity locking control. If an LOL failure-disappearance detection signal has been output to indicate disappearance of the LOL failure, on the other hand, the flow of the processing goes on to a step S58 at which the DSP 154#*ij* executes ATT quantity locking control, which applies a second locked ATT quantity of the variable optical attenuator VOA 14#*ij*. The second locked ATT quantity of the variable optical attenuator VOA 14#*ij* has also been stored in advance in the memory 152#*ij*. The ATT quantity locking control applying the second locked ATT quantity of the variable optical attenuator VOA 14#*ij* is also referred to hereafter as second ATT quantity locking control. The second locked ATT quantity has a value close to an average ATT quantity of converging values of the ATT quantity applied during the automatic adjustment of the optical level of the optical signal. By applying the second locked ATT quantity forcibly after the LOL failure disappears prior to a transition to the automatic adjustment of the optical level of the optical signal, the optical level can be converged in a short period of time during the automatic adjustment of the optical level of the optical signal.

(2): The Node Functions as a Thru Node.

The flowchart shown in FIG. 27 begins with a step S100 at which the DSP 154#*ij* carries out automatic adjustment of the optical level of an optical signal in the same way as the step S50 of the flowchart shown in FIG. 26. Then, at the next step S102, the DSP 154#*ij* determines whether or not an LOL failure detection signal has been output to indicate an LOL failure. If an LOL failure detection signal has not been output to indicate an LOL failure, the flow of the processing goes back to the step S100 at which the DSP 154#*ij* continues the automatic adjustment of the optical level. If an LOL failure detection signal has been output to indicate an LOL failure, on the other hand, the flow of the processing goes on to a step S104 at which the DSP 154#*ij* stores an ATT quantity applied by the variable optical attenuator VOA 14#*ij* right after the LOL failure in the memory 152#*ij* and executes ATT quantity locking control by applying the ATT quantity of the variable optical attenuator VOA 14#*ij* just stored in the memory 152#*ij*. The ATT quantity locking control applying the locked ATT quantity of the variable optical attenuator VOA 14#*ij* applied right after the LOL failure is also referred to hereafter as third ATT quantity locking control. Then, at the next step S106, the DSP 154#*ij* determines whether or not an LOL failure-disappearance detection signal has been output to indicate disappearance of the LOL failure. If an LOL failure-disappearance detection signal has not been output to indicate disappearance of the LOL failure, the flow of the processing goes back to the step S104 at which the DSP 154#*ij* continues the third ATT quantity locking control. If an LOL failure-disappearance detection signal has been output to indicate disappearance of the LOL failure, on the other hand, the flow of the processing goes back to the step S100 at which the DSP 154#*ij* resumes the automatic adjustment of the optical level.

Figure 28:
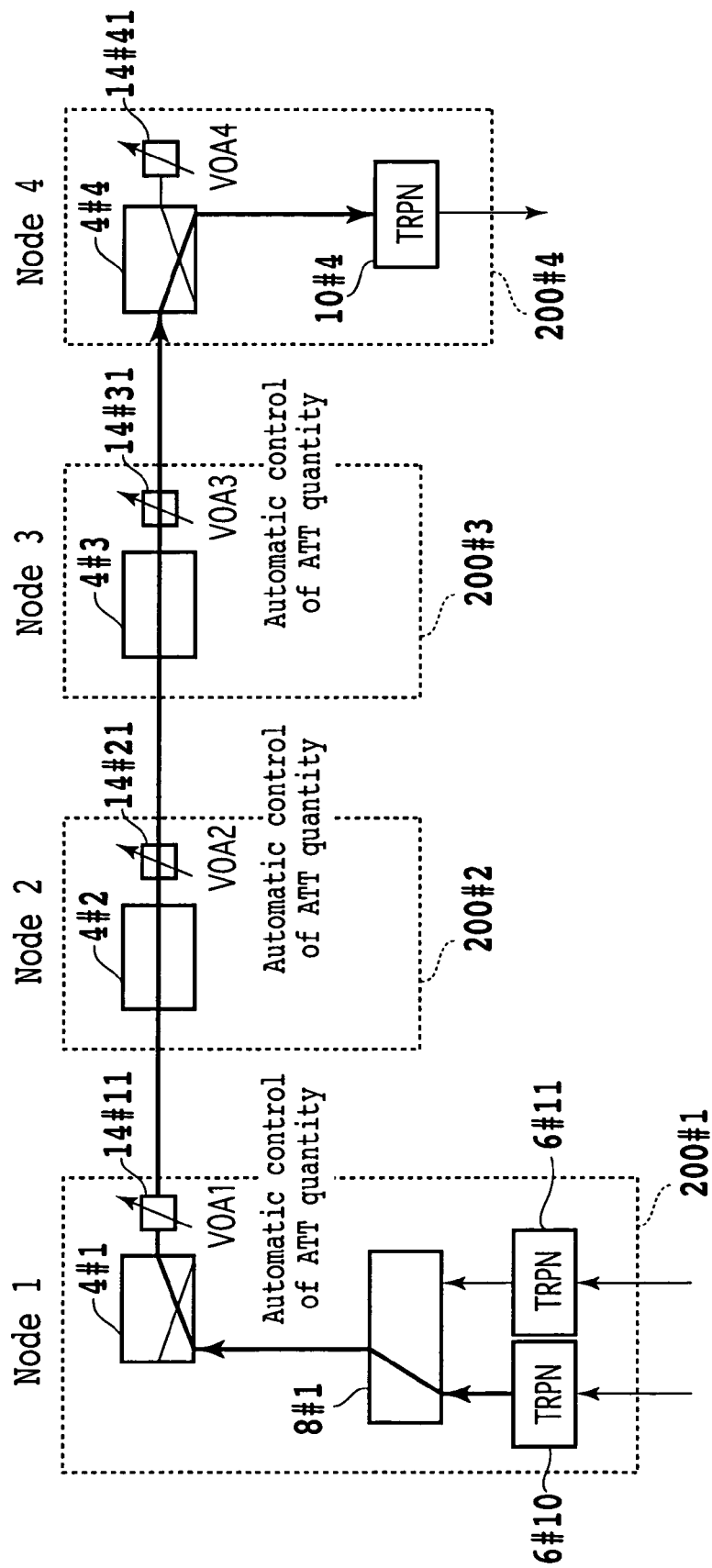
FIG. 28 is an explanatory diagram referred to in describing operations carried out in a normal state.
Figure 29:
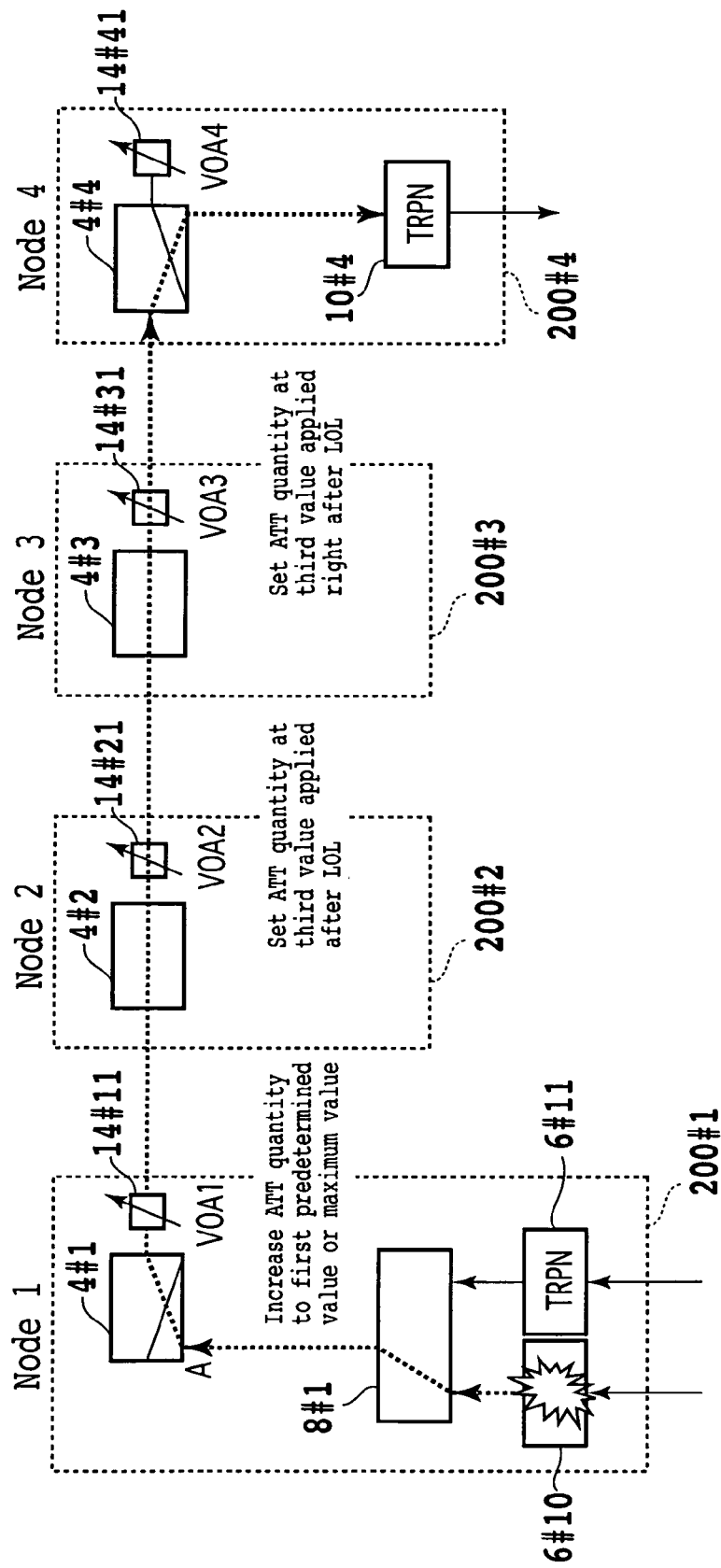
FIG. 29 is an explanatory diagram referred to in describing operations carried out in the event of a failure.
Figure 30:
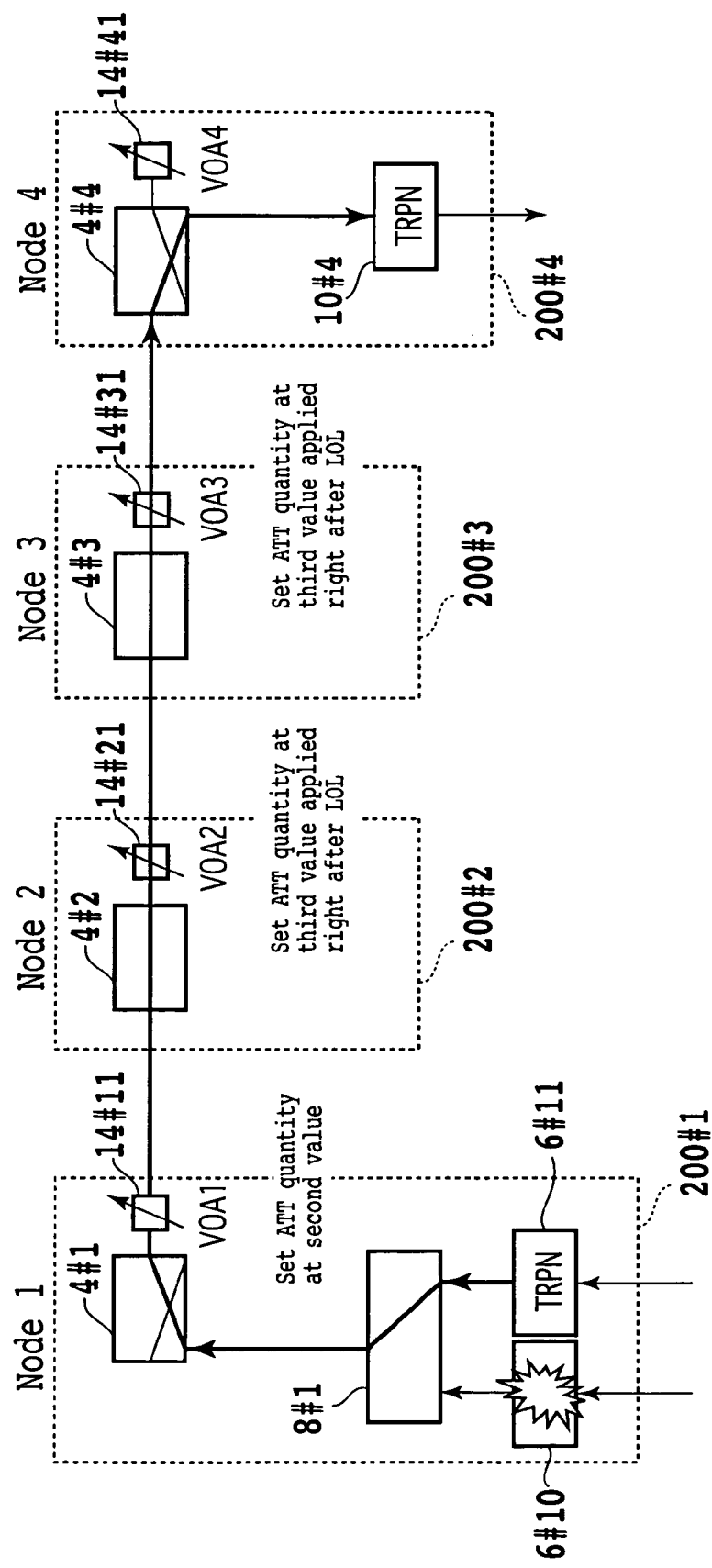
FIG. 30 is an explanatory diagram referred to in describing operations carried out right after a recovery from a failure.
Figure 31:
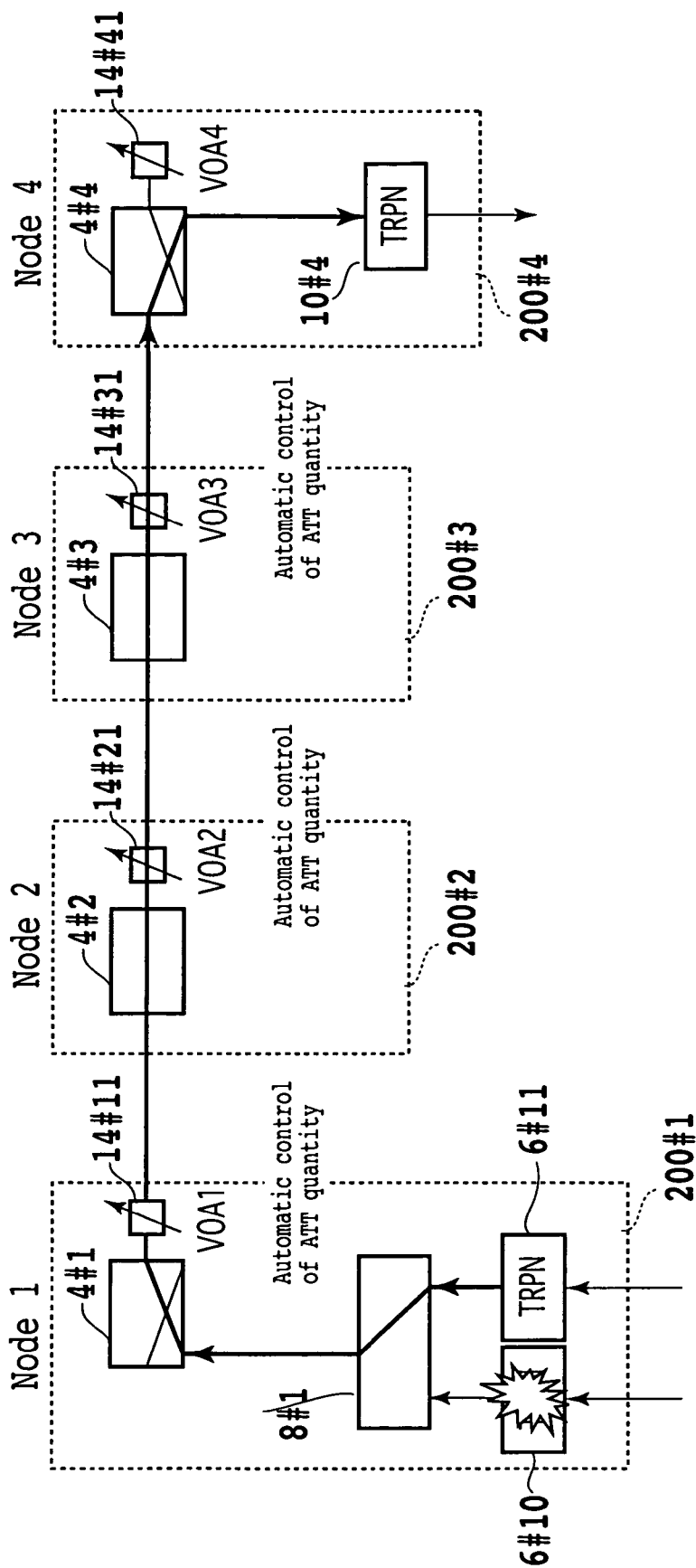
FIG. 31 is an explanatory diagram referred to in describing operations carried out in a normal state following a recovery from a failure.
Figure 32:
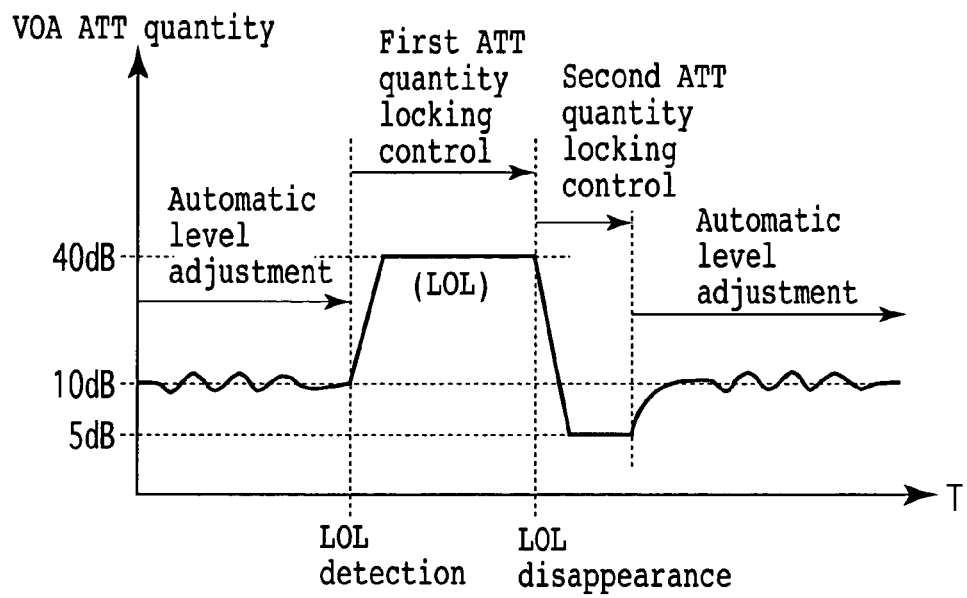
FIG. 32 is a diagram showing variations of an ATT quantity of a VOA employed in an add node.
Figure 33:
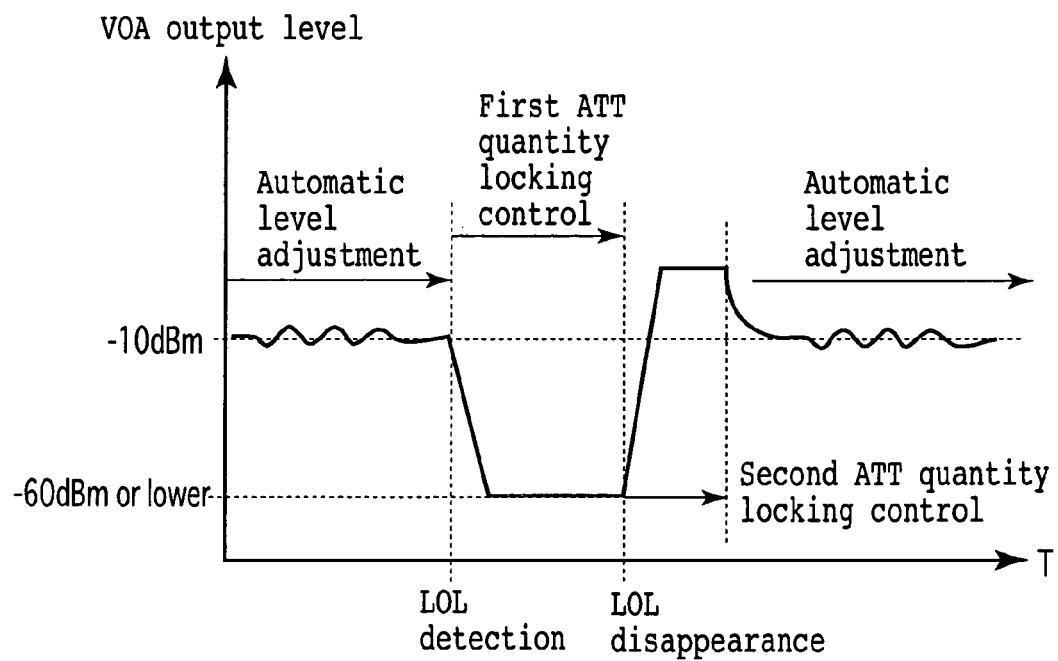
FIG. 33 is a diagram showing variations of the optical level of an optical signal output by a VOA employed in an add node.
Figure 34:
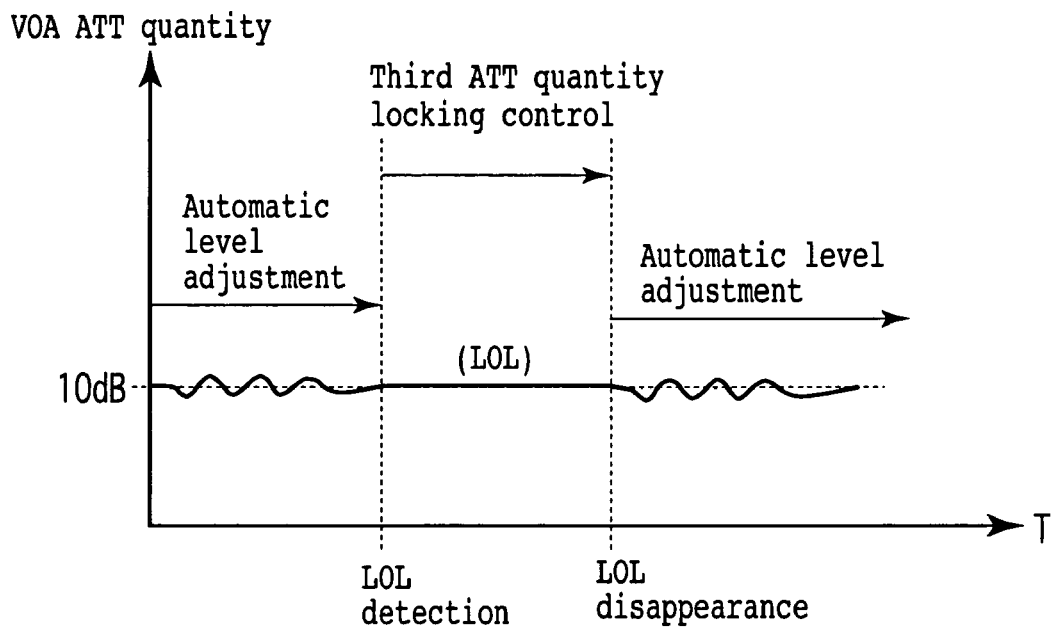
FIG. 34 is a diagram showing variations of an ATT quantity of a VOA employed in a thru node.
Figure 35:
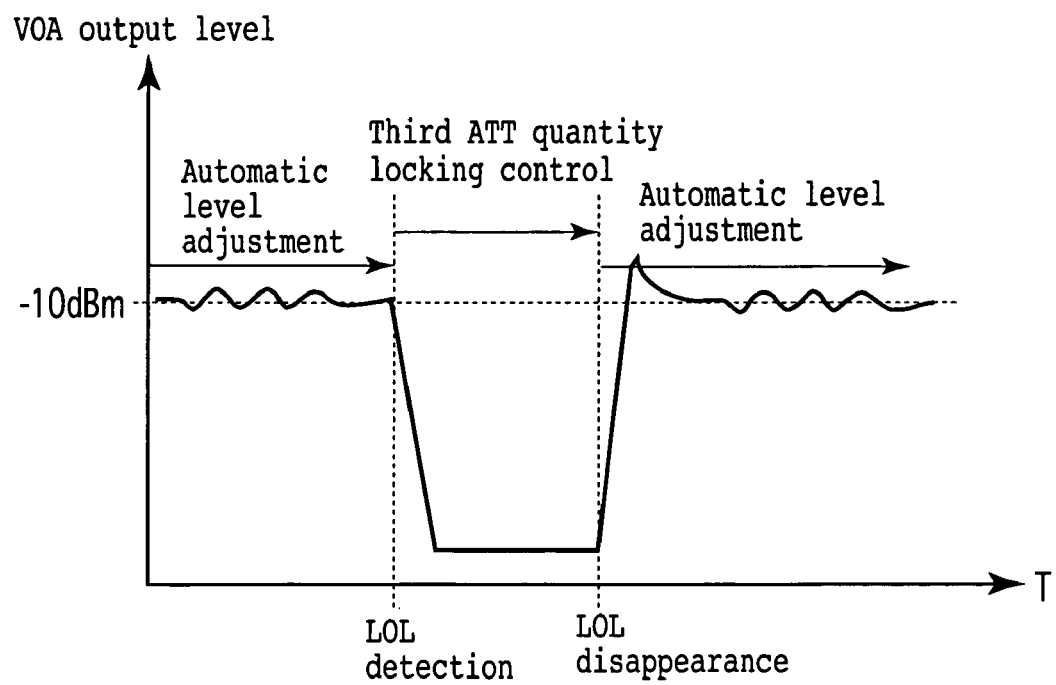
FIG. 35 is a diagram showing variations of the optical level of an optical signal output by a VOA employed in a thru node.

The following description explains a control method executed by the optical attenuator in a recovery from a failure. In a network shown in FIG. 28, a node 200#1 functions as an add node, nodes 200#2 and 200#3 each function as a thru node whereas a node 200#4 functions as a drop node. FIG. 28 is an explanatory diagram showing operations carried out in a normal state. FIG. 29 is an explanatory diagram showing operations carried out in the event of a failure. FIG. 30 is an explanatory diagram showing operations carried out right after a recovery from a failure. FIG. 31 is an explanatory diagram showing operations carried out in a normal state following a recovery from a failure. FIG. 32 is a diagram showing variations of an ATT quantity of the variable optical attenuator VOA 14#ij employed in an add node implemented by the sixth embodiment as variations with the lapse of time. FIG. 33 is a diagram showing variations of the optical level of an optical signal output by the variable optical attenuator VOA 14#ij employed in the add node as variations with the lapse of time. The horizontal axes represent the lapse of time (T) whereas the vertical axes represent the ATT quantity of the optical attenuator and the optical level of the optical signal output by the VOA. FIGS. 34 and 35 are diagrams showing variations of an ATT quantity of the variable optical attenuator VOA 14#ij employed in a thru node implemented by the sixth embodiment as variations with the lapse of time, and a diagram showing variations of the optical level of an optical signal output by the variable optical attenuator VOA 14#ij employed in the thru node as variations with the lapse of time.

(1): Normal State

As shown in FIG. 28, in the add node 200#1, an optical signal transmitted by the transponder (TRPN) transmitter 6#10 is supplied to the variable optical attenuator VOA 14#11 by way of the optical switch SW 8#1 and the optical switch SW 4#1. In the variable optical attenuator VOA 14#11, the optical signal is subjected to automatic control as shown in FIGS. 32 and 33. Also shown in FIG. 28, the optical signal output by the variable optical attenuator VOA 14#11 is supplied to the thru node 200#2 in which the optical signal is supplied to the variable optical attenuator VOA 14#21 by way of the optical switch SW 4#2 and subjected to the level automatic control in the variable optical attenuator VOA 14#21. By the same token, the optical signal output by the variable optical attenuator VOA 14#21 is supplied to the thru node 200#3 in which the optical signal is supplied to the variable optical attenuator VOA 14#31 by way of the optical switch SW 4#3 and subjected to the level automatic control in the variable optical attenuator VOA 14#31. For more information on the level automatic control executed by the variable optical attenuator VOA 14#31 employed in a thru node, refer to FIGS. 34 and 35. In the automatic control of the optical level, the optical level is controlled by applying an ATT quantity of about 10 dB to produce an optical level of about −10 dBm at the output of the VOA as shown in FIGS. 32 and 34. Also as shown in FIG. 28, the optical signal output by the variable optical attenuator VOA 14#31 is supplied to the drop node 200#4 in which the optical signal is supplied to the TRPN 10#4 by way of the optical switch SW 4#4 before being dropped thereby to a subscriber.

(2): In the Event of a Failure

If an LOL failure occurs in the add node 200#1, the variable optical attenuator VOA 14#11 executes the first ATT quantity locking control locking the ATT quantity of the variable optical attenuator VOA 14#11 at a first predetermined constant value of typically 40 dB or a maximum value as shown in FIGS. 29 and 32. In this way, the ATT quantity of the variable optical attenuator VOA 14#ij is prevented from becoming equal to zero. At that time, as shown in FIG. 33, due to the LOL failure, the optical power decreases and, since the value of the ATT quantity of the variable optical attenuator VOA 14#ij is locked, the optical level of the optical signal output by the VOA is lowered to a value not greater than −60 dBm.

As the LOL failure is detected in each of the thru nodes 2002#2 and 2003#3, as shown in FIGS. 29 and 34, the ATT quantity of the VOA is kept at an ATT quantity applied by the variable optical attenuator VOA 14#ij right after the LOL failure. A typical value of the ATT quantity applied by the variable optical attenuator VOA 14#ij right after the LOL failure is 10 dB. The ATT quantity of the variable optical attenuator VOA 14#ij applied right after the LOL failure is referred to as the third locked ATT quantity of the variable optical attenuator VOA 14#ij as described above. That is to say, the third locked ATT quantity of the variable optical attenuator VOA 14#ij is all but equal to an ATT quantity applied by the variable optical attenuator VOA 14#ij right before the LOL failure. Also in this case, the ATT quantity of the variable optical attenuator VOA 14#ij is prevented from becoming equal to zero. As shown in FIG. 25, due to the LOL failure, the optical power decreases and, since the value of the ATT quantity of the variable optical attenuator VOA 14#ij is locked, the optical level of the optical signal output by the VOA is lowered to a value not greater than −60 dBm.

(3): Right After a Recovery From a Failure

When disappearance of a LOL failure is detected in the add node 200#1, as shown in FIGS. 30 and 32, the variable optical attenuator VOA 14#11 sets the ATT quantity at the second constant value and carries out the second ATT quantity locking control prior to a transition to the automatic adjustment of the optical level. Thus, as shown in FIG. 33, the optical level of the optical signal output by the VOA right after the recovery abruptly rises to approximately an average optical level of about −10 dBm, which is normally obtained by executing the automatic adjustment of the optical level.

When disappearance of a LOL failure is detected in each of the thru nodes 200#2 and 200#3, as shown in FIGS. 30 and 34, the ATT quantity of the variable optical attenuator VOA 14#ij is restored to the ATT quantity used in the automatic adjustment of the optical level. Right after the recovery, the optical level of the optical signal output by the VOA abruptly rises to approximately the target of about −10 dBm obtained by executing the automatic adjustment of the optical level as shown in FIG. 35.

(4): Normal State After a Recovery From a Failure

As shown in FIGS. 31 and 32, in the add node 200#1, the variable optical attenuator VOA 14#11 executes automatic control of the ATT quantity. At that time, as shown in FIG. 33, the optical level of the optical signal output by the VOA right after the recovery abruptly rises to approximately a target level of −10 dBm and, since the magnitude of each change in ATT quantity of the variable optical attenuator VOA 14#ij is small, the optical level of the optical signal output by the VOA converges to the target of −10 dBm in a short period of time.

As shown in FIGS. 31 and 34, in the add nodes 200#2 and 200#3, respectively, the variable optical attenuator VOA 14#21 and the variable optical attenuator VOA 14#31 each execute automatic control of the ATT quantity. Right after the recovery, the optical level of the optical signal output by the VOA abruptly rises to approximately the target of about −10 dBm obtained by executing the automatic adjustment of the optical level as shown in FIG. 35. Thus, by executing the automatic control of the ATT quantity, the optical level of the optical signal output by the VOA can be converged to the target of −10 dBm in a very short period of time.

In the embodiment described above, in the event of an LOL failure in an add node, ATT quantity locking control is executed by applying a first locked ATT quantity of the variable optical attenuator VOA 14#ij in order to prevent the ATT quantity from becoming equal to zero. Thus, it is also possible to prevent the optical power from increasing to an excessively large value when the LOL failure disappears. In addition, right after a recovery from the LOL failure, ATT quantity locking control is executed by applying a second locked ATT quantity close to an average of ATT quantities applied during automatic adjustment of the optical level prior to automatic control of the ATT quantity. In the event of an LOL failure, on the other hand, ATT quantity locking control is executed by applying a ATT quantity locked at a value of an ATT quantity right after detection of the LOL failure. Thus, right after a recovery from the LOL failure, the optical level of the optical signal output by the VOA can be converged to a target in a very short period of time.

Seventh Embodiment

Figure 36:
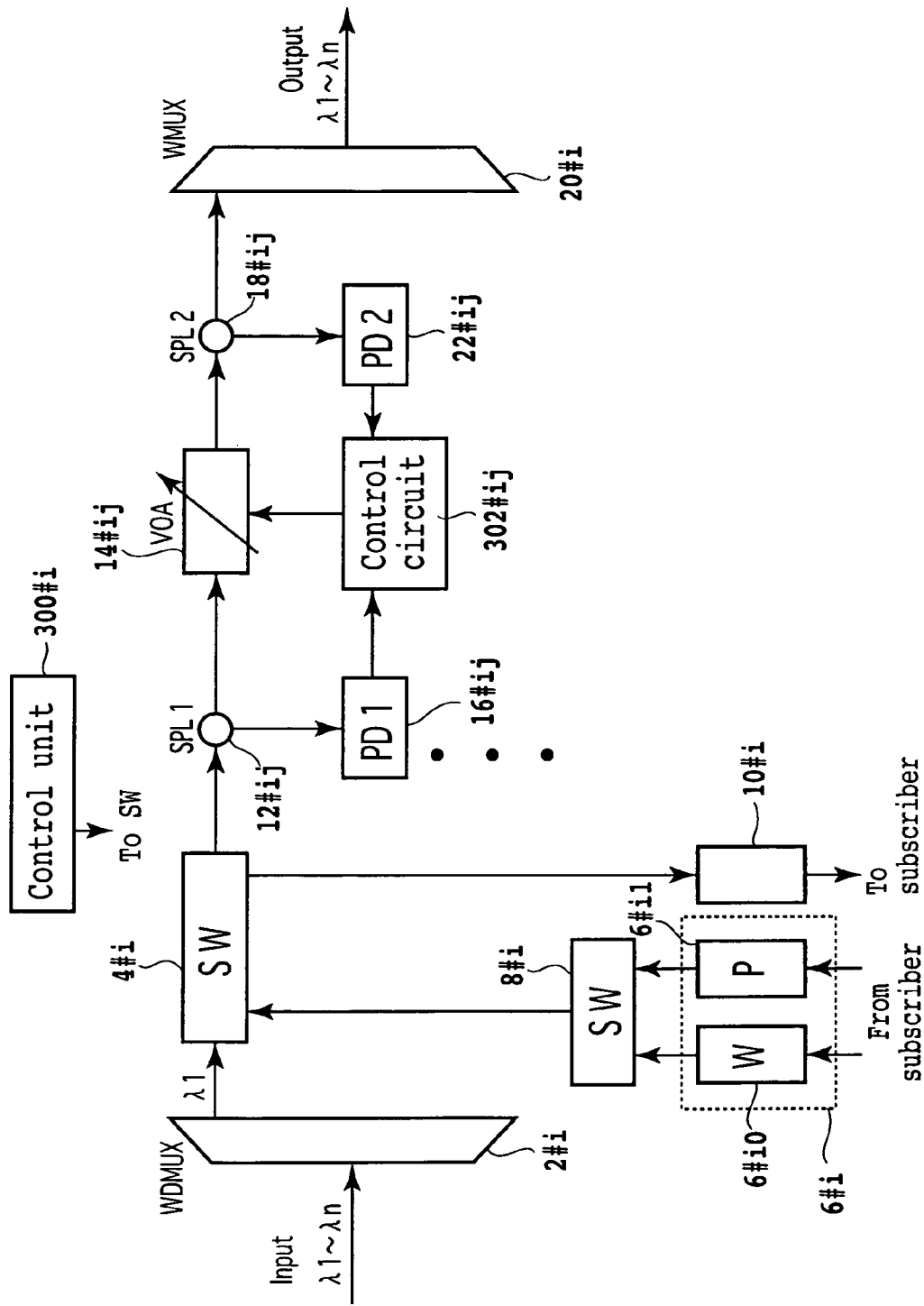
FIG. 36 is a diagram showing the configuration of a node implemented by a seventh embodiment of the present invention.

FIG. 36 is a diagram showing the configuration of a node implemented by a seventh embodiment of the present invention. In this figure, components virtually identical with their counterparts shown in FIG. 24 are denoted by the same reference numerals as the counterparts. Since there is no difference in control executed by the control circuit 302#ij to adjust the ATT quantity of the variable optical attenuator VOA 14#ij between add and thru functions of the node in the event of a LOL failure and a recovery from the LOL failure, the control unit 300#i does not inform the control circuit 302#ij of whether the node functions as an add or thru node. The control circuit 302#ij executes the control of the ATT quantity of the variable optical attenuator VOA 14#ij in a cycle longer than the conventional control.

Figure 37:
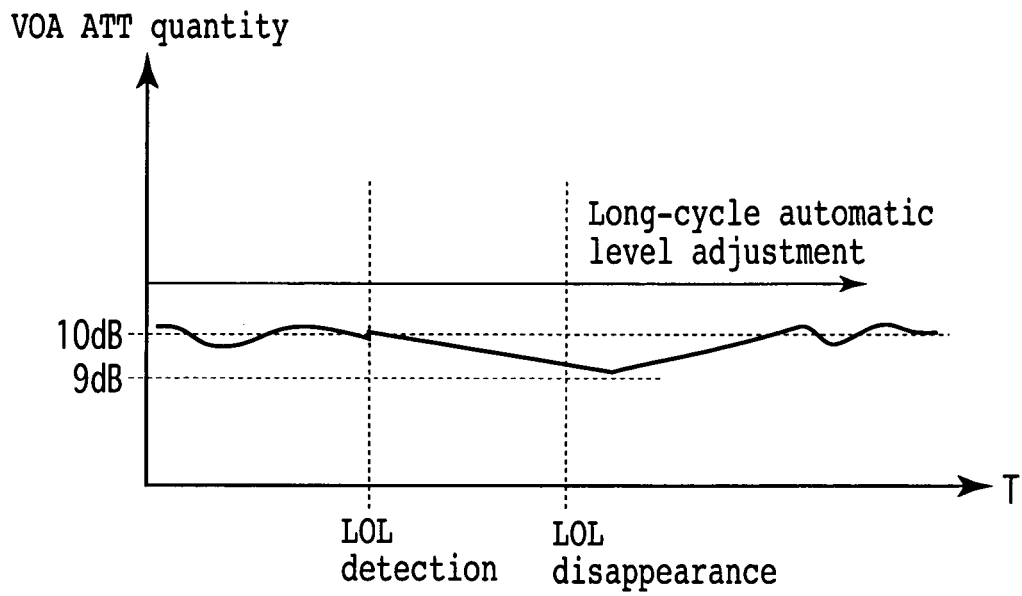
FIG. 37 is a diagram showing variations of an ATT quantity of a VOA employed in an add or thru node.
Figure 38:
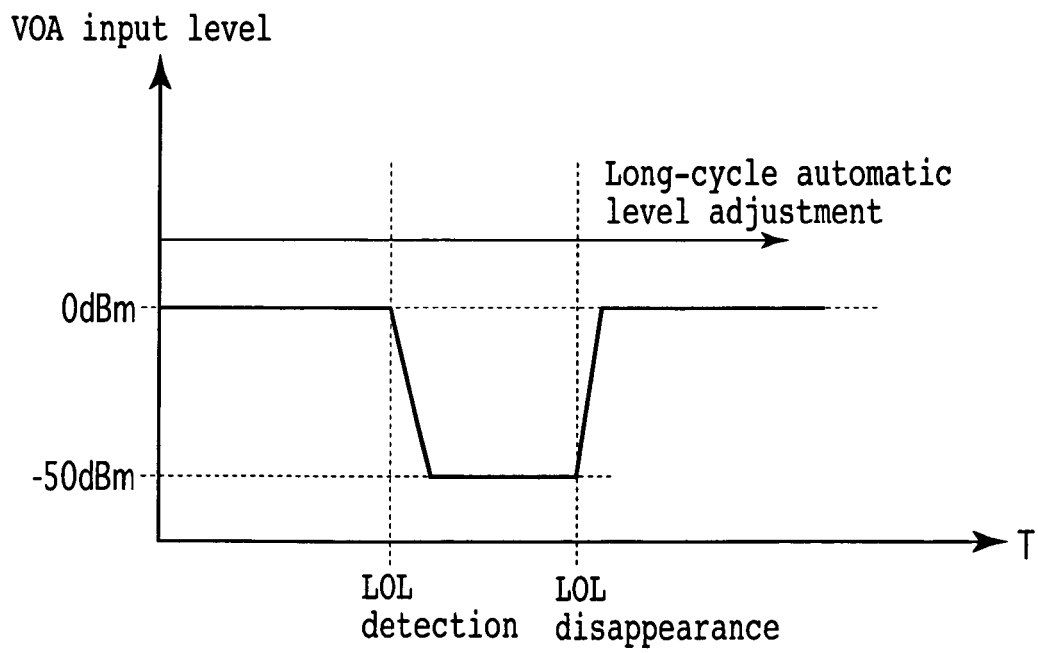
FIG. 38 is a diagram showing variations of the optical level of an optical signal input to a VOA employed in an add or thru node.
Figure 39:
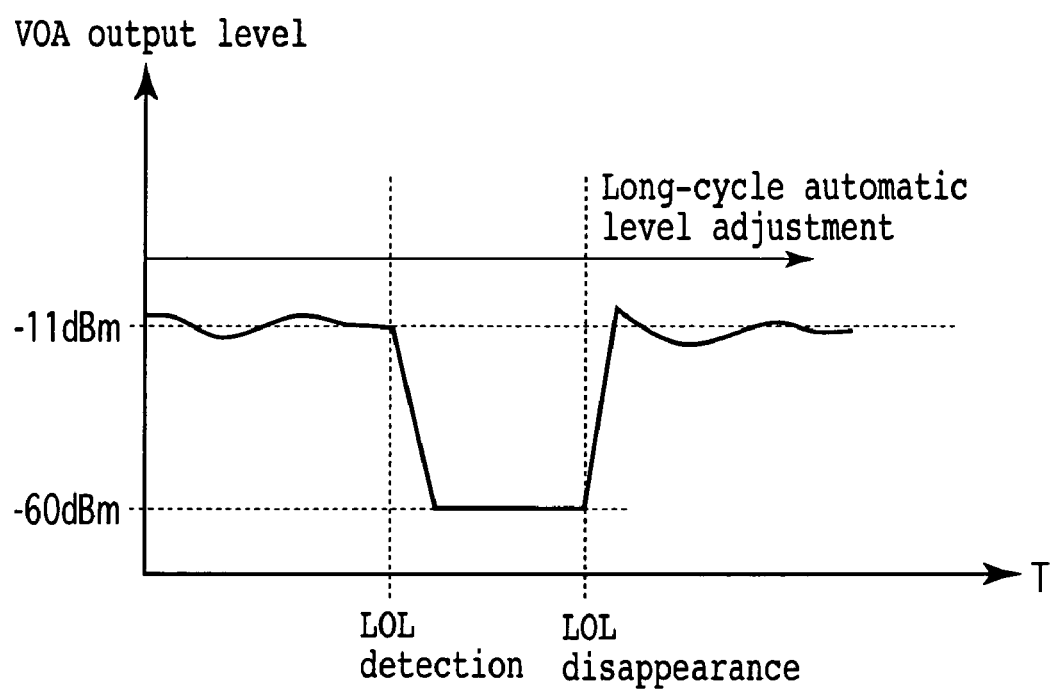
FIG. 39 is a diagram showing variations of the optical level of an optical signal output by a VOA employed in an add or thru node.

In the conventional control of the ATT quantity of the variable optical attenuator VOA 14#ij, normally, in a period of time between the occurrence of a LOL failure and a recovery from the LOL failure after replacement of the work system with a protection system, the ATT quantity becomes equal to zero to put the variable optical attenuator VOA 14#ij in an opened state. In order to prevent the ATT quantity of the variable optical attenuator VOA 14#ij from becoming equal to zero and putting the variable optical attenuator VOA 14#ij in an opened state, the control circuit 302#ij executes the control of the ATT quantity in a long cycle. FIG. 37 is a diagram showing variations of an ATT quantity of the variable optical attenuator VOA 14#ij employed in the add or thru node implemented by the seventh embodiment as variations with the lapse of time. FIG. 38 is a diagram showing variations of the optical level of an optical signal input to the variable optical attenuator VOA 14#ij employed in the add or thru node implemented by the seventh embodiment as variations with the lapse of time. FIG. 39 is a diagram showing variations of the optical level of an optical signal output by the variable optical attenuator VOA 14#ij employed in the add or thru node implemented by the seventh embodiment as variations with the lapse of time. In the figures, the horizontal axes each represent the lapse of time (T) whereas the vertical axes represent the ATT quantity, the optical level of a signal input to the VOA and the optical level of a signal output by the VOA.

(1): Normal State

In a normal state, the control circuit 302#ij executes automatic control of the ATT quantity of the variable optical attenuator VOA 14#ij in a long cycle. For example, the control circuit 302#ij executes the automatic control of the ATT quantity in a long cycle to adjust an average value of the ATT quantity to 10 dB so that, at a VOA input optical level of 0 dBm, the VOA output optical level is converged to a target of −11 dBm.

(2): In the Event of a Failure

Even in the event of a LOL failure, the control circuit 302#ij also executes automatic control of the ATT quantity in a long cycle. Thus, the ATT quantity is reduced gradually instead of decreasing the ATT quantity immediately. For example, by the time the LOL failure disappears, the ATT quantity is reduced only by about 1 dB over a long cycle. Thus, as shown in FIG. 37, the ATT quantity never decreases to reach a value close to a zero level before the LOL failure disappears. In the mean time, the VOA input optical level drops to about −50 dBm as shown in FIG. 38 whereas the VOA output optical level falls to a typical level of −60 dBm as shown in FIG. 39. That is to say, even if the VOA input optical level changes, the ATT quantity does not follow the change immediately. Instead, the ATT quantity is controlled slowly. Thus, if the period of the LOL failure is sufficiently short in comparison with the control time lapsing at the speed of the control of the ATT quantity, the ATT quantity stays all but unchanged and never becomes equal to zero.

(3): Recovery From a Failure

As the LOL failure disappears, the ATT quantity reduced slowly during a period of time following the LOL failure is this time restored also slowly to the original value close to 10 dB. The VOA output optical level also recovers from the LOL failure, overshooting the target of −11 dBm a little bit by a quantity corresponding to the decrease in ATT quantity.

(4): Normal State

Since the ATT quantity is restored also slowly to the original value, the VOA output optical level is converged to a typical target optical power level of −11 dBm.

In accordance with the embodiment described above, since the ATT quantity is controlled in a long cycle, the ATT quantity is not much reduced during a period of time between the occurrence of an LOL failure and the disappearance of the LOL failure. Thus, when the LOL failure disappears, the VOA output optical level is restored to a target level without excessively overshooting the target level.

Eighth Embodiment

Figure 40:
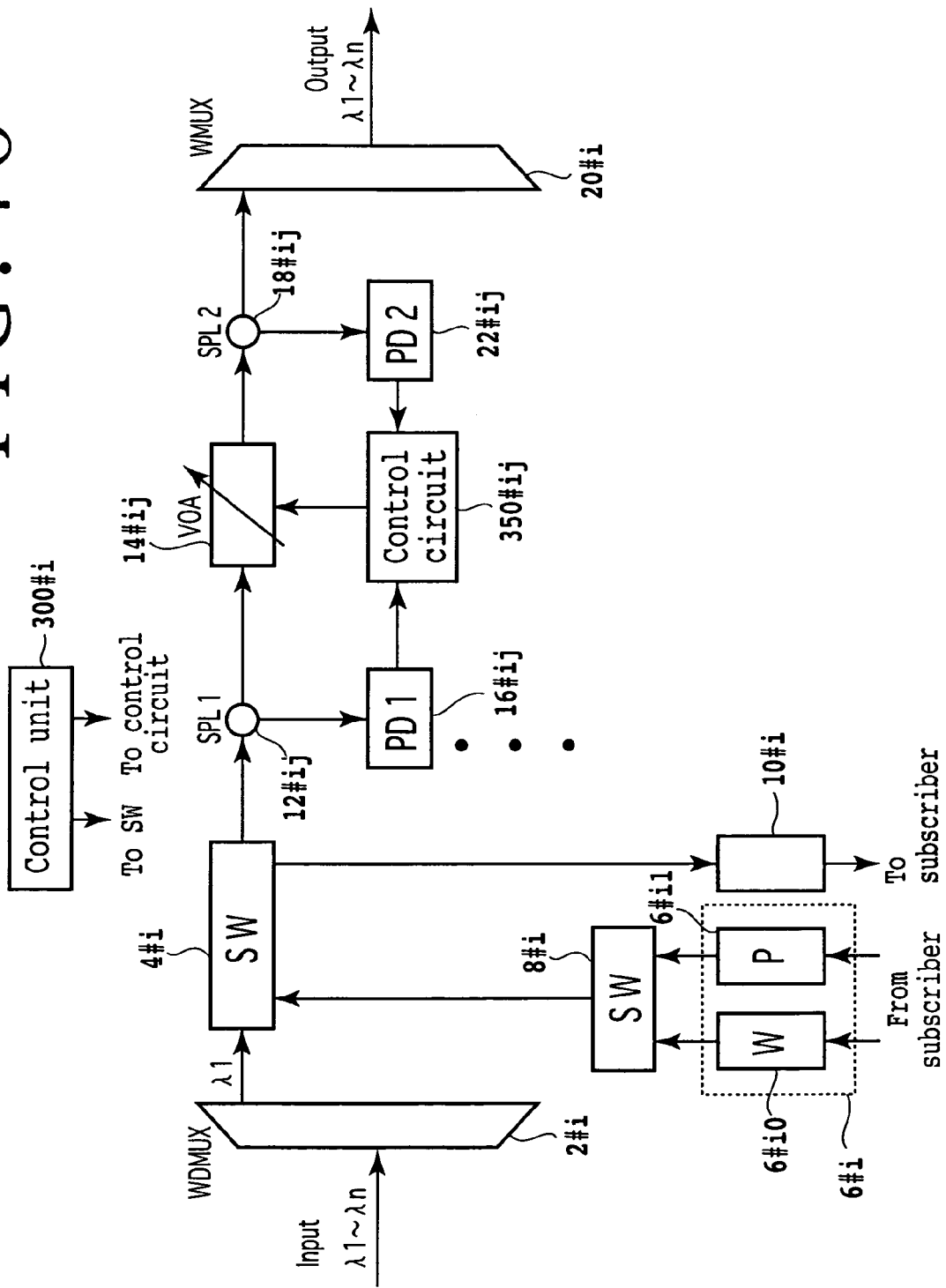
FIG. 40 is a diagram showing the configuration of a node implemented by an eighth embodiment of the present invention.
Figure 41:
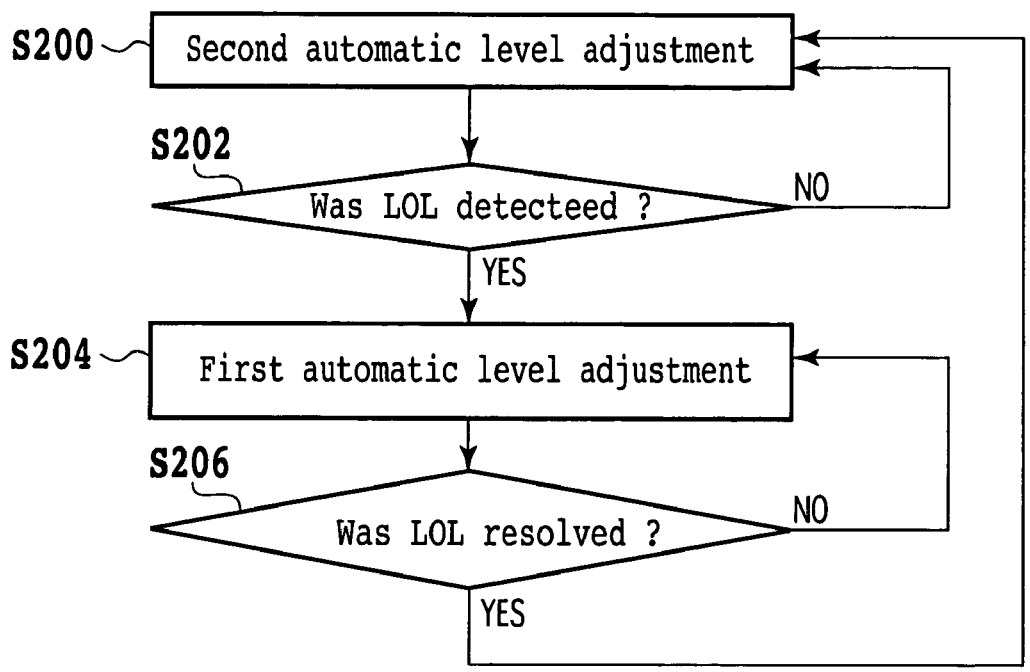
FIG. 41 shows a flowchart representing operations carried out by a control circuit employed in an add or thru node.

FIG. 40 is a diagram showing the configuration of a node implemented by an eighth embodiment of the present invention. In this figure, components virtually identical with their counterparts shown in FIG. 36 are denoted by the same reference numerals as the counterparts. The control circuit 350#ij executes automatic control of the optical level in the event of an LOL failure at response speed different from a response speed of the level automatic control executed in a normal state. FIG. 41 shows a flowchart representing operations carried out by the control circuit 350#ij employed in an add or thru node.

(1): Normal State

As shown in the figure the flowchart begins with a step S200 at which the control circuit 350#ij executes automatic control of the optical level in a normal state with no LOL failure. This automatic control of the optical level in a normal state is referred to as second level automatic adjustment. For example, the control circuit 350#ij executes the automatic control of the ATT quantity of the variable optical attenuator VOA 14#ij to adjust an average value of the ATT quantity to 10 dB so that, at a VOA input optical level of 0 dBm, the VOA input optical level is converged to a target of −11 dBm.

(2): In the Event of a Failure

Then, at the next step S202, the control circuit 350#ij determines whether or not an LOL failure has occurred. If an LOL failure has occurred, the flow of the processing goes on to a step S204. If an LOL failure has not occurred, on the other hand, the flow of the processing goes back to the step S200. At the step S204, the control circuit 350#ij adjusts the level of the optical power by carrying out first level automatic adjustment having a response speed different from the response speed of the second level automatic adjustment due to the fact that an LOL failure has occurred. The following description explains a relation between the response speed of the second level automatic adjustment and the response speed of the first level automatic adjustment.

Figure 42:
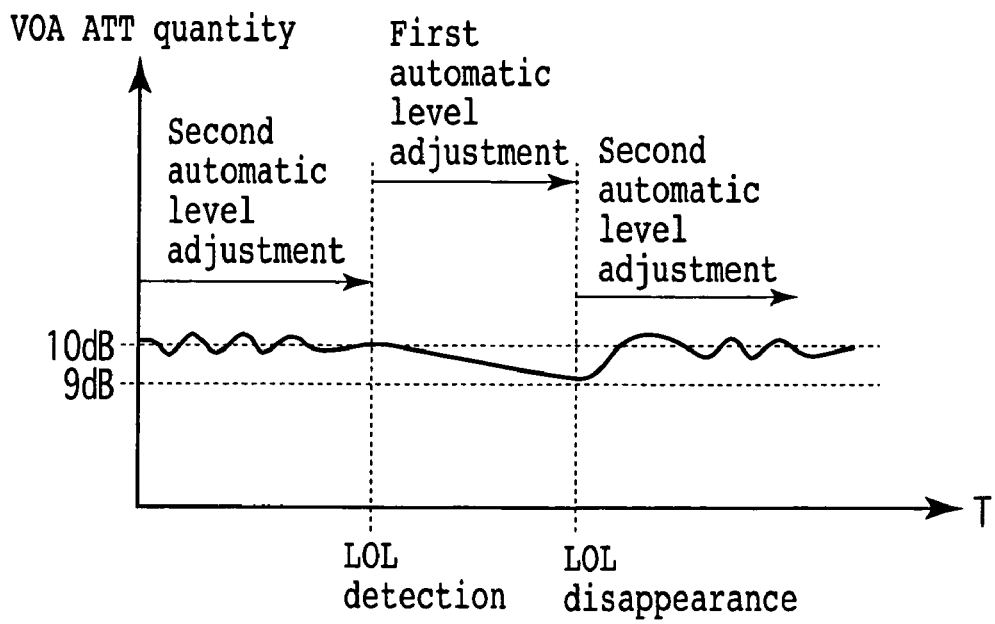
FIG. 42 is a diagram showing variations of an ATT quantity of a VOA employed in an add or thru node.
Figure 43:
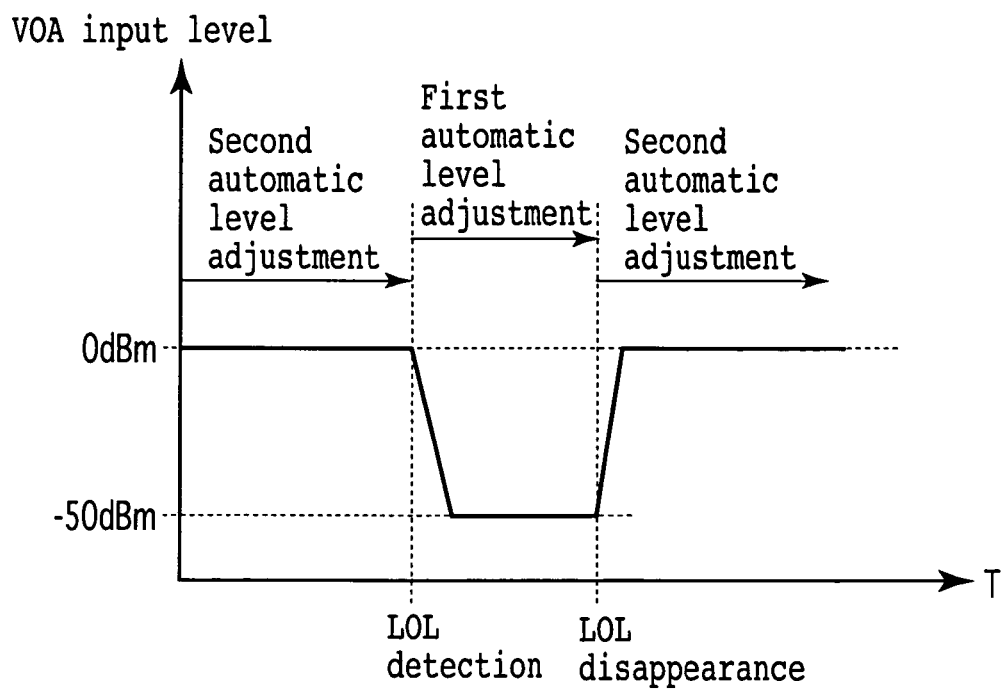
FIG. 43 is a diagram showing variations of the optical level of an optical signal input to a VOA employed in an add or thru node.
Figure 44:
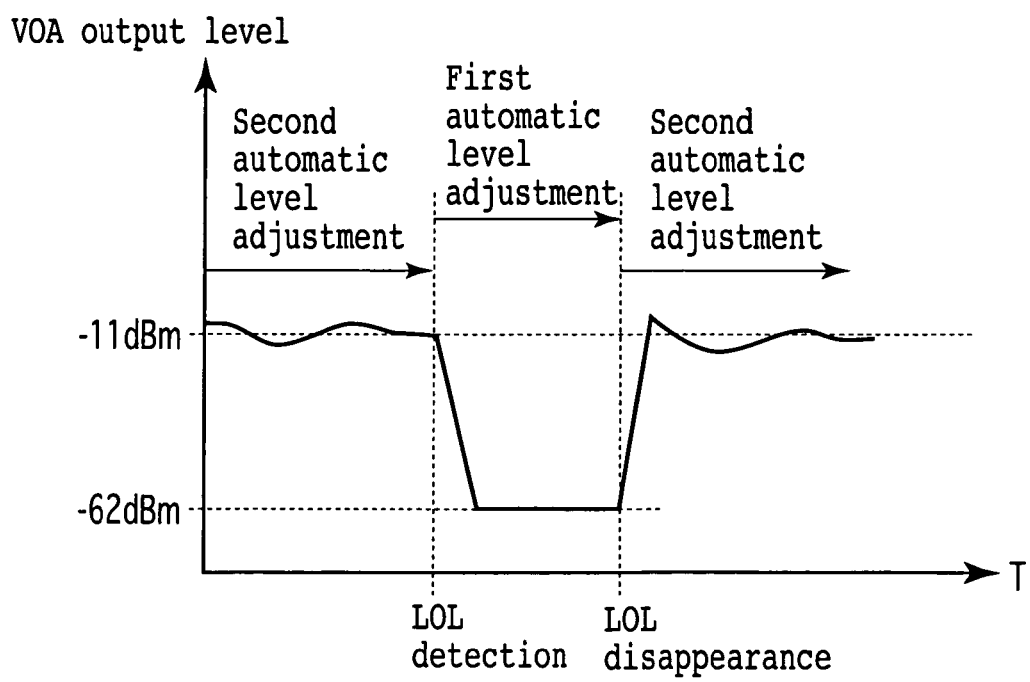
FIG. 44 is a diagram showing variations of the optical level of an optical signal output by a VOA employed in an add or thru node.

(a): The Response Speed of the First Level Automatic Adjustment is Lower Than the Response Speed of the Second Level Automatic Adjustment FIGS. 42 to 44 are diagrams showing the case when the response speed of the first level automatic adjustment is lower than the response speed of the second level automatic adjustment. FIG. 42 shows variations of an ATT quantity of the VOA variable optical attenuator VOA 14#$ij$ employed in the add or thru node implemented by the eighth embodiment as variations with the lapse of time. FIG. 43 shows variations of the optical level of an optical signal input to the VOA variable optical attenuator VOA 14#$ij$ employed in the add or thru node implemented by the eighth embodiment as variations with the lapse of time. FIG. 44 shows variations of the optical level of an optical signal output by the VOA variable optical attenuator VOA 14#$ij$ employed in the add or thru node implemented by the eighth embodiment as variations with the lapse of time. In the figures, the horizontal axes each represent the lapse of time (T) whereas the vertical axes represent the ATT quantity of the variable optical attenuator VOA 14#$ij$, the optical level of a signal input to the variable optical attenuator VOA 14#$ij$ and the optical level of a signal output by the variable optical attenuator VOA 14#$ij$. As shown in FIGS. 42 to 44, when an LOL failure is detected, the response speed of the automatic adjustment of the optical level is lowered. Thus, during a period of time between the occurrence of an LOL failure and the disappearance of the LOL failure, the ATT quantity of the variable optical attenuator VOA 14#$ij$ decreases only by a difference of about 1 dB to a value of about 9 dB. That is to say, during the same period of time, a variation in ATT quantity of the variable optical attenuator VOA 14#$ij$ can be suppressed to result in good responsiveness to a change to an ATT quantity of the variable optical attenuator VOA 14#$ij$ in a normal state after a recovery from the LOL failure.

Figure 45:
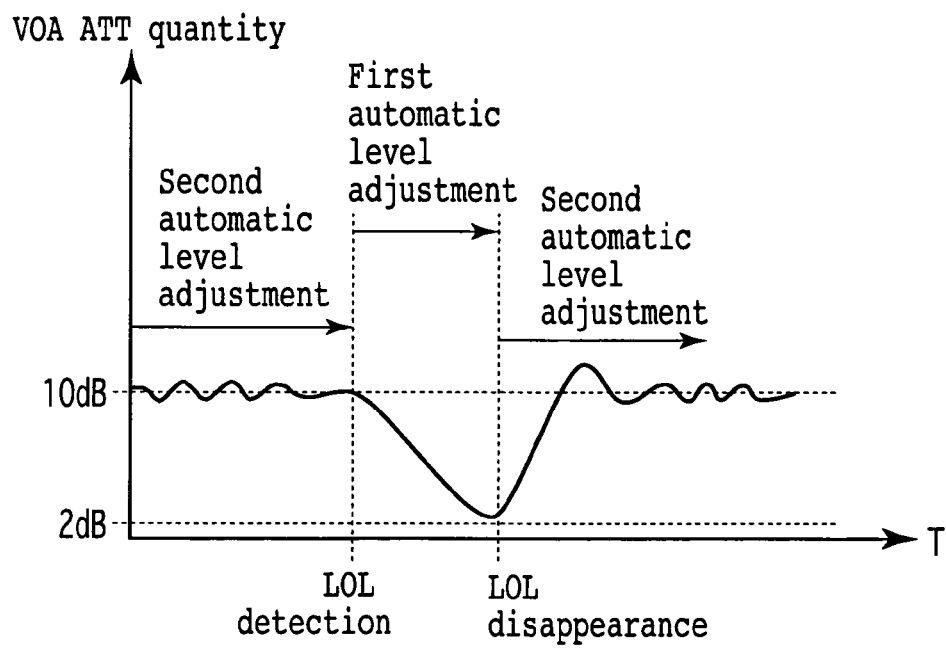
FIG. 45 is another diagram showing variations of an ATT quantity of a VOA employed in an add or thru node.
Figure 46:
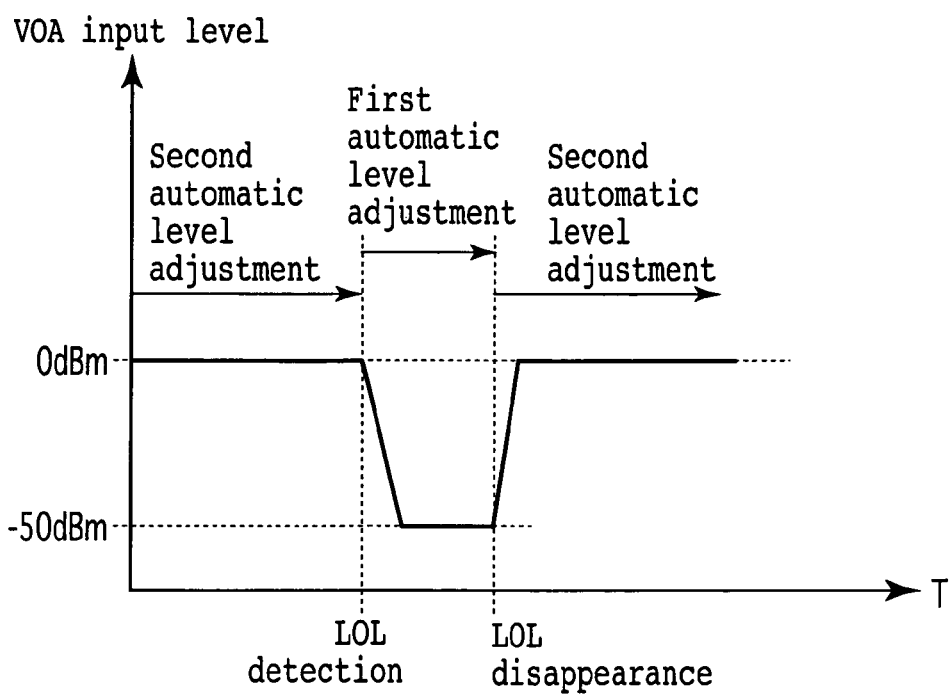
FIG. 46 is another diagram showing variations of the optical level of an optical signal input to a VOA employed in an add or thru node.
Figure 47:
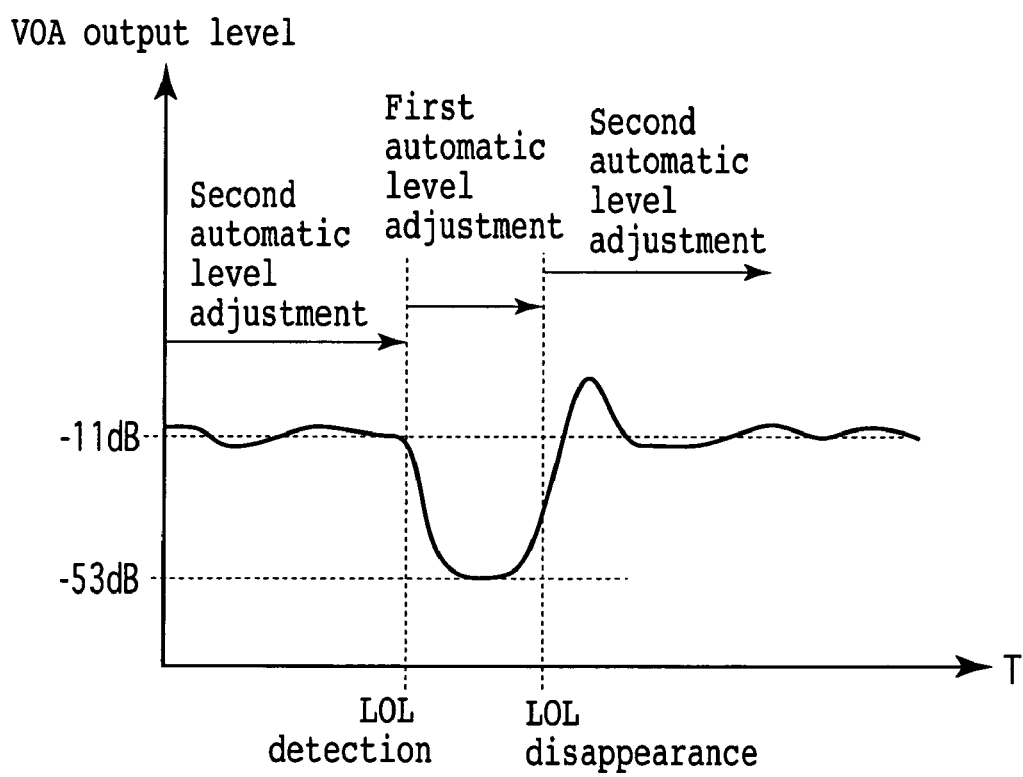
FIG. 47 is another diagram showing variations of the optical level of an optical signal output by a VOA employed in an add or thru node.

(b): The Response Speed of the First Level Automatic Adjustment is Higher Than the Response Speed of the Second Level Automatic Adjustment FIGS. 45 to 47 are diagrams showing the case when the response speed of the first level automatic adjustment is higher than the response speed of the second level automatic adjustment. FIG. 45 shows variations of an ATT quantity of the VOA variable optical attenuator VOA 14#$ij$ employed in the add or thru node implemented by the eighth embodiment as variations with the lapse of time. FIG. 46 shows variations of the optical level of an optical signal input to the VOA variable optical attenuator VOA 14#$ij$ employed in the add or thru node implemented by the eighth embodiment as variations with the lapse of time. FIG. 47 shows variations of the optical level of an optical signal output by the VOA variable optical attenuator VOA 14#$ij$ employed in the add or thru node implemented by the eighth embodiment as variations with the lapse of time. In the figures, the horizontal axes each represent the lapse of time (T) whereas the vertical axes represent the ATT quantity of the variable optical attenuator VOA 14#$ij$, the optical level of a signal input to the variable optical attenuator VOA 14#$ij$ and the optical level of a signal output by the variable optical attenuator VOA 14#$ij$. In the normal state, the response speed of the optical level automatic adjustment is set at a low value. As an LOL failure is detected, the optical level automatic adjustment is carried out at a higher response speed. During the optical level automatic adjustment following the LOL failure, the ATT quantity of the variable optical attenuator VOA 14#$ij$ trails the VOA input level shown in FIG. 46 at a higher response speed. Thus, much like the ATT quantity of the variable optical attenuator VOA 14#$ij$, the VOA output level also trails the VOA input level at a higher speed as shown in FIG. 47. Compare FIG. 45 with FIG. 42. In the case of FIG. 45, the ATT quantity of the variable optical attenuator VOA 14#$ij$ decreases in a direction toward a value close to zero corresponding to an opened state. Thus, the change shown in FIG. 45 as a change in ATT quantity of the variable optical attenuator VOA 14#$ij$ causes the VOA output level shown in FIG. 47 to overshoot by a quantity conceivably greater a little bit than that shown in FIG. 44. Even though the ATT quantity of the variable optical attenuator VOA 14#$ij$ decreases during a period of time between the occurrence of the LOL failure and the disappearance of the failure, however, the responsive speed can be adjusted so that the ATT quantity of the variable optical attenuator VOA 14#$ij$ does not decrease to zero and the VOA output level decreases to a value not lower than, for example, −53 dBm in the same period of time.

(3): Recovery From the Failure

Then, at the next step S206 of the flowchart shown in FIG. 41, the control circuit 350#$ij$ determines whether or not the LOL failure has disappeared. If the LOL failure has disappeared, the flow of the processing goes back to the step S200 at which the control circuit 350#$ij$ resumes the second level automatic adjustment. If the LOL failure has not disappeared, the flow of the processing goes back to the step S204.

(a): The Response Speed of the First Level Automatic Adjustment is Lower Than the Response Speed of the Second Level Automatic Adjustment As the LOL failure disappears, the control circuit 350#$ij$ resumes the second level automatic adjustment to adjust the ATT quantity of the variable optical attenuator VOA 14#$ij$ at a higher response speed. At that time, since the ATT quantity of the variable optical attenuator VOA 14#$ij$ has decreased by a difference of about 1 dB from a value of about 10 dB to a value of about 9 dB during a period of time between the occurrence of the LOL failure and the disappearance of the failure, at the recovery from the LOL failure, the VOA output level trails fast a target set for the normal state due to the fact that the ATT quantity of the variable optical attenuator VOA 14#$ij$ has dropped only by a small difference from the value of about 10 dB, which is the average of the ATT quantity of the variable optical attenuator VOA 14#$ij$ during the second level automatic adjustment.

(b): The Response Speed of the First Level Automatic Adjustment is Higher Than the Response Speed of the Second Level Automatic Adjustment At a point of time the LOL failure disappears, the build-up time from the LOL failure state is shorter due to the fact that the ATT quantity of the variable optical attenuator VOA 14#$ij$ has been once adjusted by the first level automatic adjustment having a high response speed. Thereafter, the ATT quantity of the variable optical attenuator VOA 14#$ij$ is subjected to automatic control by execution of the second level automatic adjustment having a low response speed.

(4): Normal State

In this state, the ATT quantity of the variable optical attenuator VOA 14#$ij$ is subjected to automatic control by execution of the second level automatic adjustment.

As described above, in accordance with this embodiment, the response speed is changed from a value for the second level automatic adjustment carried out in a normal state to a value for the first level automatic adjustment carried out in the event of an LOL failure. Thus, a control speed optimum for the prevailing condition can be provided without causing the ATT quantity of the variable optical attenuator VOA 14#ij to decrease to zero. As a result, the level of the optical power can be controlled with a high degree of precision and the length of time it take to carry out a switching operation can be reduced.

Ninth Embodiment

Figure 48:
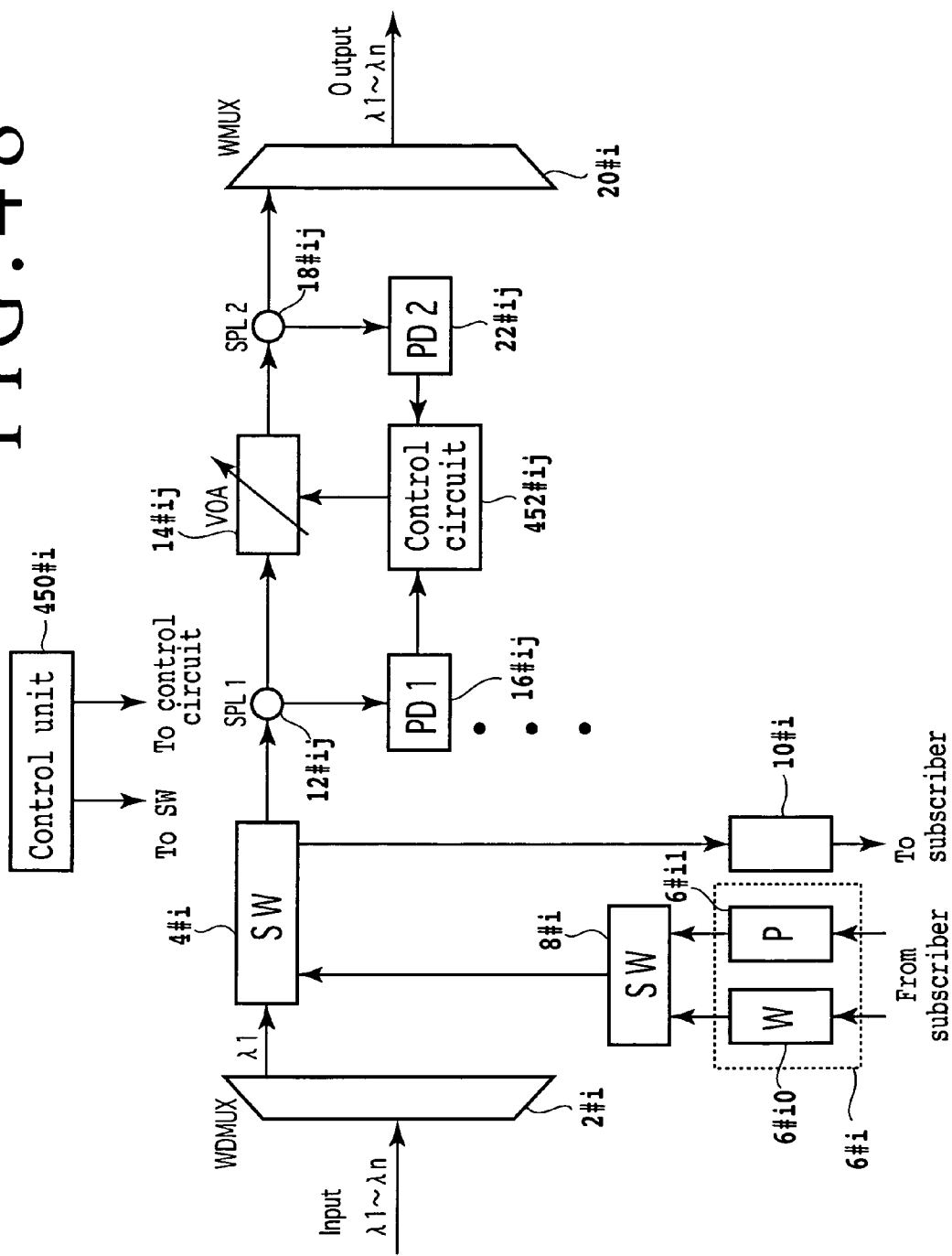
FIG. 48 is a diagram showing the configuration of a node implemented by a ninth embodiment of the present invention.

FIG. 48 is a diagram showing the configuration of a node implemented by a ninth embodiment of the present invention. In this figure, components virtually identical with their counterparts shown in FIG. 24 are denoted by the same reference numerals as the counterparts. The control unit 450#i of the node controls operations to switch a transmission path from the work system to a protection system in the event of a failure occurring in the node. In this case, the control unit 450#i collects information on the failure and transmits the information to other nodes to notify the other nodes that the failure has occurred or disappeared. If a failure has occurred in another node, the control unit 450#i receives information on the occurrence of the failure and passes on the information to adjacent nodes. Information on a failure is not limited to information on a failure occurring in a transponder employed in an add node. The information on a failure can also be information on an LOL failure happening to an input optical signal supplied to the variable optical attenuator VOA 14#ij. The information on a failure can also be information on a failure other than an LOL failure or a failure occurring in detection of an LOL failure itself. The control unit 450#i passes on information on a failure happening to an input optical signal supplied to the variable optical attenuator VOA 14#ij to the control circuit 452#ij. On the basis of information received from the control unit 450#i as the information on a failure happening to an input optical signal supplied to the variable optical attenuator VOA 14#ij, the control circuit 452#ij determines whether an LOL failure has occurred or an LOL failure has disappeared, and controls the ATT quantity of the variable optical attenuator VOA 14#ij in the event of an LOL failure or in the even of disappearance of an LOL failure.

Figure 49:
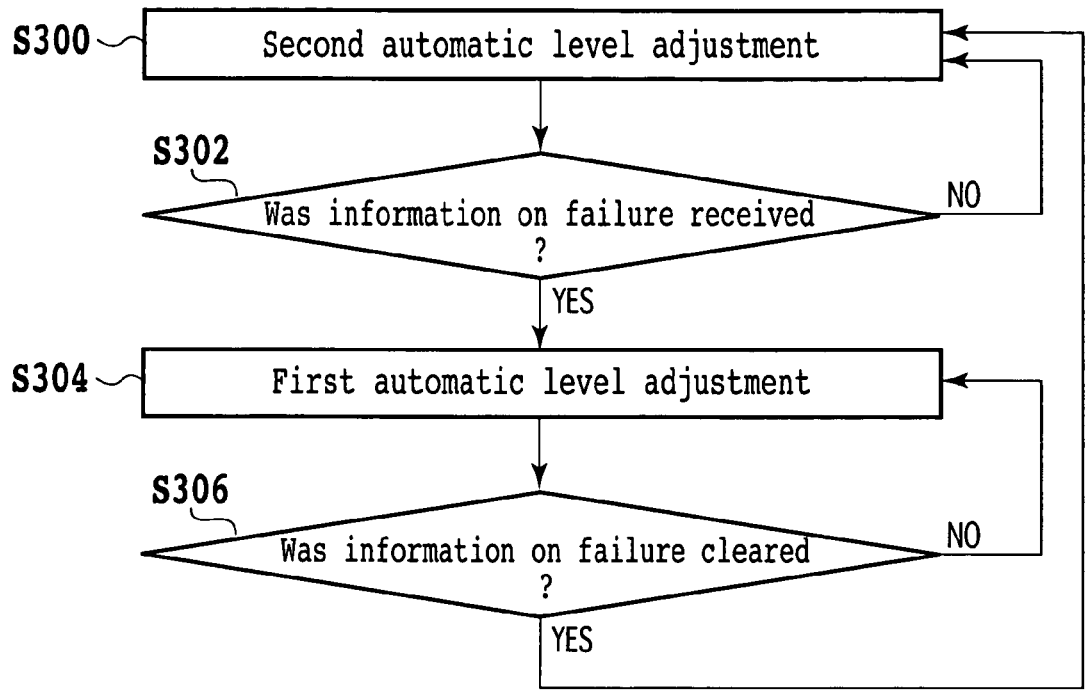
FIG. 49 shows a flowchart representing operations carried out by a control circuit employed in an add or thru node.

FIG. 49 shows a flowchart representing operations carried out by the control circuit 452#ij employed in an add or thru node implemented by the ninth embodiment. As shown in the figure, the flowchart begins with a step S300 at which the control circuit 452#ij executes automatic control of the optical level in a normal state. This automatic control of the optical level in a normal state is referred to as second level automatic adjustment. Then, at the next step S302, the control circuit 452#ij determines whether or not information on a failure has been received. If information on a failure has been received, the flow of the processing goes on to a step S304. If information on a failure has not been received, on the other hand, the flow of the processing goes back to the step S300, at which the control circuit 452#ij continues the automatic control of the optical level. At the step S304, the control circuit 452#ij carries out first level automatic adjustment having a response speed different from the response speed of the second level automatic adjustment due to the fact that a failure has occurred. Then, at the next step S306, the control circuit 452#ij determines whether or not the information on the failure has been cleared. If the information on the failure has been cleared, the flow of the processing goes back to the step S300 at which the control circuit 452#ij resumes the second level automatic adjustment. If the information on the failure has not been cleared, on the other hand, the flow of the processing goes back to the step S304 at which the control circuit 452#ij continues the first level automatic adjustment.

Figure 50:
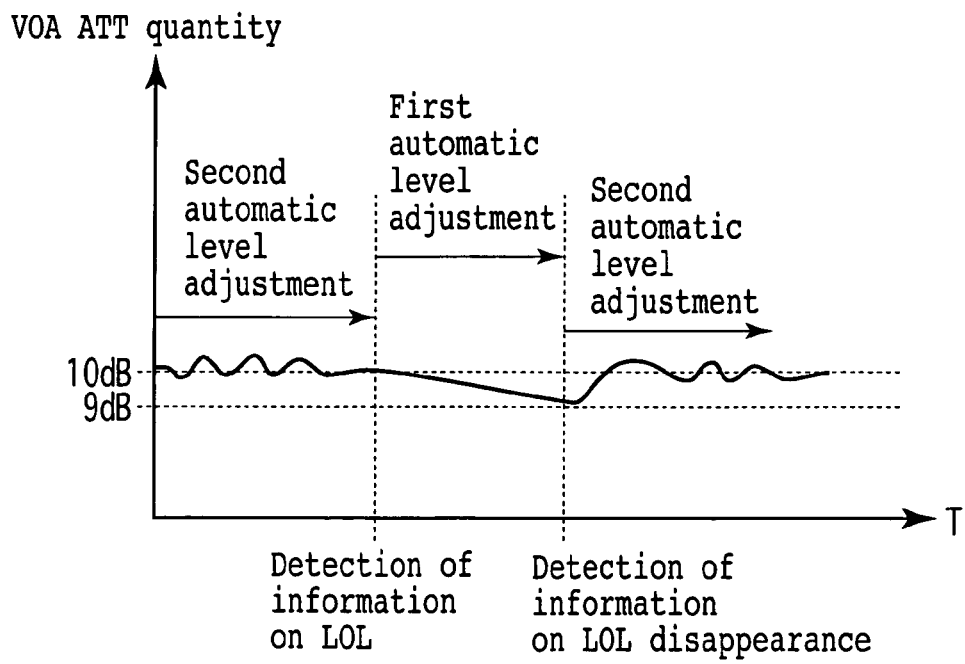
FIG. 50 is a diagram showing variations of an ATT quantity of a VOA employed in an add or thru node.
Figure 51:
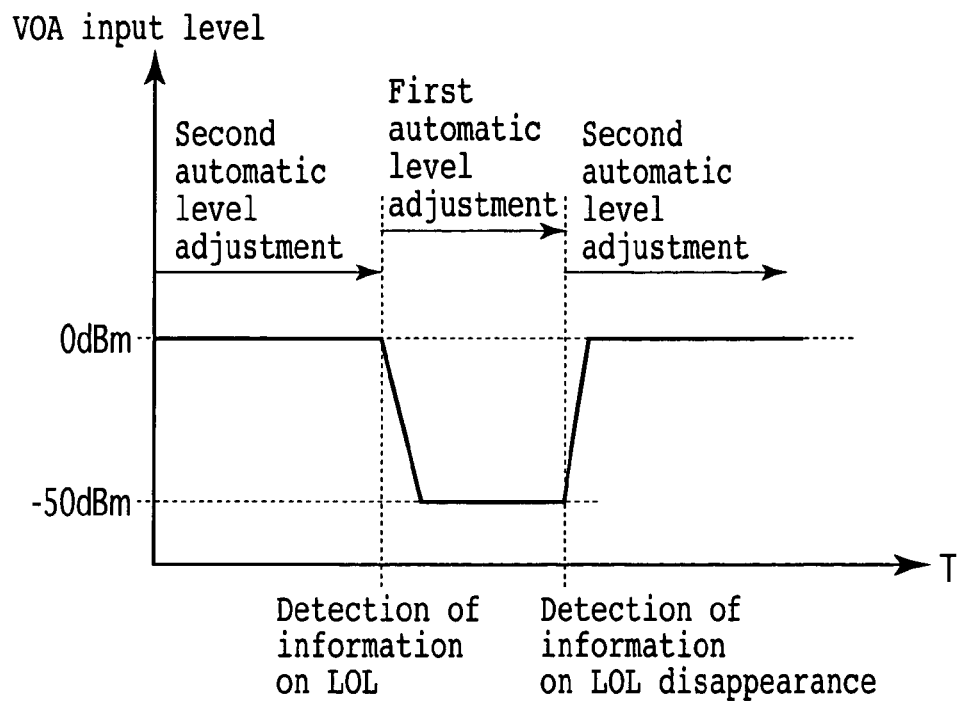
FIG. 51 is a diagram showing variations of the optical level of an optical signal input to a VOA employed in an add or thru node.
Figure 52:
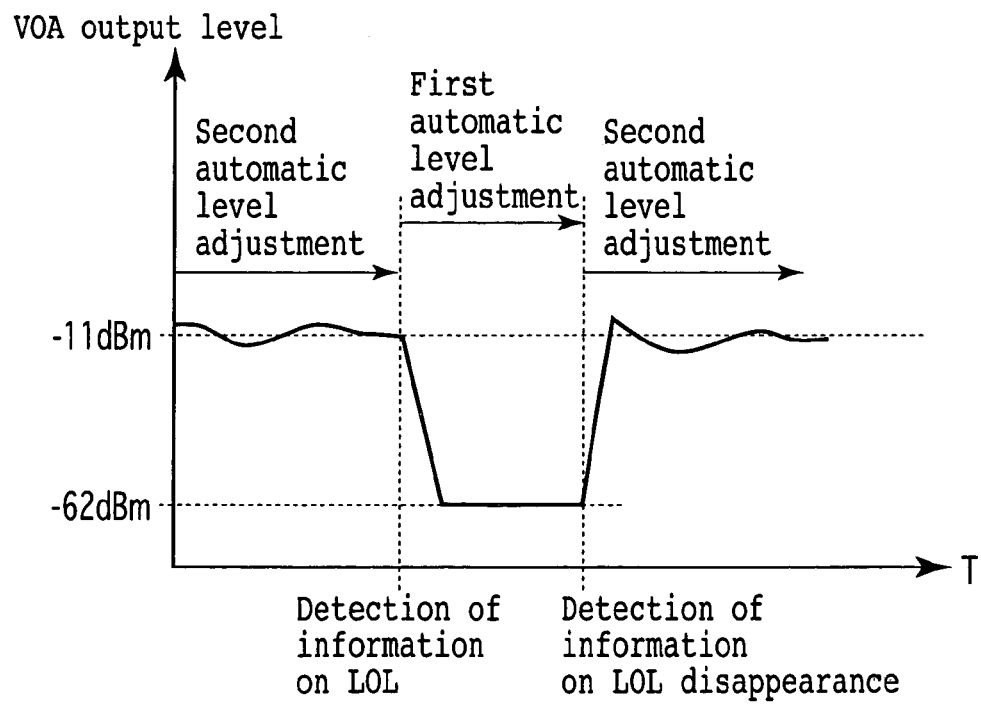
FIG. 52 is a diagram showing variations of the optical level of an optical signal output by a VOA employed in an add or thru node.
Figure 53:
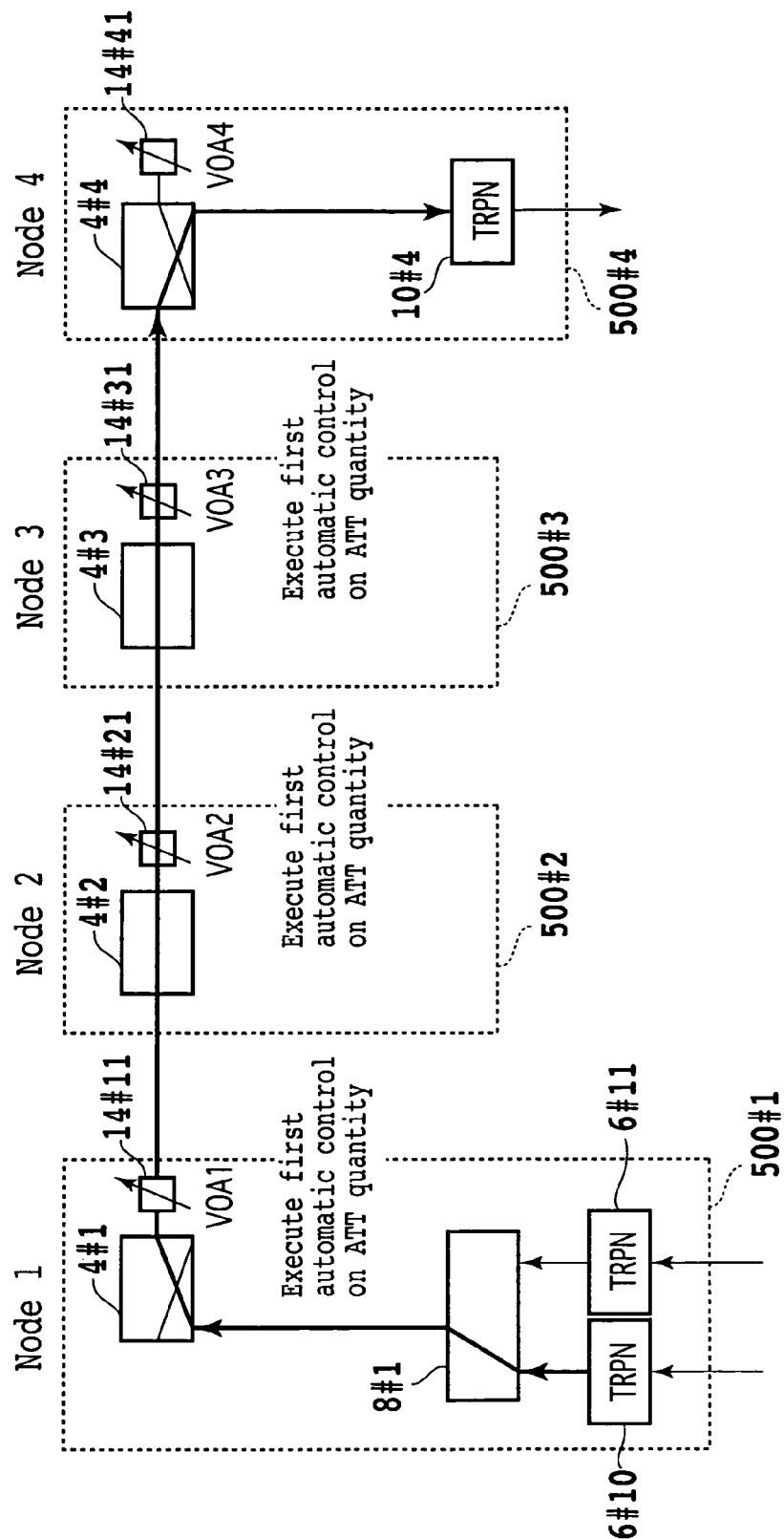
FIG. 53 is an explanatory diagram referred to in describing operations carried out in a normal state.
Figure 54:
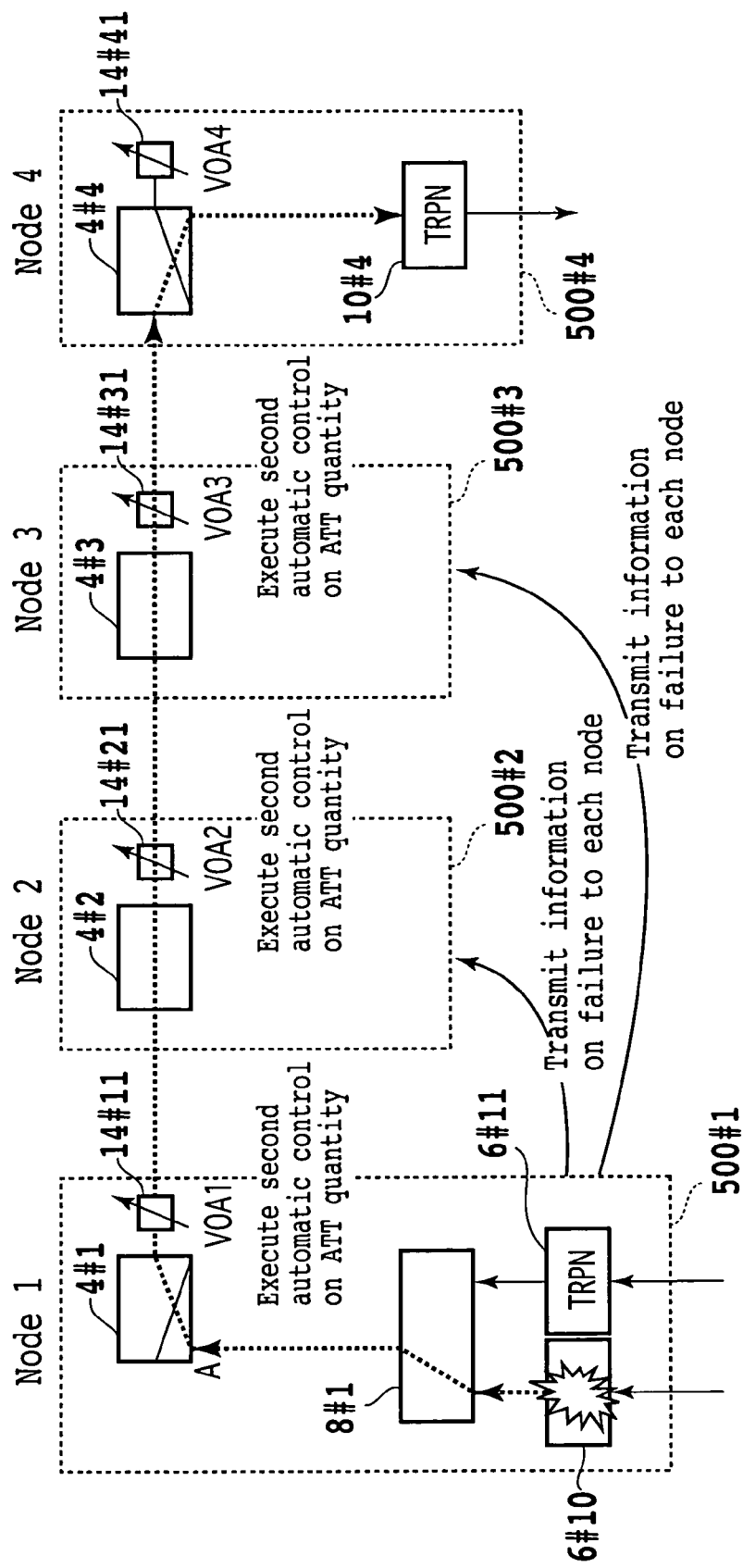
FIG. 54 is an explanatory diagram referred to in describing operations carried out in the event of a failure.
Figure 55:
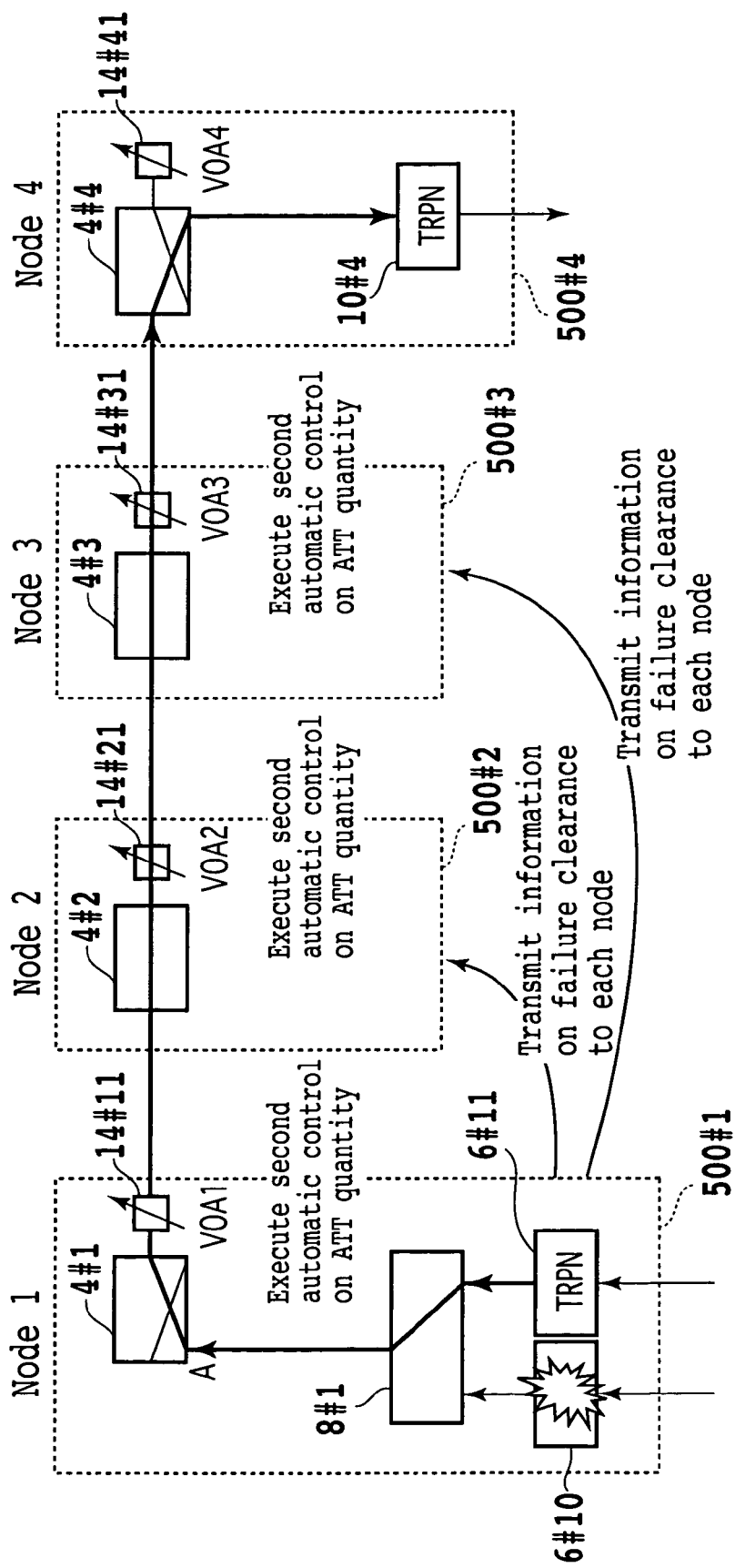
FIG. 55 is an explanatory diagram referred to in describing operations carried out right after a recovery from a failure.
Figure 56:
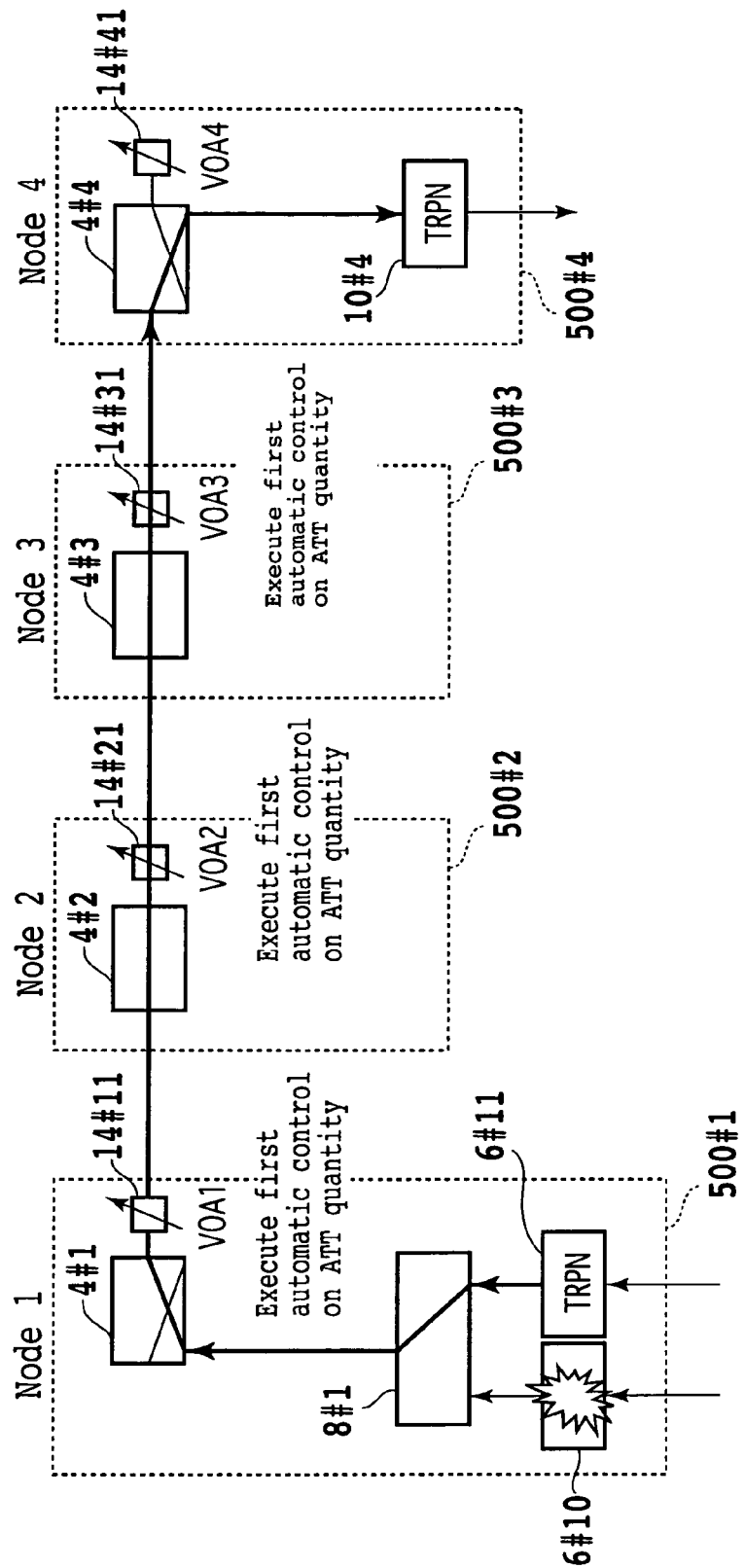
FIG. 56 is an explanatory diagram referred to in describing operations carried out in a normal state following a recovery from a failure.

FIG. 50 is a diagram showing variations of the ATT quantity of the variable optical attenuator VOA 14#ij employed in the add or thru node implemented by the ninth embodiment as variations with the lapse of time. FIG. 51 is a diagram showing variations of the optical level of an optical signal input to the variable optical attenuator VOA 14#ij employed in the add or thru node implemented by the ninth embodiment as variations with the lapse of time. FIG. 52 is a diagram showing variations of the optical level of an optical signal output by the variable optical attenuator VOA 14#ij employed in the add or thru node implemented by the ninth embodiment as variations with the lapse of time. In the figures, the horizontal axes each represent the lapse of time (T) whereas the vertical axes represent the ATT quantity of the variable optical attenuator VOA 14#ij, the optical level of a signal input to the variable optical attenuator VOA 14#ij and the optical level of a signal output by the variable optical attenuator VOA 14#ij. FIGS. 50 to 52 are the same as FIGS. 42 to 44 respectively except that the LOL failure and the disappearance of an LOL failure in FIGS. 42 to 44 are respectively replaced with detection of information on the LOL failure and detection of information on the disappearance of an LOL failure in FIGS. 50 to 52. FIG. 53 is an explanatory diagram showing operations carried out in a normal state. FIG. 54 is an explanatory diagram showing operations carried out in the event of a failure. FIG. 55 is an explanatory diagram showing operations carried out right after a recovery from a failure. FIG. 56 is an explanatory diagram referred to in describing operations carried out in a normal state following a recovery from a failure.

(1): Normal State

In a normal state, as shown in FIG. 53, the control circuit 452#i1 employed in a node 500#i where i=1, 2 and 3 executes second automatic level adjustment also referred to as first automatic control on the ATT quantity of the variable optical attenuator VOA 14#i1 where i=1, 2 and 3.

(2): In the Event of a Failure

The control unit 450#1 employed in the add node 500#1 collects information on a failure related to an optical signal supplied to the variable optical attenuator VOA 14#11 and passes on the information to a control circuit 452#11 and a node 500#2. The information on a failure includes information on the hardware of the transponder (TRPN) transmitter 6#10 employed in the work system. Receiving the information on a failure from the add node 500#1, a control unit 450#2 employed in the node 500#2 passes on the information to a control circuit 452#21 and a node 500#3 as information on a failure related to the VOA input of a variable optical attenuator VOA 14#21. By the same token, receiving the information on a failure from the add node 500#2, a control unit 450#3 employed in the node 500#3 passes on the information to a control circuit 452#31 and a node 500#4 as information on a failure related to the VOA input of a variable optical attenuator VOA 14#31.

If a failure occurs in the transponder (TRPN) transmitter 6#10, the control circuit 452#i1 shown in FIG. 54 where i=1, 2 and 3 receives information on the failure from the control unit 450#i where i=1, 2 and 3. Receiving the information on the failure from the control unit 450#i, the control circuit 452#i1 determines that the failure is an LOL failure of an optical signal input to the variable optical attenuator VOA 14#i1 and executes the first automatic adjustment with a response speed different from that of the second automatic level adjustment on the ATT quantity of the variable optical attenuator VOA 14#*i*1. The first automatic adjustment is also referred to as first automatic control.

(3): Right After a Recovery From the Failure

When the optical path is switched from the transponder (TRPN) transmitter 6#10 to the transponder (TRPN) transmitter 6#11 to make a recovery from the LOL failure, as shown in FIG. 55, the control circuit 452#*i*1 where i=1, 2 and 3 receives a notice indicating that the information on the LOL failure has been cleared from the control unit 450#*i* where i=1, 2 and 3. Receiving the notice indicating that the information on the LOL failure has been cleared from the control unit 450#*i*, the control circuit 452#*i*1 determines that the LOL failure of the optical signal input to the variable optical attenuator VOA 14#*i*1 has been corrected and executes first automatic adjustment, which is also referred to as first automatic control, on the ATT quantity of the variable optical attenuator VOA 14#*i*1.

(4): Normal State After the Recovery From the Failure

As shown in FIG. 56, the control circuit 452#*i*1 continues the second automatic adjustment to automatically control the ATT quantity of the variable optical attenuator VOA 14#*i*1.

In accordance with the embodiment described above, information on the occurrence of a failure and information on the disappearance of the failure are supplied to a control circuit and used in the control circuit as information for controlling the ATT quantity of the VOA to exhibit the same effects as the fourth embodiment.

Tenth Embodiment

Figure 57:
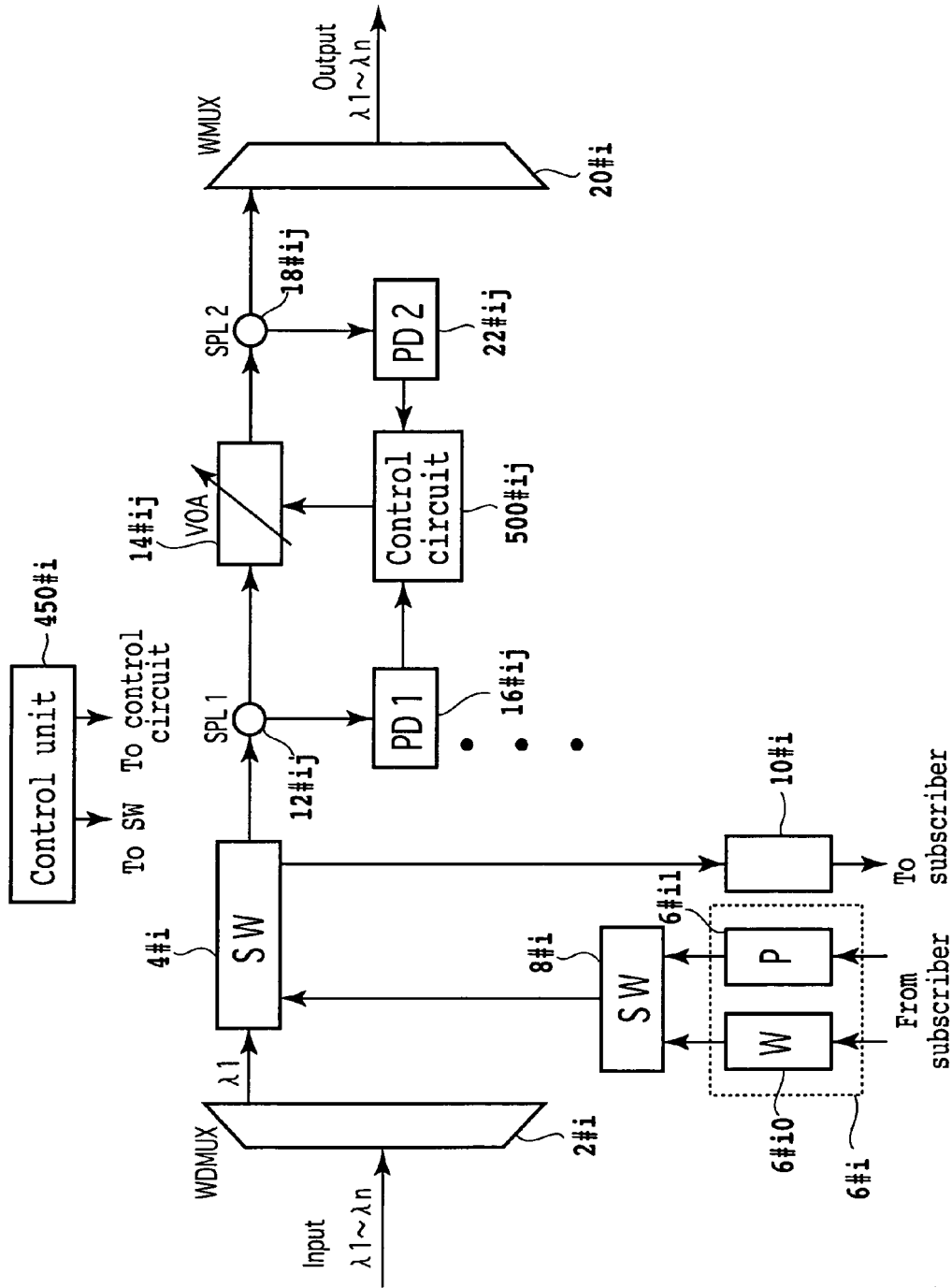
FIG. 57 is a diagram showing the configuration of a node implemented by a tenth embodiment of the present invention.

FIG. 57 is a diagram showing the configuration of a node implemented by a tenth embodiment of the present invention. In this figure, components virtually identical with their counterparts shown in FIG. 48 are denoted by the same reference numerals as the counterparts. The control circuit 500#*ij* determines occurrence of an LOL failure happening to an optical signal supplied to the variable optical attenuator VOA 14#*ij* or disappearance of the LOL failure on the basis of information received from the control unit 450#*i* as information on the failure. Thus the control circuit 500#*ij* controls the attenuation quantity at the time of the LOL failure and the disappearance of the LOL failure.

Figure 58:
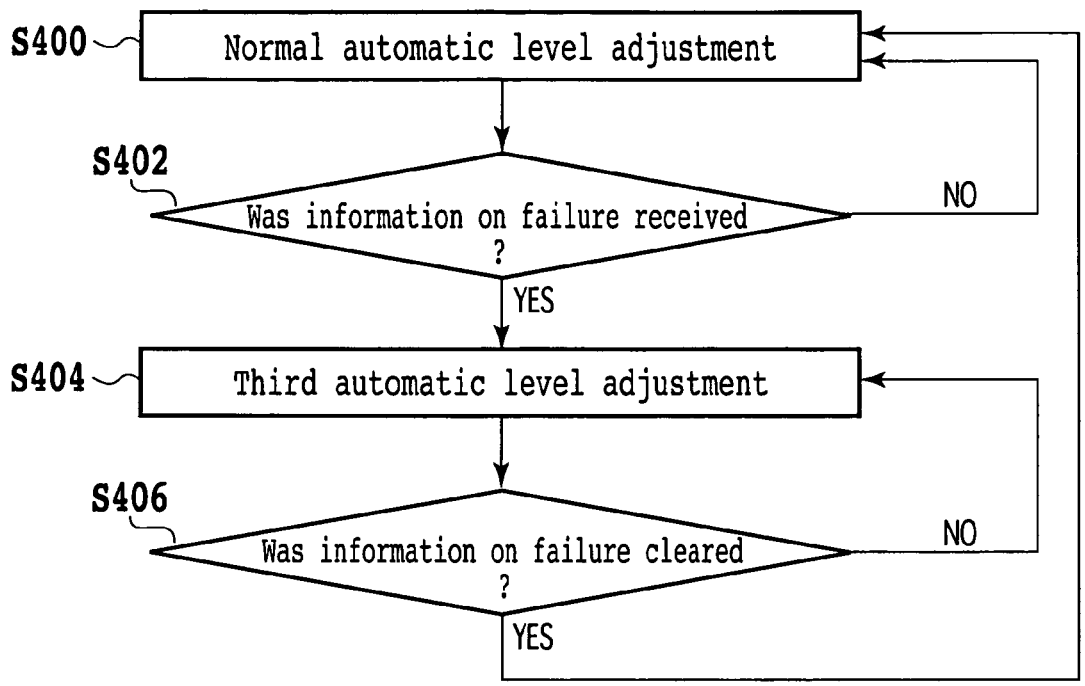
FIG. 58 shows a flowchart representing operations carried out by a control circuit employed in an add or thru node.

FIG. 58 shows a flowchart representing operations carried out by the control circuit 500#*ij* employed in the add or thru node implemented by the tenth embodiment. As shown in the figure, the flowchart begins with a step S400 at which the control circuit 500#*ij* executes automatic control of the optical level in a normal state. This automatic control of the optical level in a normal state is referred to as normal level automatic adjustment. Then, at the next step S402, the control circuit 500#*ij* determines whether or not information on a failure has been received. If information on a failure has been received, the flow of the processing goes on to a step S404. If information on a failure has not been received, on the other hand, the flow of the processing goes back to the step S400 at which the control circuit 500#*ij* continues the automatic control of the optical level in a normal state. At the step S404, the control circuit 500#*ij* carries out third ATT quantity locking adjustment. In the third ATT quantity locking adjustment, the ATT quantity of the variable optical attenuator VOA 14#*ij* is fixed at a constant value such as the ATT quantity applied by the variable optical attenuator VOA 14#*ij* right after the LOL failure. Then, at the next step S406, the control circuit 500#*ij* determines whether or not the information on the failure has been cleared. If the information on the failure has been cleared, the flow of the processing goes back to the step S400 at which the control circuit 500#*ij* resumes the normal level automatic adjustment. If the information on the failure has not been cleared, on the other hand, the flow of the processing goes back to the step S404 at which the control circuit 500#*ij* continues the first ATT quantity locking adjustment.

Figure 59:
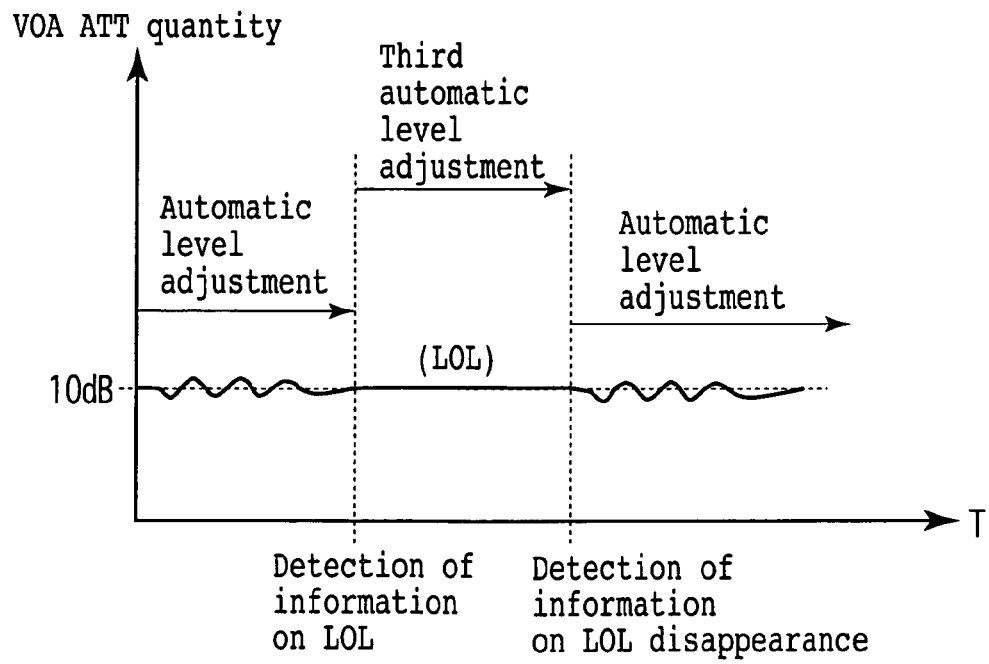
FIG. 59 is a diagram showing variations of an ATT quantity of a VOA employed in an add or thru node.
Figure 60:
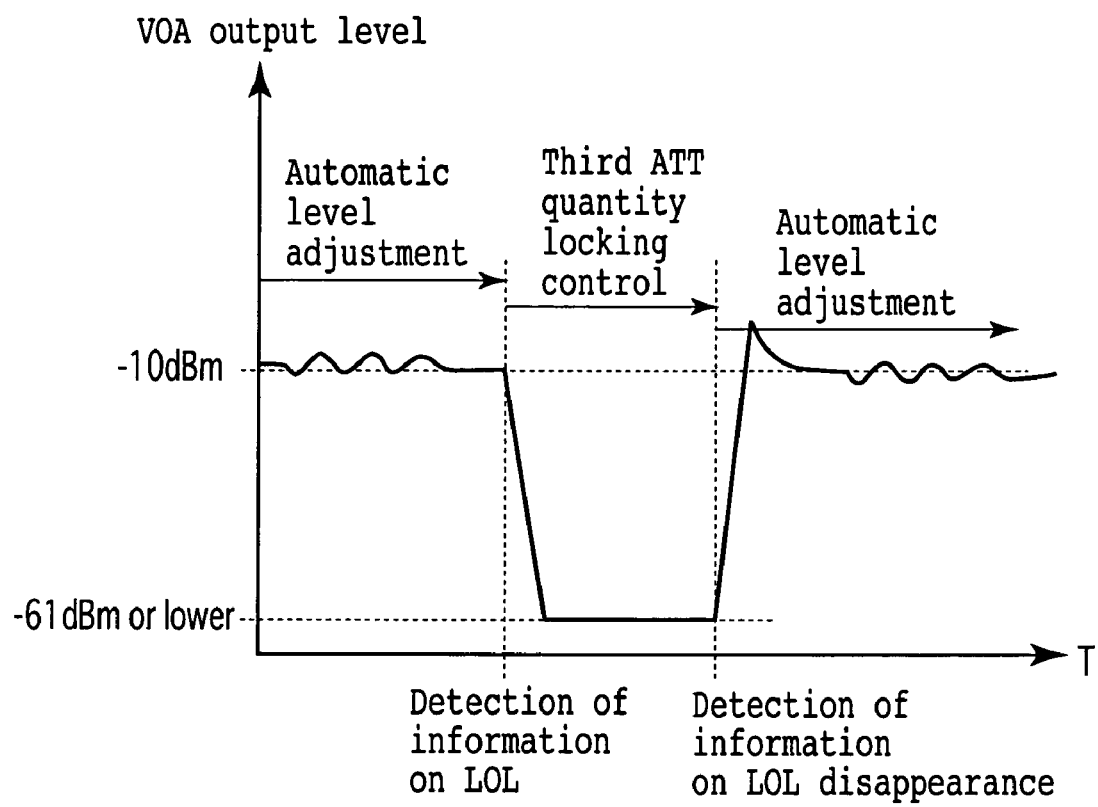
FIG. 60 is a diagram showing variations of the optical level of an optical signal output by a VOA employed in an add or thru node.

FIG. 59 is a diagram showing variations of an ATT quantity of the variable optical attenuator VOA 14#*ij* employed in the add or thru node implemented by the tenth embodiment as variations with the lapse of time. FIG. 60 is a diagram showing variations of the optical level of an optical signal output by the variable optical attenuator VOA 14#*ij* employed in the add or thru node implemented by the tenth embodiment as variations with the lapse of time. In the figures, the horizontal axes each represent the lapse of time (T) whereas the vertical axes represent the ATT quantity of the variable optical attenuator VOA 14#*ij* and the optical level of a signal output by the variable optical attenuator VOA 14#*ij*. FIGS. 59 and 60 are the same as FIGS. 34 and 35 respectively except that the LOL failure and the disappearance of an LOL failure in FIGS. 34 and 35 are respectively replaced with detection of information on the LOL failure and detection of information on the disappearance of an LOL failure in FIGS. 59 to 60.

Figure 61:
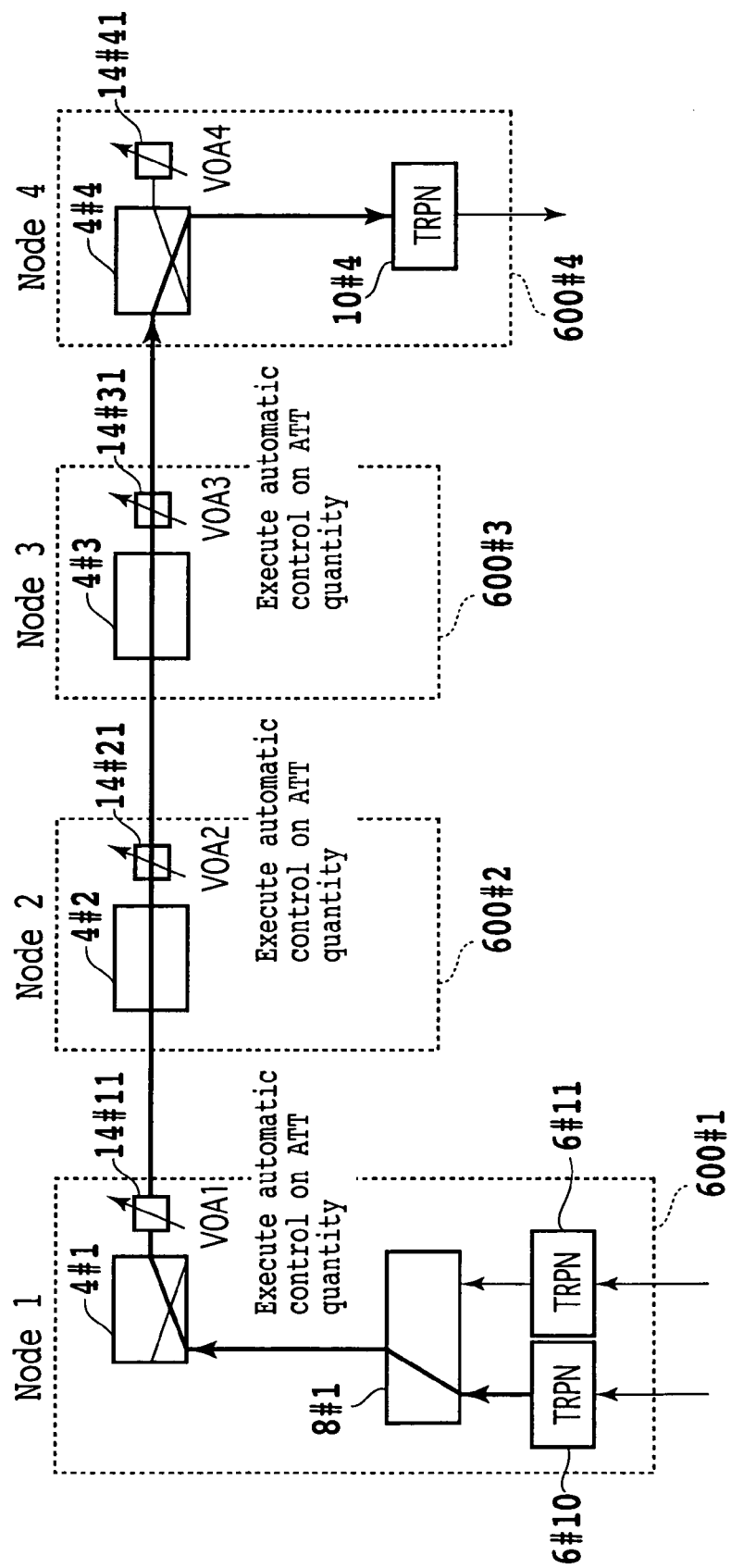
FIG. 61 is an explanatory diagram referred to in describing operations carried out in a normal state.
Figure 62:
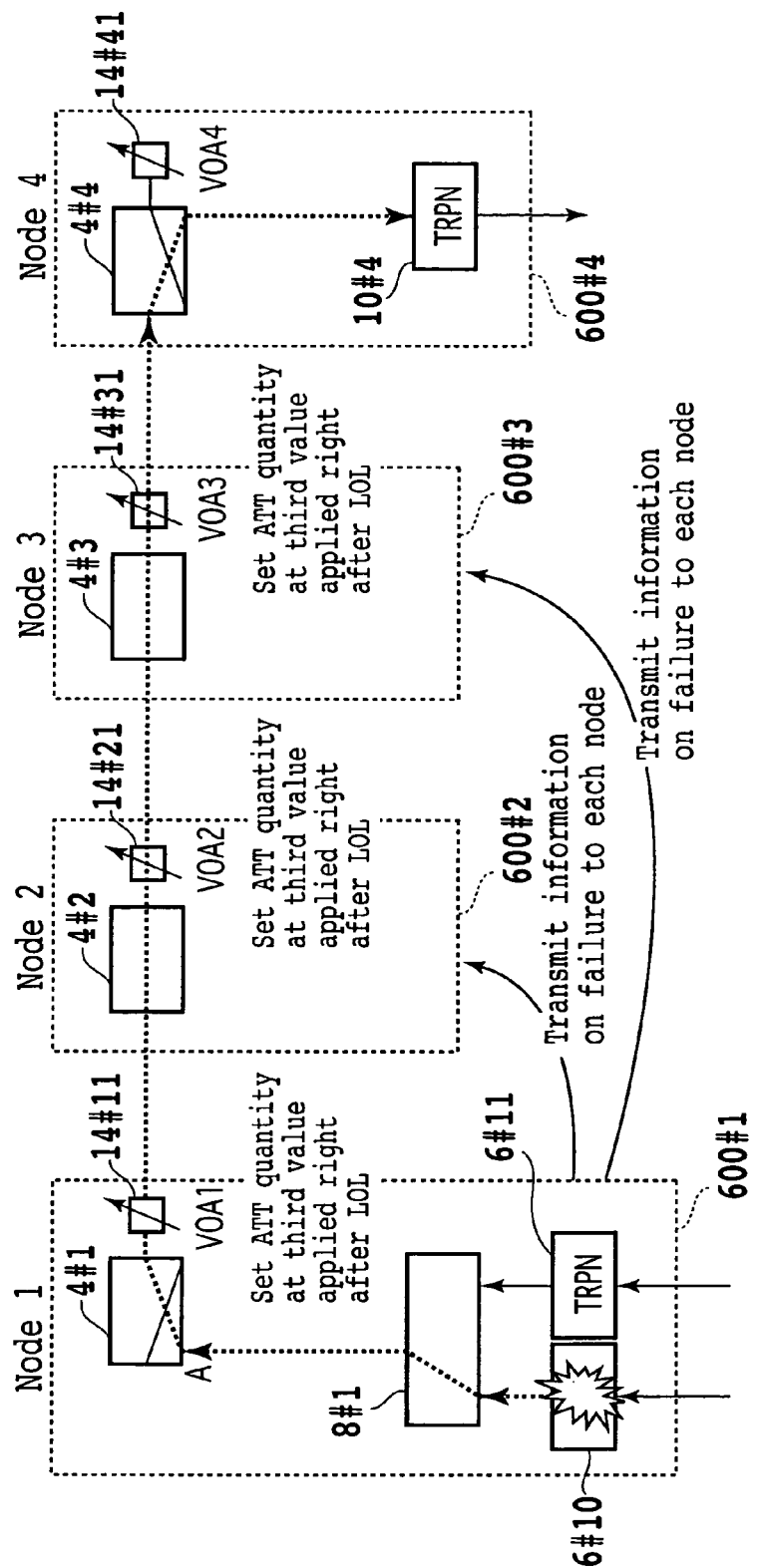
FIG. 62 is an explanatory diagram referred to in describing operations carried out in the event of a failure.
Figure 63:
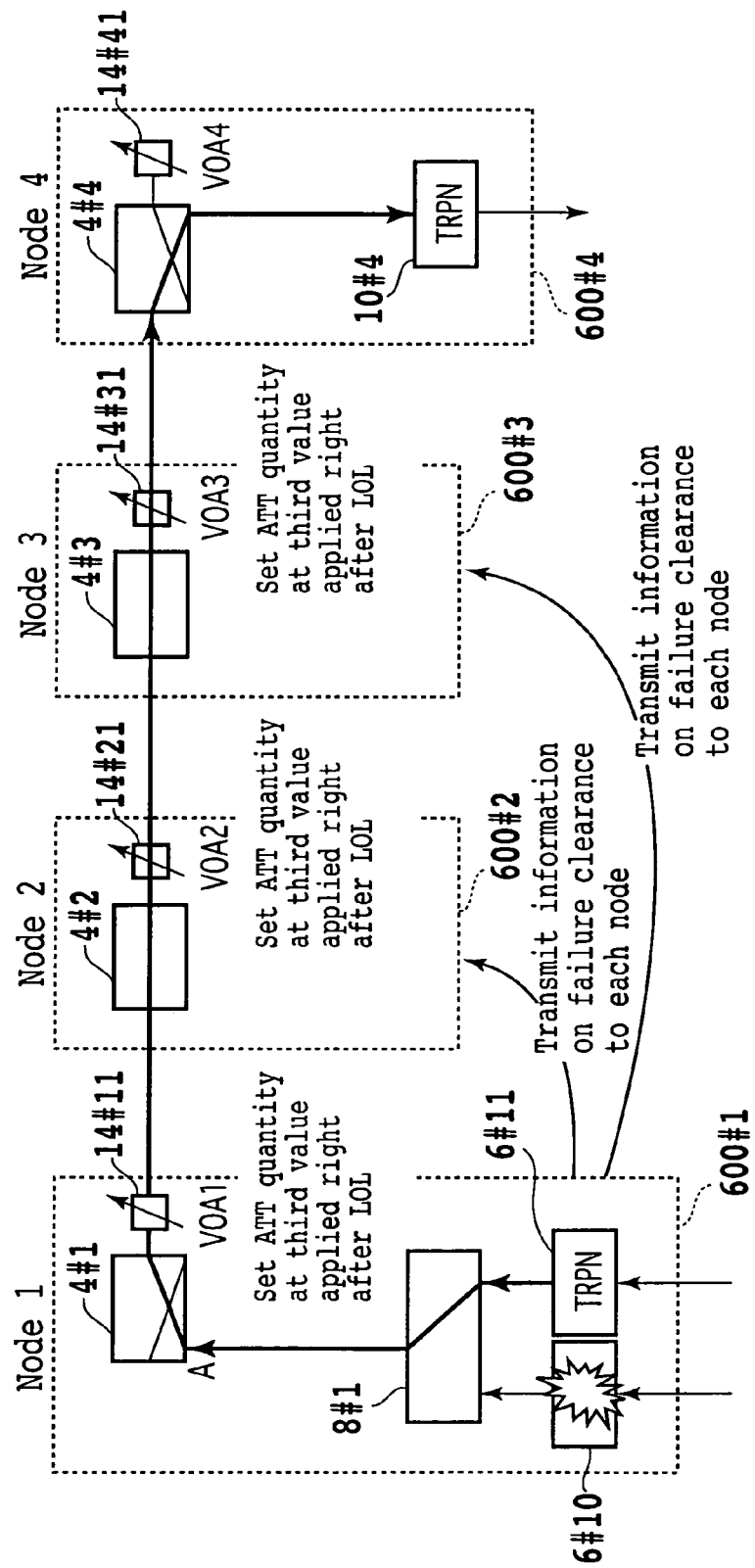
FIG. 63 is an explanatory diagram referred to in describing operations carried out right after a recovery from a failure.
Figure 64:
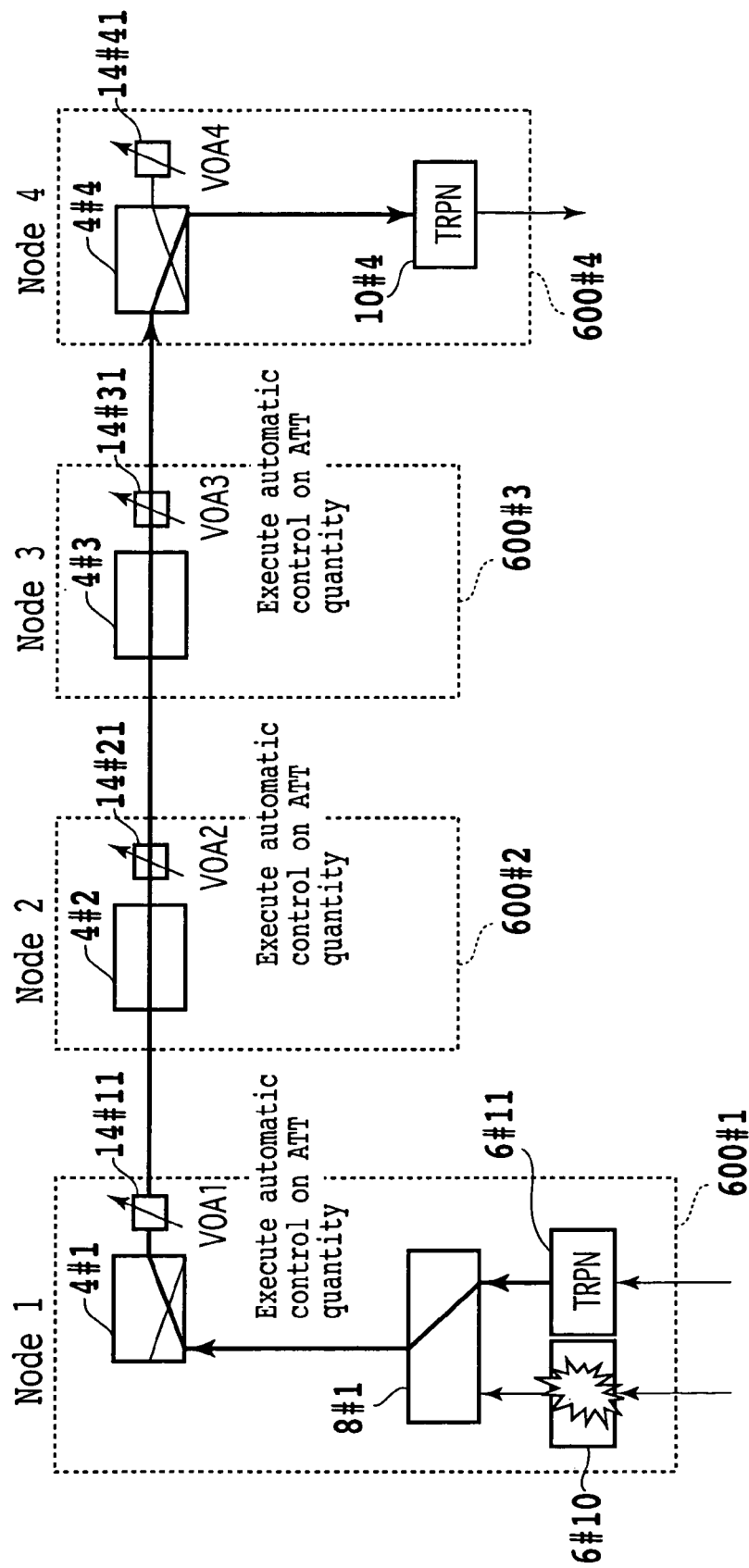
FIG. 64 is an explanatory diagram referred to in describing operations carried out in a normal state following a recovery from a failure.

FIG. 61 is an explanatory diagram showing operations carried out in a normal state. FIG. 62 is an explanatory diagram showing operations carried out in the event of a failure. FIG. 63 is an explanatory diagram showing operations carried out right after a recovery from a failure. FIG. 64 is an explanatory diagram showing operations carried out in a normal state following a recovery from a failure. A method of controlling the variable-quantity optical attenuator VOA in a recovery from a failure is explained. In the following description, a node 600#1 functions as an add node, nodes 600#2 and 600#3 each function as a thru node whereas a node 600#4 functions as a drop node.

(1): Normal State

In a normal state, as shown in FIG. 61, the control circuit 500#*i*1 employed in the node 600#*i* where i=1, 2 and 3 executes automatic control on the ATT quantity of the variable optical attenuator VOA 14#*i*1 where i=1, 2 and 3.

(2): In the Event of a Failure

When a failure occurs in the transponder (TRPN) transmitter 6#10, the control unit 500#*i* where i=1, 2 and 3 transmits information on the failure to the control circuit 450#*i*1 where i=1, 2 and 3 as shown in FIG. 62. Receiving the information on the failure from the control unit 500#*i*, the control circuit 500#*i*1 determines that an LOL failure has happened to an optical signal supplied to the variable optical attenuator VOA 14#*i*1 where i=1, 2 and 3 and controls the ATT quantity of the variable optical attenuator VOA 14#*i*1 to a constant value typically equal to the ATT quantity applied by the variable optical attenuator VOA 14#*i*1 right after the LOL failure.

(3): Right After a Recovery From the Failure

When the optical path is switched from the transponder (TRPN) transmitter 6#10 to the transponder (TRPN) transmitter 6#11 to make a recovery from the LOL failure, the control circuit 500#*ij* receives a notice indicating that the information on the LOL failure has been cleared from the control unit 450#*i*. Receiving the notice indicating that the information on the LOL failure has been cleared from the control unit 450#*i*, the control circuit 500#*ij* determines that the LOL failure of the optical signal input to the variable optical attenuator VOA 14#*i*1 has been corrected and transits to the automatic control to adjust the ATT quantity of the variable optical attenuator VOA 14#*i*1 from the ATT quantity applied by the variable optical attenuator VOA 14#i1 right after the LOL failure to the ATT quantity of the normal state.

(4): Normal State After the Recovery From the Failure

The control circuit 500#i1 continues executing the automatic control on the ATT quantity of the variable optical attenuator VOA 14#i1.

In accordance with the embodiment described above, information on the occurrence of a failure and information on the disappearance of the failure are supplied to a control circuit and used in the control circuit as information for controlling the ATT quantity of the VOA to exhibit the same effects as the sixth embodiment.

Eleventh Embodiment

Figure 65:
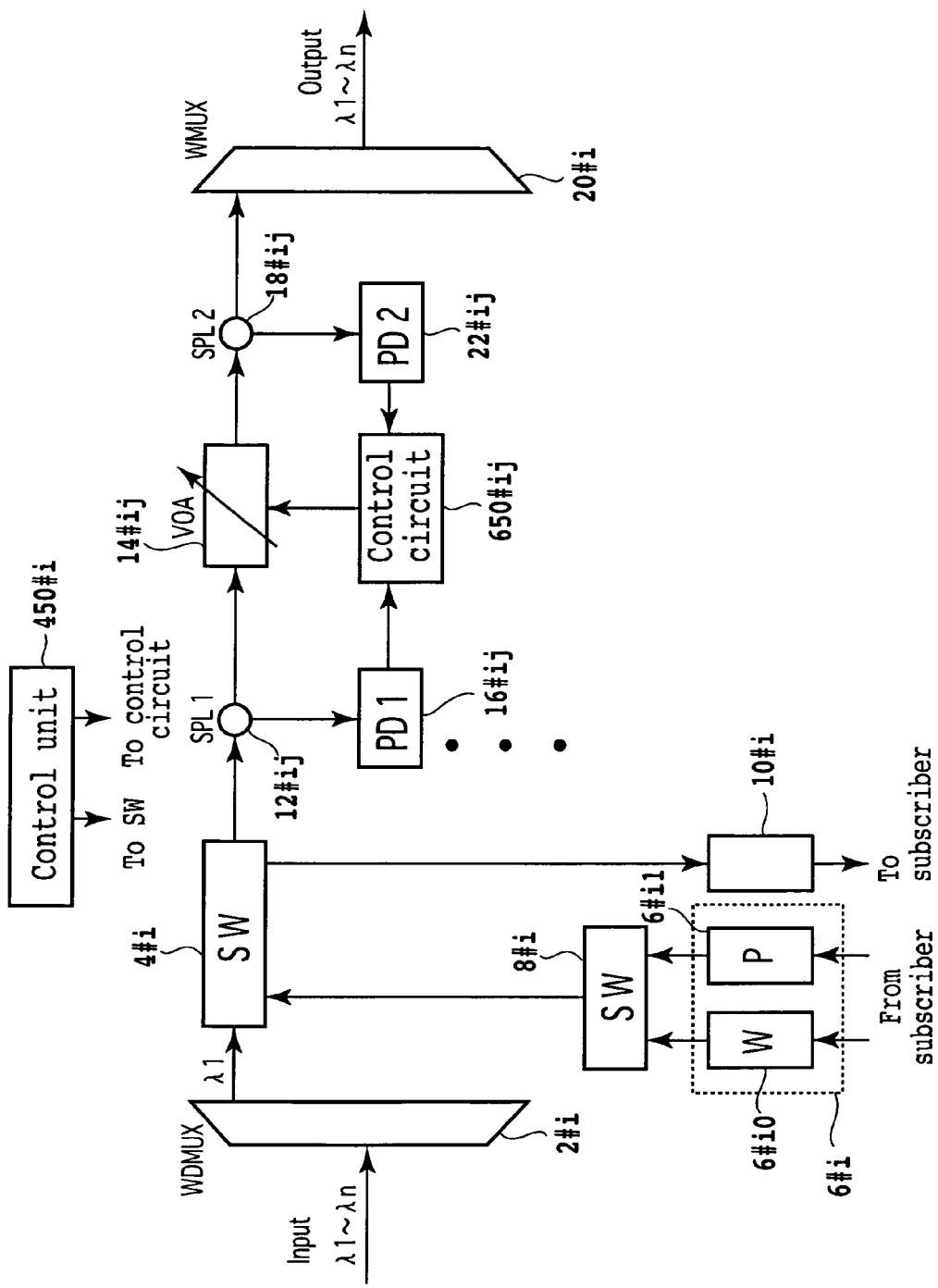
FIG. 65 is a diagram showing the configuration of a node implemented by an eleventh embodiment of the present invention.
Figure 66:
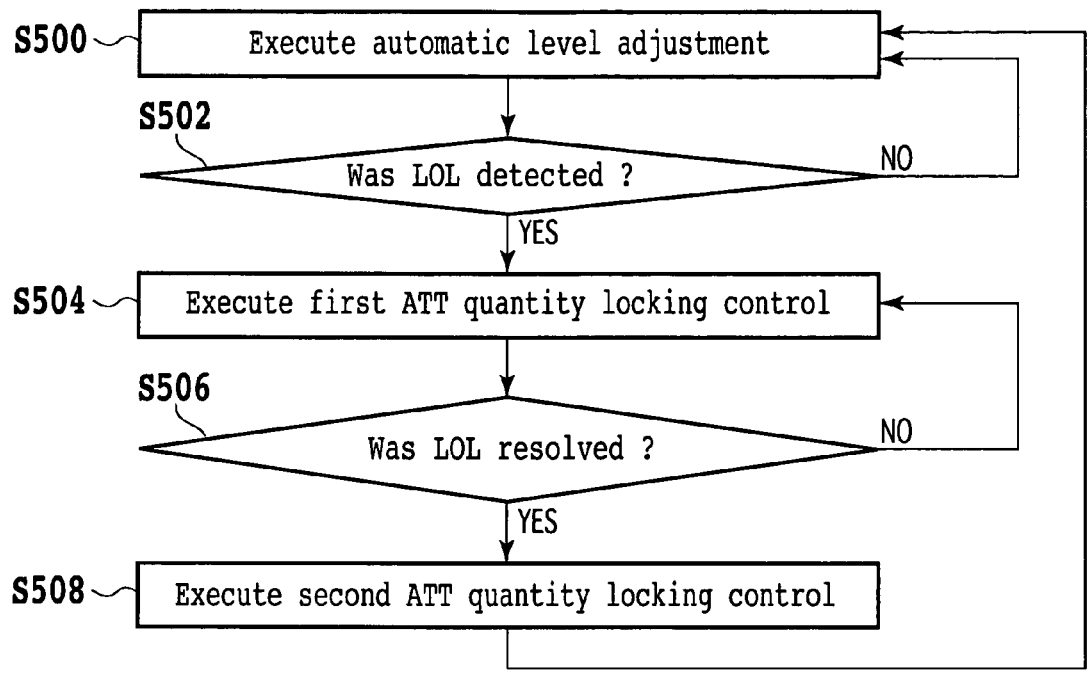
FIG. 66 shows a flowchart representing operations carried out by a control circuit employed in an add node.

FIG. 65 is a diagram showing the configuration of a node implemented by an eleventh embodiment of the present invention. In this figure, components virtually identical with their counterparts shown in FIG. 48 are denoted by the same reference numerals as the counterparts. FIG. 66 shows a flowchart representing operations carried out by the control circuit 650#ij employed in an add node implemented by the eleventh embodiment. As shown in the figure, the flowchart begins with a step S500. At this step, in a normal state, the control circuit 650#ij carries out automatic adjustment of the optical level of an optical signal in the so-called automatic level adjustment. Then, at the next step S502, the control circuit 650#ij determines whether or not an LOL failure has been detected. If an LOL failure has not been detected, the flow of the processing goes back to the step S500 at which the control circuit 650#ij continues the automatic adjustment of the optical level. If an LOL failure has been detected, on the other hand, the flow of the processing goes on to a step S504.

At the step S504, the control circuit 650#ij executes ATT quantity locking control applying a first locked ATT quantity of the variable optical attenuator VOA 14#ij. The ATT quantity locking control applying the first locked ATT quantity of the variable optical attenuator VOA 14#ij is also referred to hereafter as first ATT quantity locking control. Then, at the next step S506, the control circuit 650#ij determines whether or not the LOL failure has been corrected. If the LOL failure has not been corrected, the flow of the processing goes back to the step S504 at which the control circuit 650#ij continues the first ATT quantity locking control. If the LOL failure has been corrected, on the other hand, the flow of the processing goes on to a step S508. At the step S508, the control circuit 650#ij executes ATT quantity locking control, which applies a second locked ATT quantity of the variable optical attenuator VOA 14#ij. Then, the flow of the processing goes back to the step S500 at which the control circuit 650#ij resumes automatic adjustment of the optical level of an optical signal in a normal state. The ATT quantity locking control applying the second locked ATT quantity of the variable optical attenuator VOA 14#ij is also referred to hereafter as second ATT quantity locking control.

Figure 67:
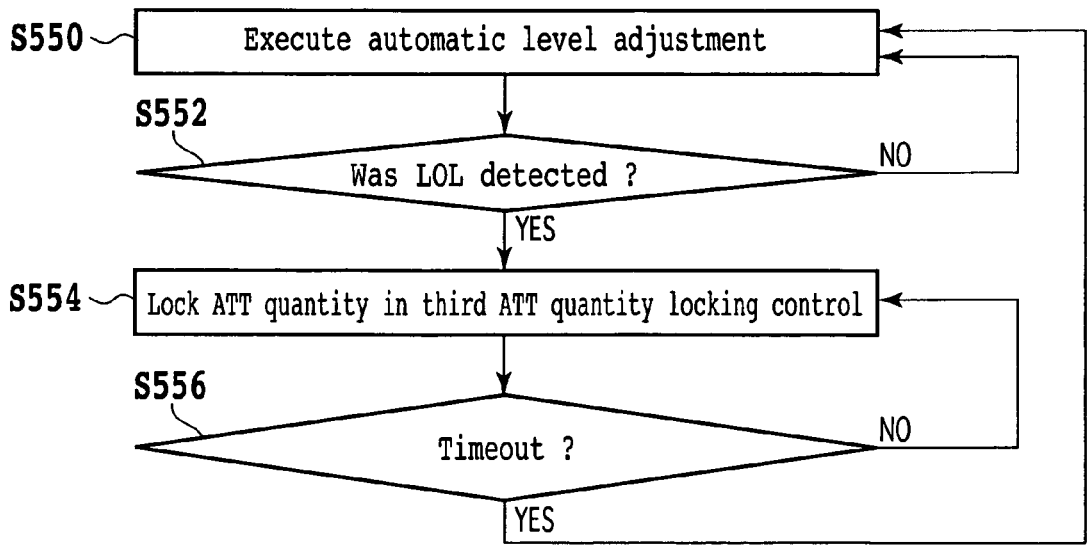
FIG. 67 shows a flowchart representing operations carried out by a control circuit employed in a thru node.

FIG. 67 shows a flowchart representing operations carried out by the control circuit 650#ij employed in a thru node implemented by the eleventh embodiment. The flowchart shown in FIG. 67 begins with a step S550 at which the control circuit 650#ij carries out automatic adjustment of the optical level of an optical signal in a normal state. Then, at the next step S552, the control circuit 650#ij determines whether or not an LOL failure has been detected. If an LOL failure has not been detected, the flow of the processing goes back to the step S550 at which the control circuit 650#ij continues the automatic adjustment of the optical level. If an LOL failure has been detected, on the other hand, the flow of the processing goes on to a step S554 at which the control circuit 650#ij executes ATT quantity locking control by applying a locked ATT quantity of the variable optical attenuator VOA 14#ij. The ATT quantity locking control applying the locked ATT quantity of the variable optical attenuator VOA 14#ij is also referred to hereafter as third ATT quantity locking control. The locked ATT quantity of the variable optical attenuator VOA 14#ij is typically a locked ATT quantity applied by the variable optical attenuator VOA 14#ij right after the LOL failure. Then, at the next step S556, the control circuit 650#ij determines whether or not a timeout has occurred. A timeout is determined to have occurred when a predetermined time period measured by a timer lapses. The predetermined time period is typically a period of time between occurrence of an ordinary LOL failure and disappearance of the LOL failure. Normally, an LOL failure disappears when the optical path is switched from the work system to a protection system. For example, the predetermined time period is set at a value of 500 ms. That is to say, a measurement result produced by the timer should reveal the occurrence of a timeout after the LOL failure has disappeared. If a timeout has occurred, the flow of the processing goes back to the step S550 at which the control circuit 650#ij resumes the automatic adjustment of the optical level of an optical signal in a normal state. If a timeout has not occurred, on the other hand, the flow of the processing goes back to the step S554 at which the control circuit 650#ij continues the third ATT quantity locking control.

Figure 68:
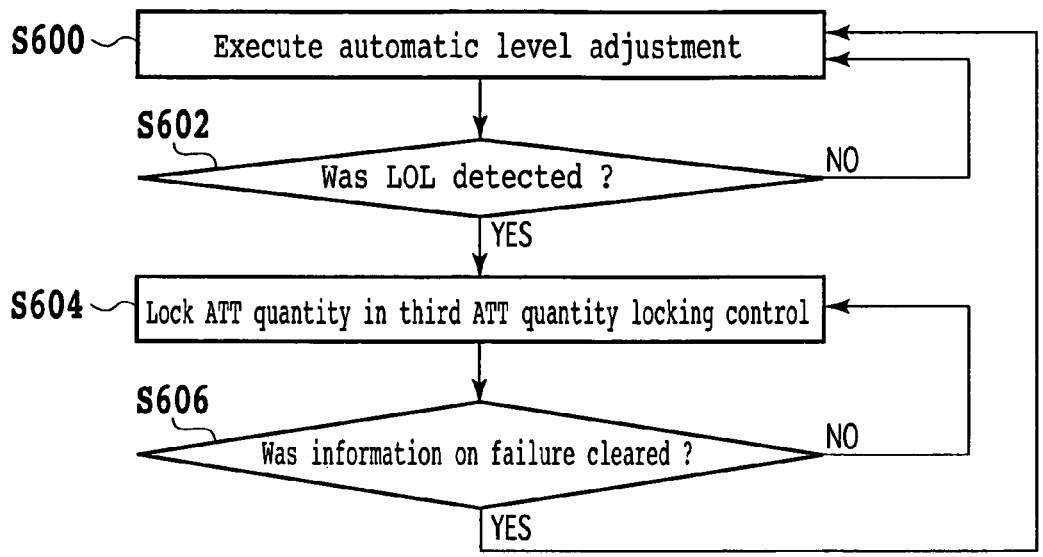
FIG. 68 shows another flowchart representing operations carried out by a control circuit employed in a thru node.

FIG. 68 shows another flowchart representing operations carried out by control circuit 650#ij employed in a thru node implemented by the eleventh embodiment. The flowchart shown in FIG. 68 is the same as that shown in FIG. 67 except that, in the flowchart shown in FIG. 68, in place of the detection of a timeout, disappearance of an LOL failure itself is used as a trigger. In this case, information on an LOL failure is obtained from an external source because there are some conceivable cases in which a detection unit employed in the control circuit 650#ij as a unit for detecting a failure does not function correctly. As examples of the failure detection unit not functioning correctly, a failure occurs in the detection unit employed in the control circuit 650#ij itself or a failure of the variable optical attenuator VOA 14#ij puts the variable optical attenuator VOA 14#ij in an opened state. In an opened state, for example, an optical amplifier accumulates optical noises, which make it impossible in some cases to detect an optical-level LOL failure state caused by a real LOL failure.

The flowchart shown in FIG. 68 begins with a step S600 at which the control circuit 650#ij carries out automatic adjustment of the optical level of an optical signal in a normal state. Then, at the next step S602, the control circuit 650#ij determines whether or not an LOL failure has been detected.

If an LOL failure has not been detected, the flow of the processing goes back to the step S600 at which the control circuit 650#ij continues the automatic adjustment of the optical level. If an LOL failure has been detected, on the other hand, the flow of the processing goes on to a step S604 at which the control circuit 650#ij executes ATT quantity locking control by applying a locked ATT quantity of the variable optical attenuator VOA 14#ij. The ATT quantity locking control applying the locked ATT quantity of the variable optical attenuator VOA 14#ij is also referred to hereafter as third ATT quantity locking control. The locked ATT quantity of the variable optical attenuator VOA 14#ij is typically a locked ATT quantity applied by the variable optical attenuator VOA 14#ij right after the LOL failure. Then, at the next step S606, the control circuit 650#ij determines whether or information on the LOL failure has been cleared. If the information on the LOL failure has been cleared, the flow of the processing goes back to the step S600 at which the control circuit 650#*ij* resumes the automatic adjustment of the optical level of an optical signal in a normal state. If the information on the LOL failure has not been cleared, on the other hand, the flow of the processing goes back to the step S604 at which the control circuit 650#*ij* continues the third ATT quantity locking control. In a thru node, the control circuit 650#*ij* is allowed to arbitrarily select the flowchart shown in FIG. 67 or 68.

Figure 69:
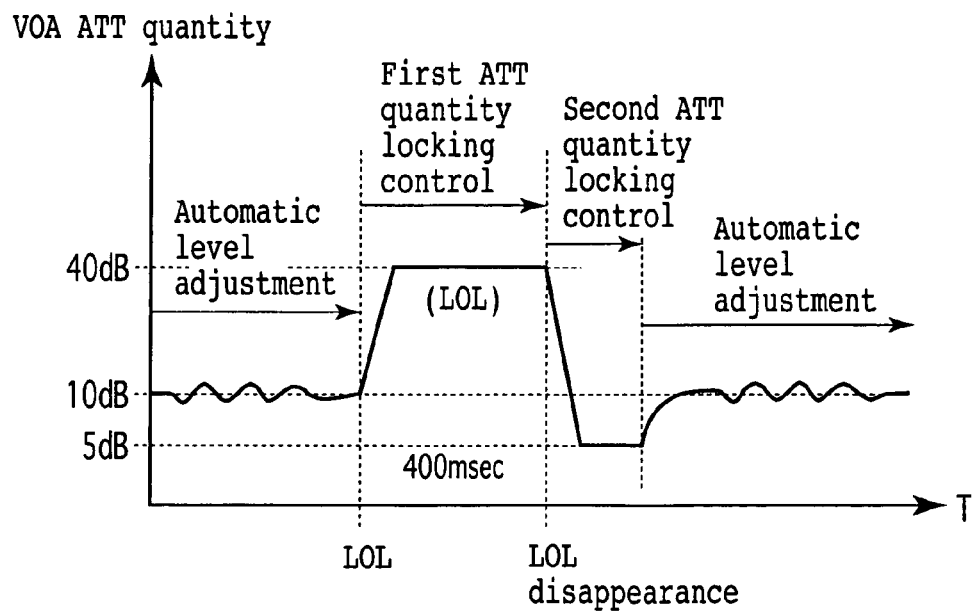
FIG. 69 is a diagram showing variations of an ATT quantity of a VOA employed in an add node.
Figure 70:
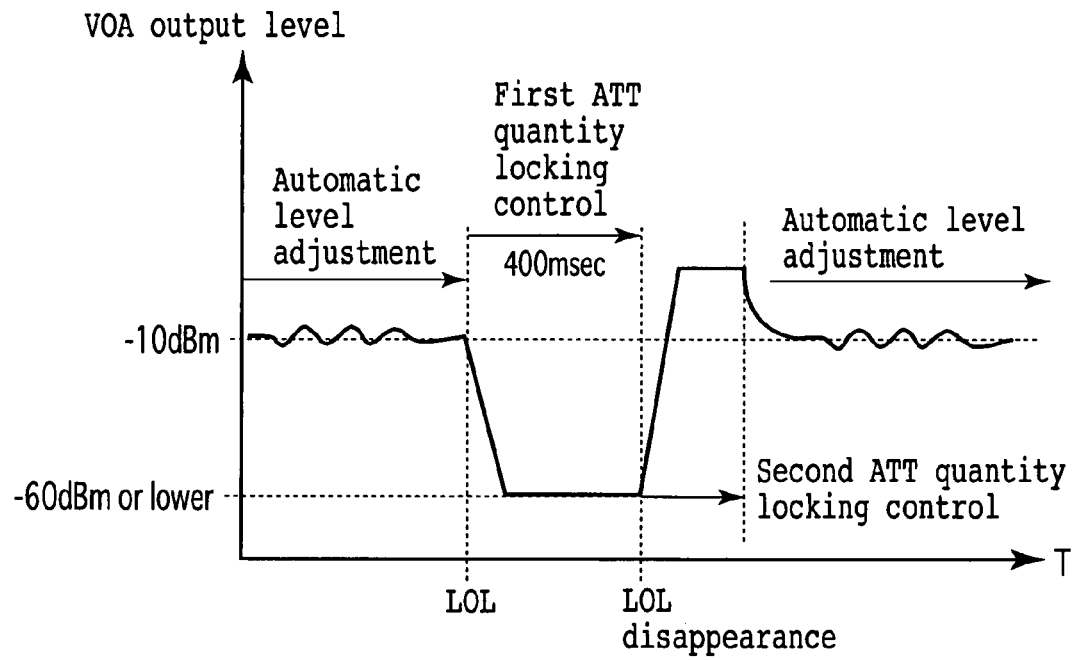
FIG. 70 is a diagram showing variations of the optical level of an optical signal output by a VOA employed in an add node.
Figure 71:
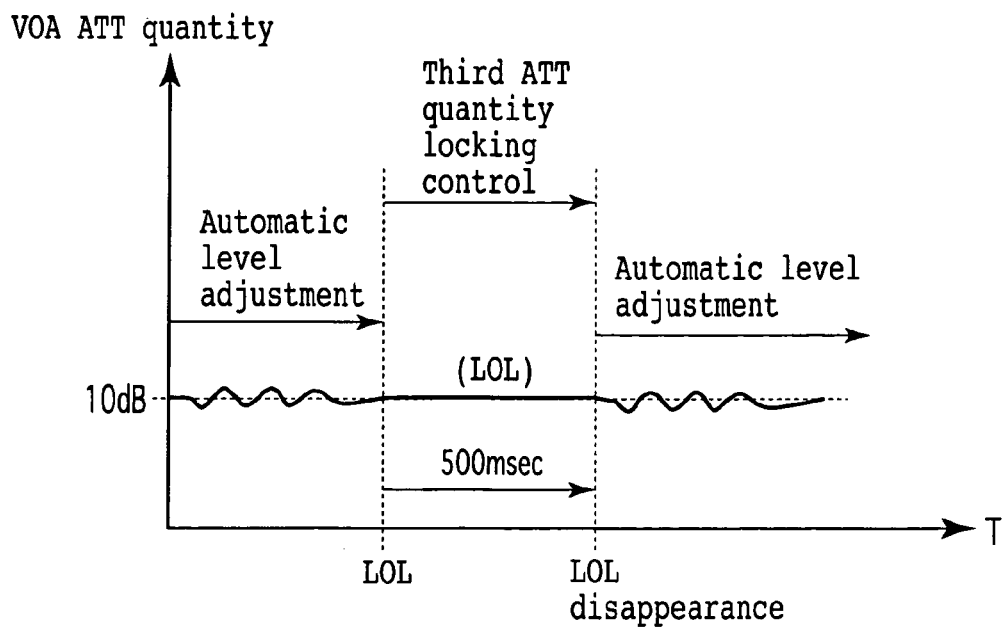
FIG. 71 is a diagram showing variations of an ATT quantity of a VOA employed in a thru node.
Figure 72:
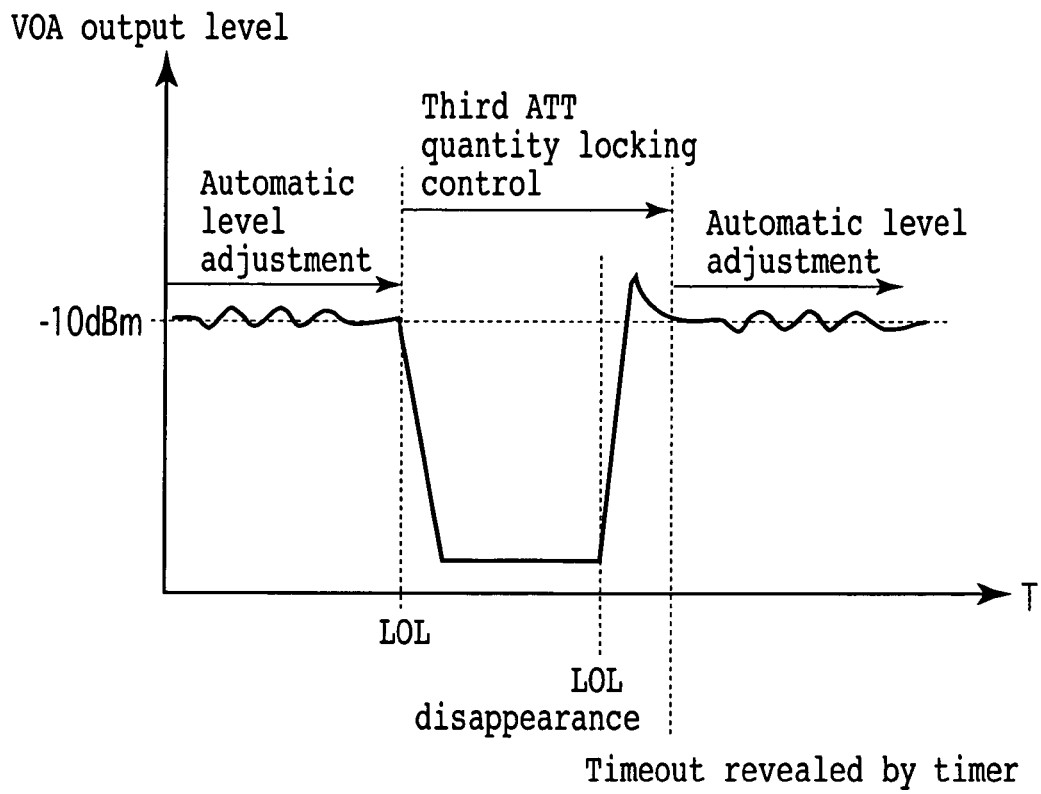
FIG. 72 is a diagram showing variations of the optical level of an optical signal output by a VOA employed in a thru node.

FIG. 69 is a diagram showing variations of an ATT quantity of the variable optical attenuator VOA 14#*ij* employed in an add node implemented by the eleventh embodiment as variations with the lapse of time. FIG. 70 is a diagram showing variations of the optical level of an optical signal output by the variable optical attenuator VOA 14#*ij* employed in an add node implemented by the eleventh embodiment as variations with the lapse of time. FIG. 71 is a diagram showing variations of an ATT quantity of the variable optical attenuator VOA 14#*ij* employed in a thru node adopting the flowchart shown in FIG. 67 in accordance with the eleventh embodiment as variations with the lapse of time. FIG. 72 is a diagram showing variations of the optical level of an optical signal output by the variable optical attenuator VOA 14#*ij* employed in a thru node adopting the flowchart shown in FIG. 67 in accordance with the eleventh embodiment as variations with the lapse of time. In the figures, the horizontal axes each represent the lapse of time (T) whereas the vertical axes represent the ATT quantity of the variable optical attenuator VOA 14#*ij* and the optical level of a signal output by the variable optical attenuator VOA 14#*ij*.

As shown in FIG. 69, in the add node in a normal state, the automatic level adjustment is carried out with the ATT quantity of the variable optical attenuator VOA 14#*ij* set at about 10 dB. In the event of an LOL failure, the first ATT quantity locking control is executed by locking the ATT quantity of the variable optical attenuator VOA 14#*ij* at a constant value of 40 dB. When a recovery is made from the LOL failure, the second ATT quantity locking control is executed to control the ATT quantity of the variable optical attenuator VOA 14#*ij* to a constant value of 5 dB prior to resumption of the automatic control or the automatic level adjustment in the normal state.

In the case of a thru node, on the other hand, right after an LOL failure, third ATT quantity locking control is executed to control the ATT quantity of the variable optical attenuator VOA 14#*ij* locked at a constant value of 10 dB. Afterwards, the lapse of time is monitored and, as the timer reveals a time lapse of 500 msec, the automatic control or the automatic level adjustment in the normal state is resumed at the end of the timeout period of 500 msec. The LOL failure state may last for a period of only 400 msec. That is to say, the LOL failure disappears before the timeout occurs. In this case, the optical level of the optical signal output by the variable optical attenuator VOA 14#*ij* employed in the thru node is restored to the level of the normal state as a recovery is made from the LOL failure state.

Figure 73:
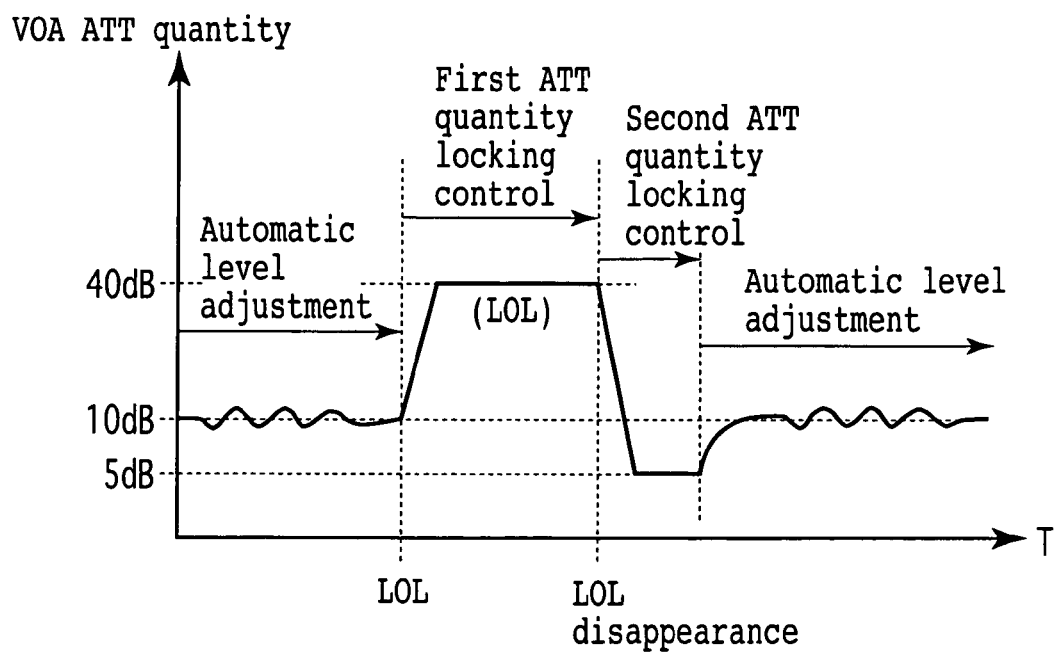
FIG. 73 is another diagram showing variations of an ATT quantity of a VOA employed in an add node.
Figure 74:
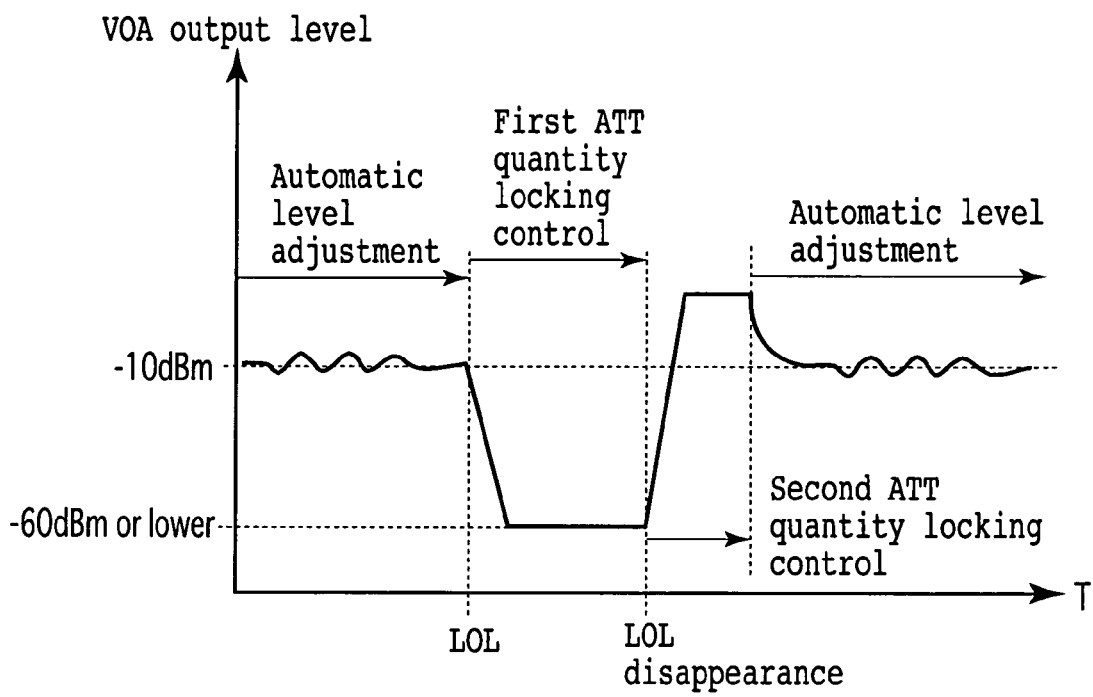
FIG. 74 is another diagram showing variations of the optical level of an optical signal output by a VOA employed in an add node.
Figure 75:
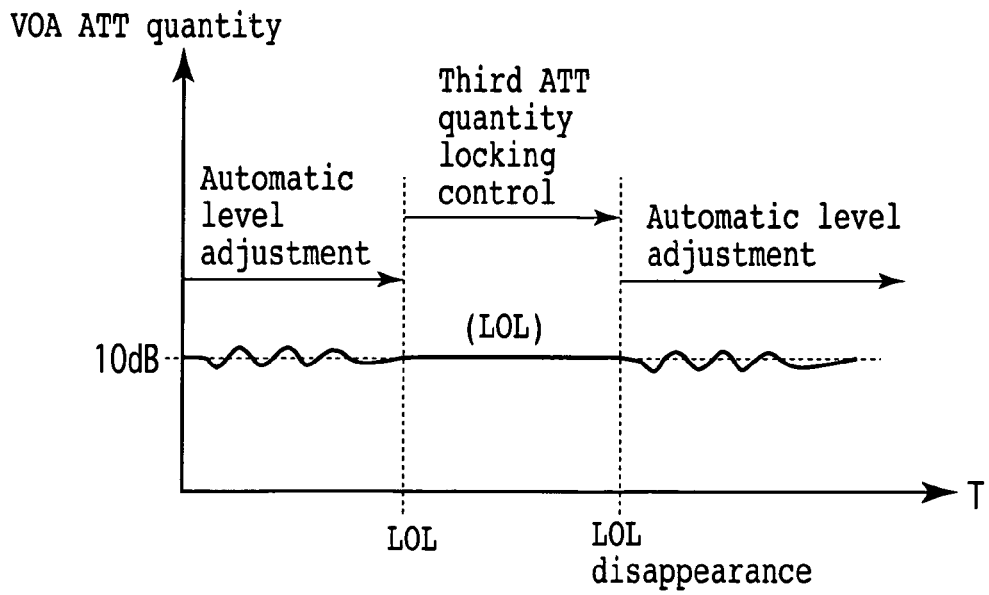
FIG. 75 is another diagram showing variations of an ATT quantity a VOA employed in a thru node.
Figure 76:
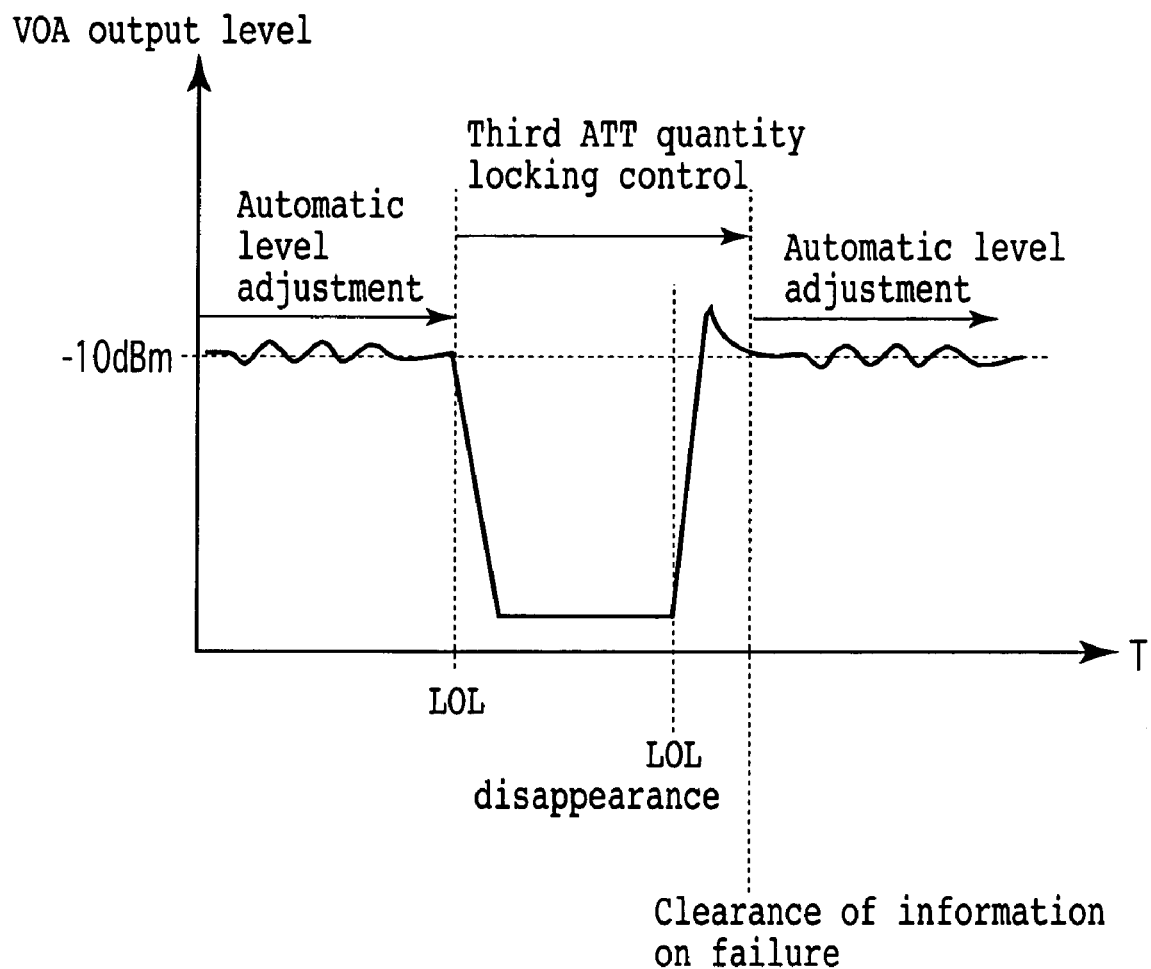
FIG. 76 is another diagram showing variations of the optical level of an optical signal output by a VOA employed in a thru node.

FIG. 73 is another diagram showing variations of an ATT quantity of the variable optical attenuator VOA 14#*ij* employed in an add node implemented by the eleventh embodiment as variations with the lapse of time. FIG. 74 is another diagram showing variations of the optical level of an optical signal output by the variable optical attenuator VOA 14#*ij* employed in an add node implemented by the eleventh embodiment as variations with the lapse of time. FIG. 75 is a diagram showing variations of an ATT quantity of the variable optical attenuator VOA 14#*ij* employed in a thru node adopting the flowchart shown in FIG. 68 in accordance with the eleventh embodiment as variations with the lapse of time. FIG. 76 is a diagram showing variations of the optical level of an optical signal output by the variable optical attenuator VOA 14#*ij* employed in a thru node adopting the flowchart shown in FIG. 68 in accordance with the eleventh embodiment variations with the lapse of time. The time charts shown in FIGS. 73 and 74 for an add node are identical with those shown in FIGS. 69 and 70 respectively. By the same token, the time charts shown in FIGS. 75 and 76 for a thru node are identical with those shown in FIGS. 71 and 72 respectively except that the timeout trigger shown in FIGS. 71 and 72 is replaced with detection of information revealing that the LOL failure has been corrected.

In accordance with the embodiment described above, the ATT quantity of the variable optical attenuator VOA 14#*ij* is fixed right after occurrence of an LOL failure. Thus, the optical level of an optical signal output by the variable optical attenuator VOA 14#*ij* can be converged to a target output in a short period of time without regard to whether the resumption of the automatic control for the normal state is triggered by a timeout revealed by a timer or triggered by disappearance of the LOL failure before or after the timeout.

Twelfth Embodiment

Figure 77:
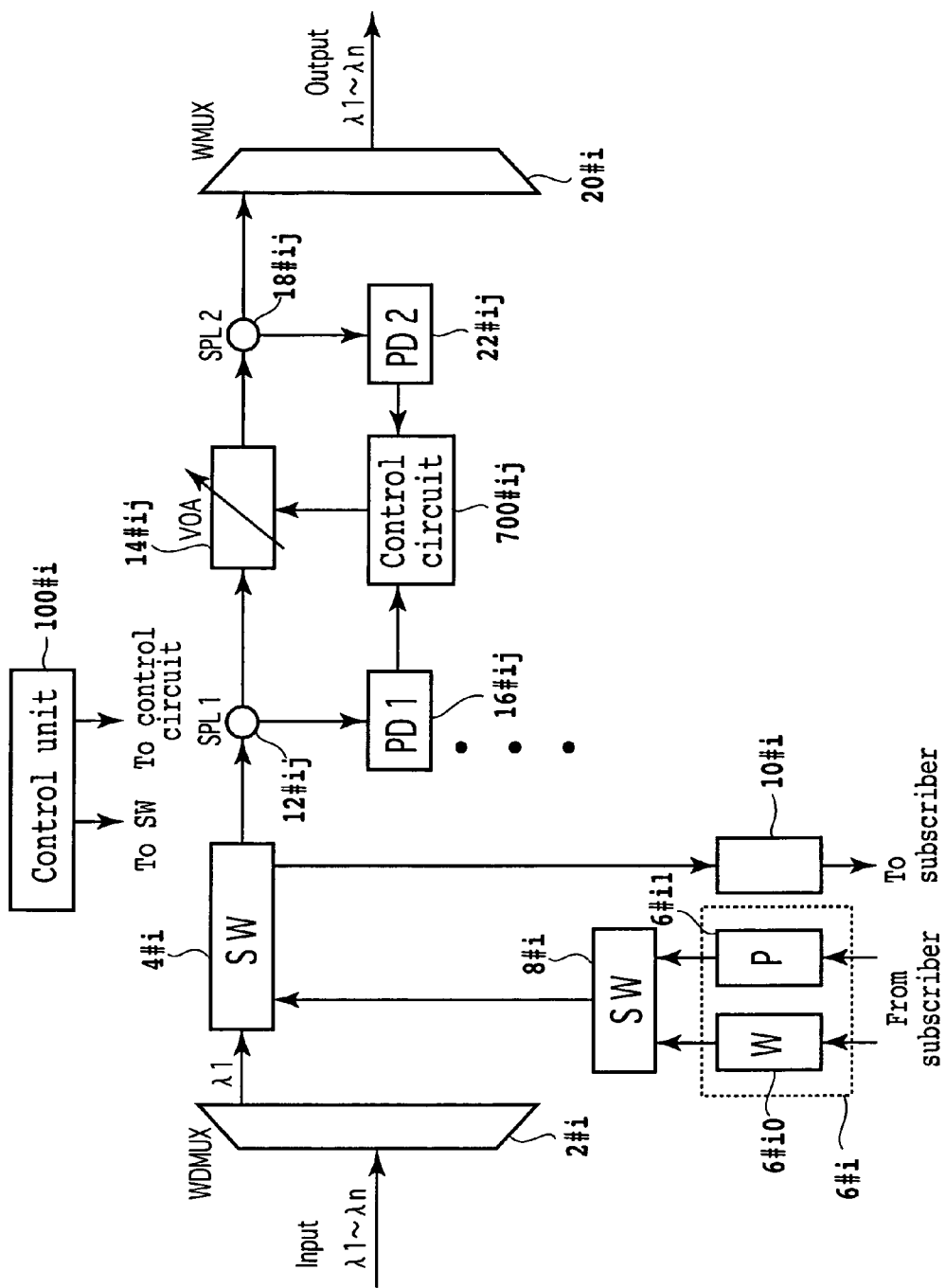
FIG. 77 is a diagram showing the configuration of a node implemented by a twelfth embodiment of the present invention.
Figure 78:
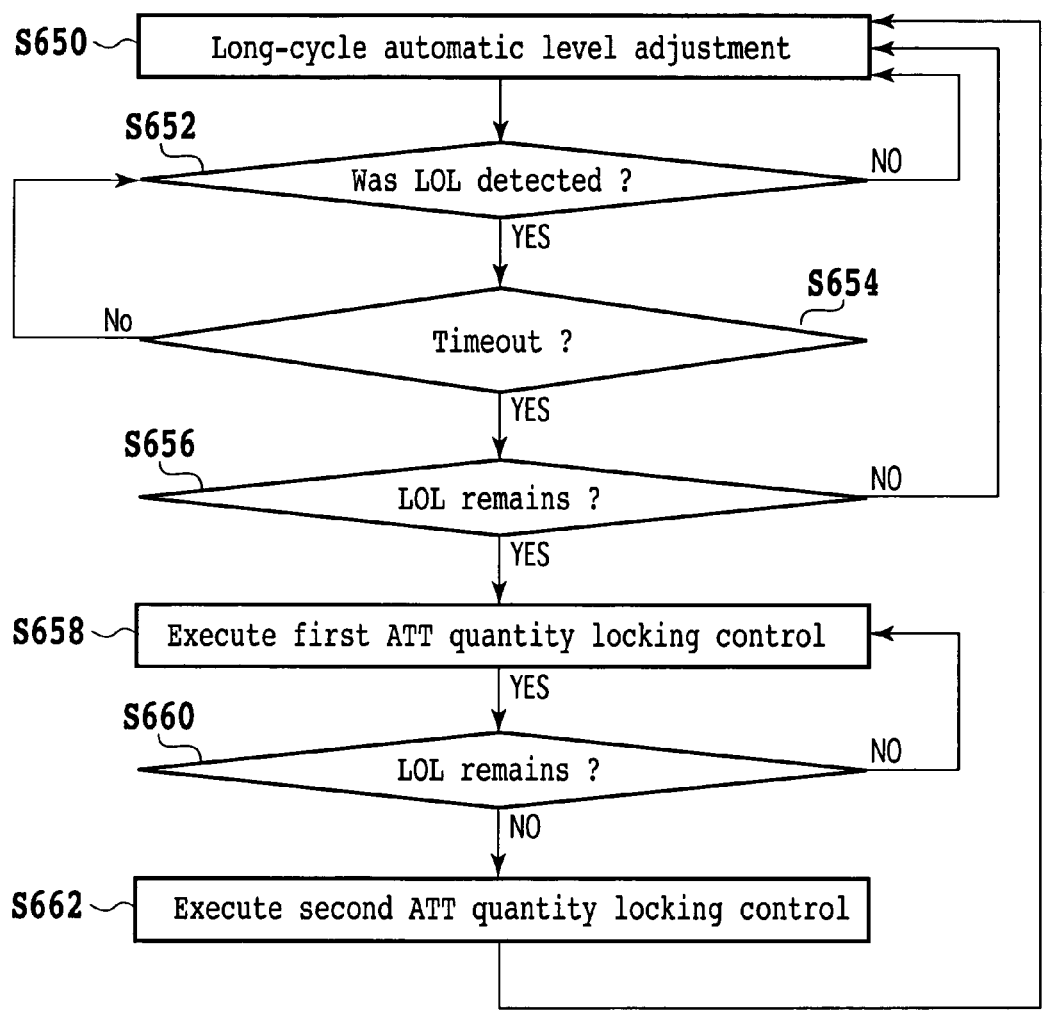
FIG. 78 shows a flowchart representing operations carried out by a control circuit employed in an add node.

FIG. 77 is a diagram showing the configuration of a node implemented by a twelfth embodiment of the present invention. In this figure, components virtually identical with their counterparts shown in FIG. 24 are denoted by the same reference numerals as the counterparts. FIG. 78 shows a flowchart representing operations carried out by the control circuit 700#*ij* employed in an add node implemented by the twelfth embodiment. As shown in the figure, the flowchart begins with a step S650. At this step, in a normal state, the control circuit 700#*ij* carries out automatic adjustment of the optical level of the optical signal in a long cycle in the so-called long-cycle automatic level adjustment. Then, at the next step S652, the control circuit 700#*ij* determines whether or not an LOL failure has been detected. If an LOL failure has not been detected, the flow of the processing goes back to the step S650 at which the control circuit 700#*ij* continues the long-cycle automatic level adjustment. If an LOL failure has been detected, on the other hand, a timer is activated at a point of time the LOL failure is detected provided that the timer has not been activated but, if the timer has been activated, the flow of the processing goes on to a step S654 right away. At the step S654, the control circuit 700#*ij* determines whether or not the timer reveals that a timeout has occurred. If the timer reveals that a timeout has not occurred, the processing goes back to the step S652. That is to say, if the determination result produced at the step S652 reveals that the LOL failure has been corrected as revealed by the determination result of the step S652 this time, the flow of the processing again goes back to the step S650 at which the control circuit 700#*ij* continues the long-cycle automatic level adjustment even prior to the occurrence of a timeout. If the timer reveals that a timeout has occurred as revealed by the determination result of the step S654, on the other hand, the processing goes on to a step S656.

At the step S656, the control circuit 700#*ij* determines whether or not the LOL failure remains uncorrected. If the LOL failure has been corrected, the flow of the processing goes back to the step S650 at which the control circuit 700#*ij* continues the long-cycle automatic level adjustment. That is to say, if the LOL failure has been corrected at a point of time the timeout occurs, the control circuit 700#*ij* resumes the long-cycle automatic level adjustment. If the LOL failure has been corrected at a point of time the timeout occurs, on the other hand, the flow of the processing goes on to a step S658.

At the step S658, the control circuit 700#*ij* controls the variable optical attenuator VOA 14#*ij* at a locked ATT quantity in the so-called second ATT quantity locking control. That is to say, if the LOL failure has not been corrected at a point of time the timeout occurs, the control circuit 700#*ij* executes the first ATT quantity locking control. Then, at the next step S660, the control circuit 700#*ij* determines whether or not the LOL failure remains uncorrected. If the LOL failure has not been corrected, the flow of the processing goes back to the step S658 at which the control circuit 700#*ij* continues the first ATT quantity locking control. That is to say, the control circuit 700#*ij* executes the first ATT quantity locking control till the LOL failure is corrected. If the LOL failure has been corrected, on the other hand, the flow of the processing goes on to a step S662. At the step S662, the control circuit 700#*ij* controls the variable optical attenuator VOA 14#*ij* at a locked ATT quantity in the so-called second ATT quantity locking control on a temporary basis. Then, the flow of the processing goes back to the step S650 at which the control circuit 700#*ij* resumes the long-cycle automatic level adjustment.

Figure 79:
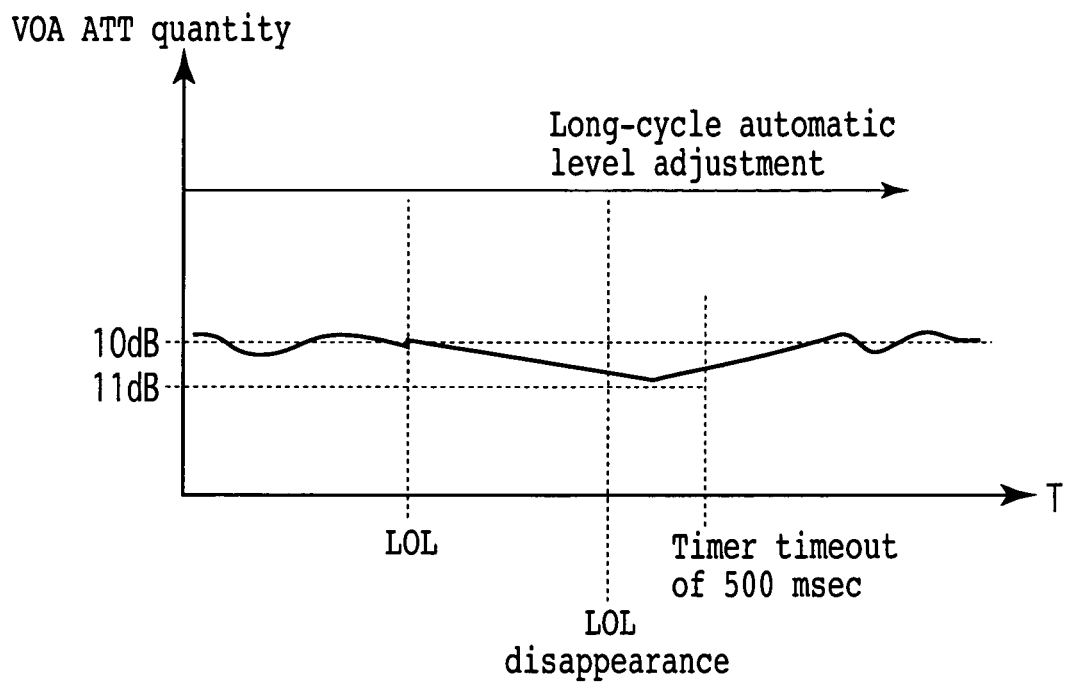
FIG. 79 is a diagram showing variations of an ATT quantity of a VOA employed in an add node.
Figure 80:
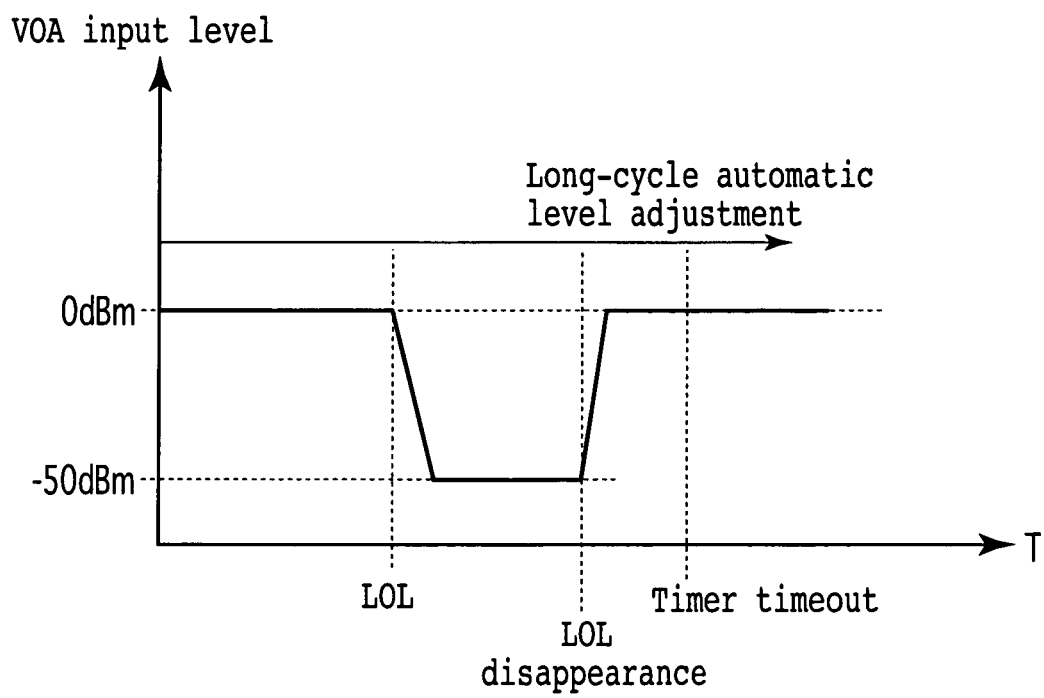
FIG. 80 is a diagram showing variations of the optical level of an optical signal input to a VOA employed in an add node.
Figure 81:
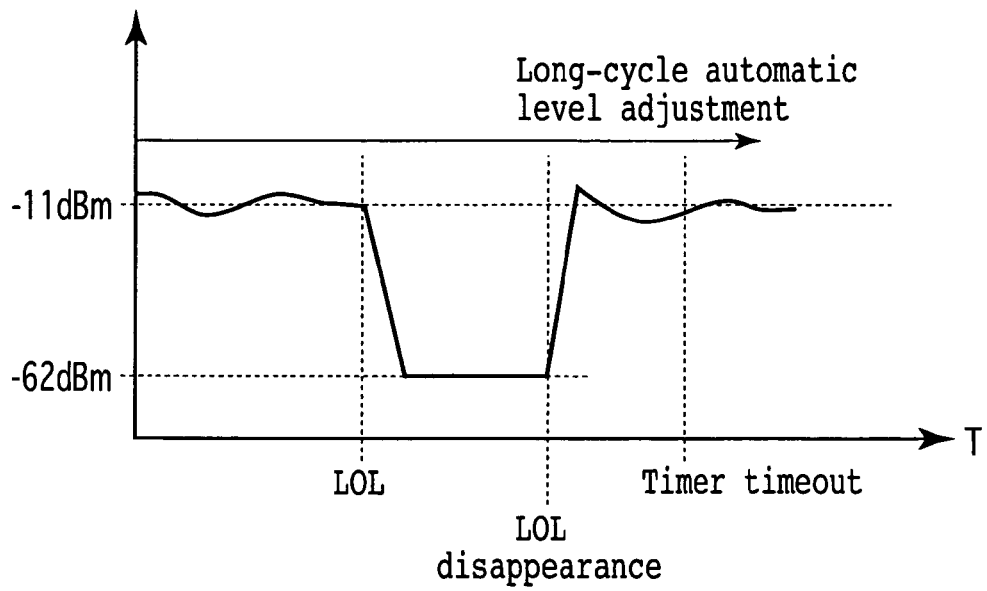
FIG. 81 is a diagram showing variations of the optical level of an optical signal output by a VOA employed in an add node.

FIG. 79 is a diagram showing variations of the ATT quantity of the variable optical attenuator VOA 14#*ij* employed in an add node implemented by the twelfth embodiment as variations with the lapse of time. FIG. 80 is a diagram showing variations of the optical level of an optical signal input to the variable optical attenuator VOA 14#*ij* employed in an add node implemented by the twelfth embodiment as variations with the lapse of time. FIG. 81 is a diagram showing variations of the optical level of an optical signal output by the variable optical attenuator VOA 14#*ij* employed in an add node implemented by the twelfth embodiment as variations with the lapse of time. Normally, the ATT quantity of the variable optical attenuator 14#*ij* is controlled to a value of about 10 dB. In the variations shown in these figures, the timer for measuring a timeout with a length of 500 msec is activated when an LOL failure is detected. In this case, the LOL failure is corrected after a period of 400 msec has lapsed since the activation of the timer. Thus, the LOL failure is corrected before a timeout occurs. During the period of 400 msec, the ATT quantity of the variable optical attenuator VOA 14#*ij* is shifted by about 1 dB from the level for the long-cycle automatic level adjustment. However, since the shift occurs before the period of 500 msec lapses, the control circuit 700#*ij* continues the long-cycle automatic level adjustment without executing the first ATT quantity locking control.

Figure 82:
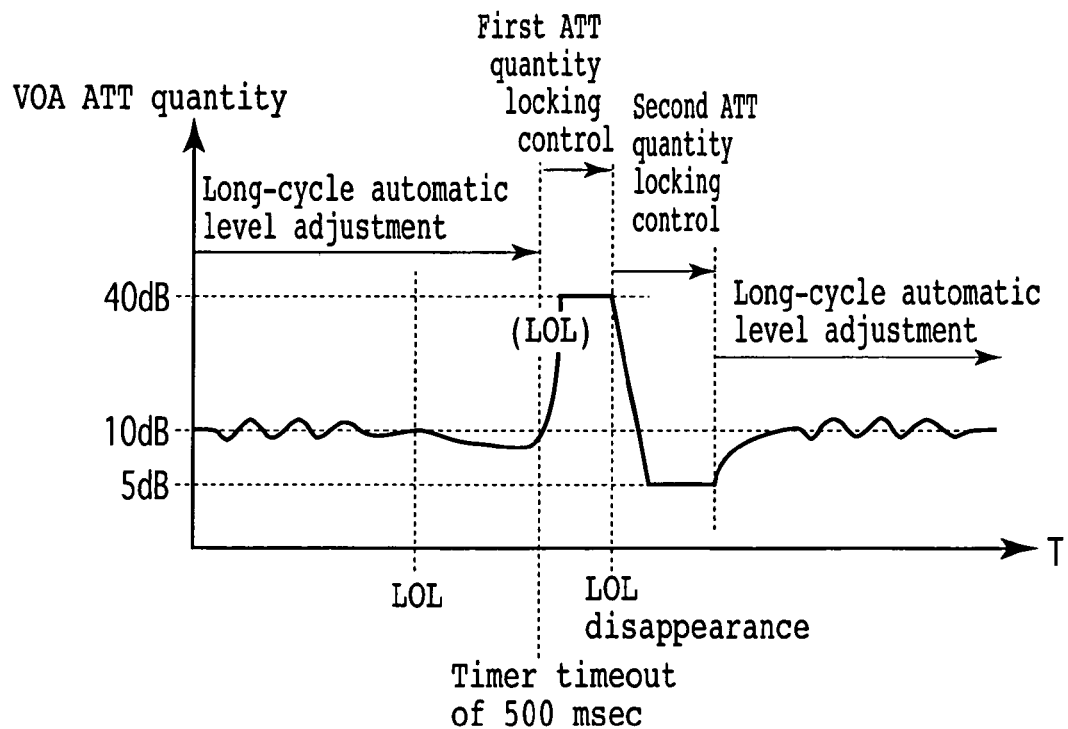
FIG. 82 is a diagram showing variations of an ATT quantity of a VOA employed in an add node.
Figure 83:
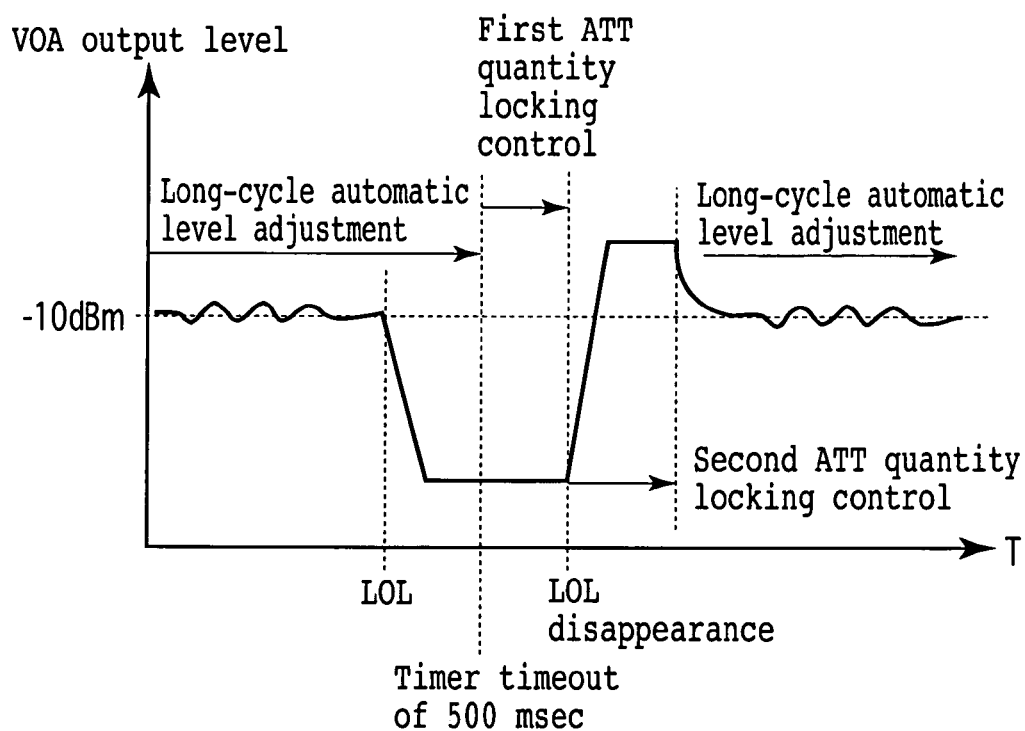
FIG. 83 is a diagram showing variations of the optical level of an optical signal output by a VOA employed in an add node.

FIG. 82 is a diagram showing variations of the ATT quantity of the variable optical attenuator VOA 14#*ij* employed in an add node implemented by the twelfth embodiment as variations with the lapse of time. FIG. 83 is a diagram showing variations of the optical level of an optical signal output by the variable optical attenuator VOA 14#*ij* employed in an add node implemented by the twelfth embodiment as variations with the lapse of time. In the case of the variations shown in FIGS. 82 and 83, however, the LOL failure remains unresolved even after a timeout occurs at the end of the timeout period of 500 msec. In this case, at a point of time the timeout occurs, the control circuit 700#*ij* controls the variable optical attenuator VOA 14#*ij* at a locked ATT quantity of 40 dB in the first ATT quantity locking control. The control circuit 700#*ij* continues the first ATT quantity locking control till the LOL failure is corrected. In this way, since the ATT quantity of the variable optical attenuator VOA 14#*ij* is maintained at a constant value, the quantity can be prevented from becoming equal to zero even for a case in which the LOL failure state continues for a long period of time starting from the detection of the LOL failure and ending at disappearance of the failure, that is, even for a case in which it is normally impossible to predict when the LOL failure will be corrected. That is to say, the ATT quantity of the variable optical attenuator VOA 14#*ij* is maintained at a constant value as long as the ATT failure remains unresolved. As the LOL failure is corrected, the control circuit 700#*ij* controls the variable optical attenuator VOA 14#*ij* at a locked ATT quantity of 5 dB in the second ATT quantity locking control on a temporary basis. After that, the control circuit 700#*ij* resumes the long-cycle automatic level adjustment.

In the case of a thru node, on the other hand, the long-cycle automatic level adjustment for the normal state is maintained at all times.

In accordance with the embodiment described above, in an add node, even in the event of an LOL failure, the long-cycle automatic level adjustment is continued till a timeout occurs. Thus, in addition to the effect exhibited by the sixth embodiment, since constant level control is executed after a timeout occurs, at a point of time an LOL failure is resolved in the add node, the node is capable of blocking an optical beam with the ATT quantity of the variable optical attenuator VOA 14#*ij* prevented from becoming equal to zero even if the LOL failure state continues for a long period of time starting for some reasons.

Thirteenth Embodiment

Figure 84:
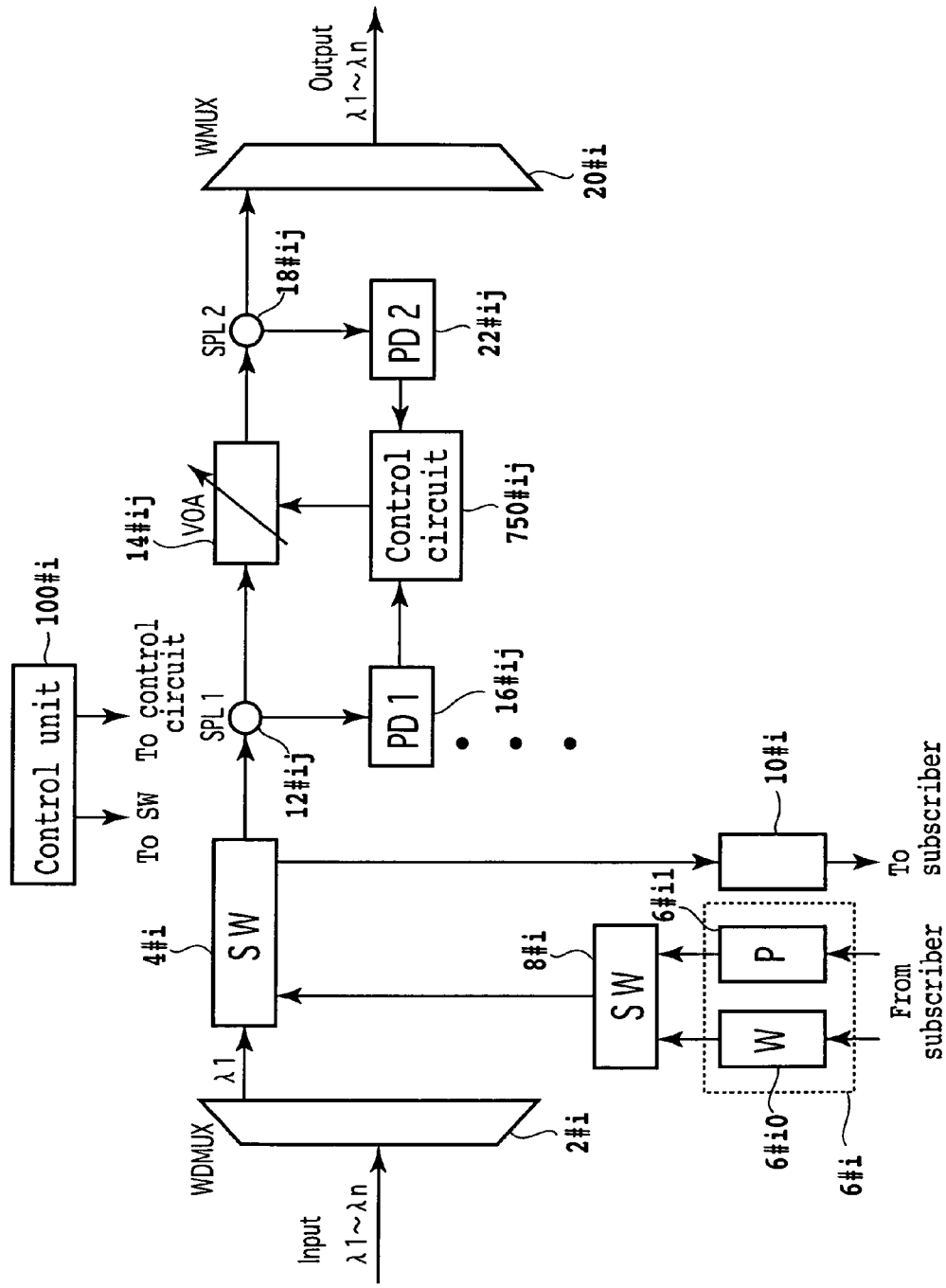
FIG. 84 is a diagram showing the configuration of a node implemented by a thirteenth embodiment of the present invention.
Figure 85:
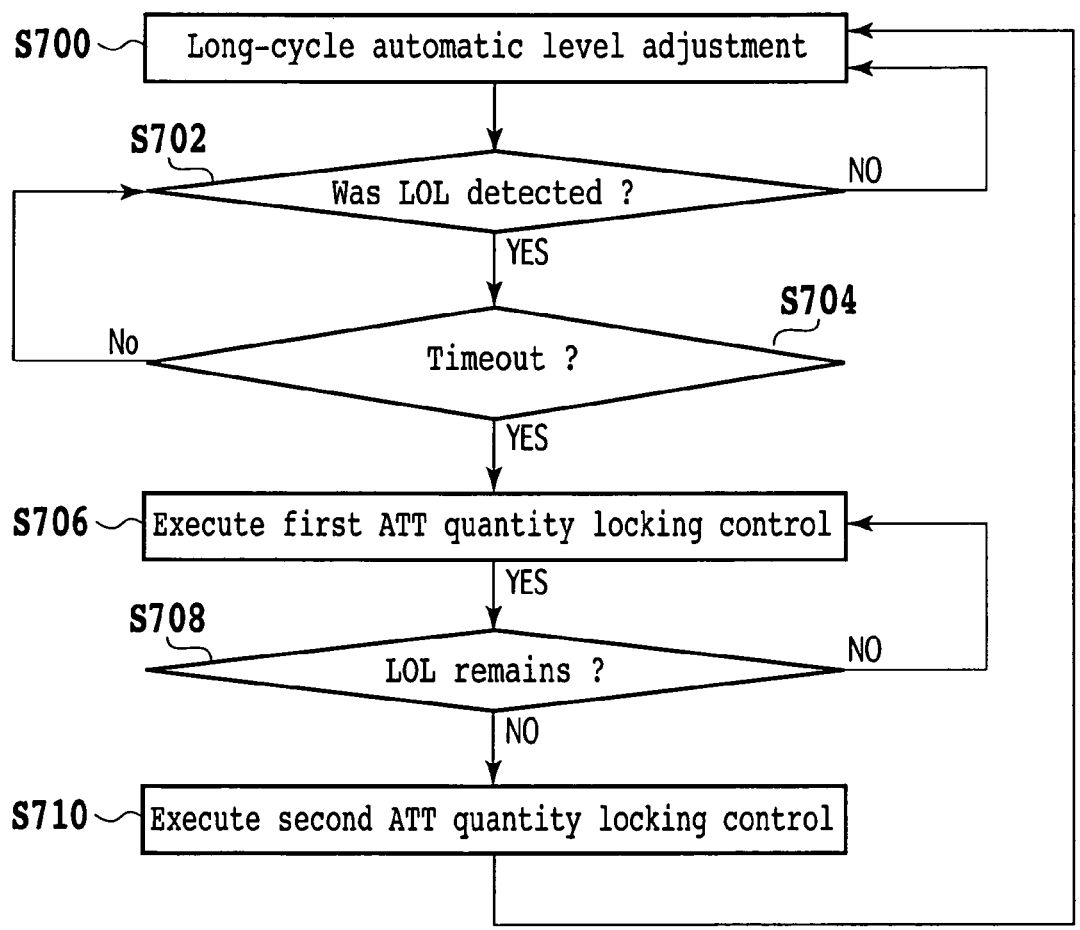
FIG. 85 shows a flowchart representing operations carried out by a control circuit employed in an add or thru node.

FIG. 84 is a diagram showing the configuration of a node implemented by a thirteenth embodiment of the present invention. In this figure, components virtually identical with their counterparts shown in FIG. 24 are denoted by the same reference numerals as the counterparts. FIG. 85 shows a flowchart representing operations carried out by the control circuit 750#*ij* employed in an add or thru node implemented by the thirteenth embodiment. Steps S700 to S704 of the flowchart shown in FIG. 85 are identical with respectively the steps S650 to S654 of the flowchart shown in FIG. 78. At the step S706, the control circuit 750#*ij* controls the variable optical attenuator VOA 14#*ij* at a locked ATT quantity in the so-called first ATT quantity locking control. That is to say, the control circuit 750#*ij* executes the first ATT quantity locking control when a timeout occurs without regard to whether or not the LOL failure has been resolved. Subsequent steps S708 and S710 of the flowchart shown in FIG. 85 are identical with respectively the steps S660 and S662 of the flowchart shown in FIG. 78.

If the LOL failure is resolved before a timeout occurs, waveforms representing variations of the ATT quantity of the variable optical attenuator VOA 14#*ij*, variations of the optical level of an optical signal input to the variable optical attenuator VOA 14#*ij* and variations of the optical level of an optical signal output by the variable optical attenuator VOA 14#*ij* as variations with the lapse of time in the add or thru node implemented by the thirteenth embodiment are identical with those shown in FIGS. 79 to 81 respectively. If the LOL failure is resolved after a timeout occurs, on the other hand, waveforms representing variations of the ATT quantity of the variable optical attenuator VOA 14#*ij* and variations of the optical level of an optical signal output by the variable optical attenuator VOA 14#*ij* as variations with the lapse of time are identical with those shown in FIGS. 82 and 83 respectively. In the diagram of FIG. 79, in the case of this embodiment, the control circuit 750#*ij* actually executes the first ATT quantity locking control when a timeout occurs after a period of 500 msec lapses since the detection of an LOL failure as indicated by a trigger from a timer. In this way, in all nodes, as a period of time lapses since detection of an LOL failure, the control circuit 750#*ij* executes the first ATT quantity locking control till the LOL failure is resolved. Then, the control circuit 750#*ij* controls the variable optical attenuator VOA 14#*ij* at a locked ATT quantity in the second ATT quantity locking control on a temporary basis. Finally, the control circuit 700#*ij* resumes the long-cycle automatic level adjustment.

As described above, for all nodes, the thirteenth embodiment demonstrates the same effect as the twelfth embodiment.

Fourteenth Embodiment

FIG. 86 shows a flowchart representing operations carried out by the control circuit 700#*ij* employed in an add node implemented by a fourteenth embodiment. The flowchart is obtained by modifying the flowchart shown in FIG. 66. To put it in detail, processing carried out at steps S750 to S758 of the flowchart shown in FIG. 86 is identical with processing carried out at respectively steps S500 to S508 of the flowchart shown in FIG. 66. In the case of the step S756, however, at a point of time the disappearance of an LOL failure is detected, a timer is activated.

Then, at the next step S758, the control circuit executes the second ATT quantity locking control, which applies a second locked ATT quantity of the variable optical attenuator VOA 14#*ij*, not on a temporary basis, but till the timer reveals a timeout prior to a transition to the automatic level adjustment. That is to say, at a step S760, the control circuit examines to determine whether or not a timeout has occurred. If a timeout has not occurred, the flow of the processing goes back to the step S758 at which the second ATT quantity locking control is continued. If a timeout has occurred, on the other hand, the flow of the processing goes back to the step S750 at which the automatic level adjustment is resumed. That is to say, the second ATT quantity locking control is executed for a predetermined period of time measured by the timer before the transition to the automatic level adjustment. Thus, the second ATT quantity locking control can be executed continuously for an optimum period of time.

It is to be noted that, in the case of a thru node, operations are carried out in the event of an LOL failure and carried out upon disappearance of the LOL failure in the same way as, for example, the eleventh embodiment.

In accordance with the embodiment described above, in addition to the effect exhibited by the eleventh embodiment, the second ATT quantity locking control can be executed continuously for an optimum period of time so that the optical level of an optical signal output by the variable optical attenuator VOA 14#*ij* can be converged to a target level within a short period lapsing since the disappearance of an LOL failure.

In addition, in accordance with the embodiment described above, it is possible to reduce the length of time it takes to restore the optical level of an optical signal output by the variable optical attenuator VOA 14#*ij* to the original normal level and possible to prevent the ATT quantity of the variable optical attenuator VOA 14#*ij* from becoming smaller than a predetermined value at a point of time an LOL failure is resolved. Thus, the optical level of an optical signal output by the variable optical attenuator VOA 14#*ij* never rises excessively at the point of time an LOL failure is resolved.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical-level control method, comprising:
   demultiplexing a wavelength division multiplexed signal into optical signals corresponding to each wavelength of the wavelength division multiplexed signal, and supplying each optical signal to a respective variable optical attenuator of a plurality of variable optical attenuators, corresponding to the wavelength of the optical signal, the respective variable optical attenuator outputting an output optical signal having an optical level of a constant value;
   detecting a loss of light of an optical signal when an optical level of said optical signal directly input to said respective variable optical attenuator for the wavelength corresponding to the wavelength of the optical signal, is lower than a predetermined threshold;
   setting an attenuation quantity of said variable optical attenuator for the wavelength for which said loss of light has been detected, at a fixed value determined in advance, when said loss of light is detected; and
   controlling said variable optical attenuator for the wavelength for which said loss of light has been detected, to return to said constant value of the optical level of the output optical signal, after a predetermined period of time has lapsed.

2. An optical-level control method, comprising:
   demultiplexing a wavelength division multiplexed signal into optical signals corresponding to each wavelength of the wavelength division multiplexed signal, and supplying each optical signal to a respective variable optical attenuator of a plurality of optical attenuators, corresponding to the wavelength of the optical signal, the respective variable optical attenuator outputting an output optical signal having an optical level of a constant value;
   detecting a loss of light of an optical signal when an optical level of said optical signal directly input to a variable optical attenuator is lower than a predetermined threshold;
   setting an attenuation quantity of said variable optical attenuator for the wavelength for which said loss of light has been detected, at a fixed value determined in advance, when said loss of light is detected; and
   controlling said variable optical attenuator for the wavelength for which said loss of light has been detected, to return to said constant value when a predetermined trigger occurs.

3. An optical-level control method, comprising:
   demultiplexing a wavelength division multiplexed signal into optical signals corresponding to each wavelength of the wavelength division multiplexed signal, and supplying each optical signal to a respective variable optical attenuator corresponding to the wavelength of the optical signal, the respective variable optical attenuator outputting an output optical signal having an optical level of a constant value;
   detecting a loss of light of an optical signal for any wavelength, when an optical level of said optical signal directly input to a variable optical attenuator for a wavelength of said wavelengths is lower than a predetermined threshold; and
   maintaining said attenuation quantity applied by said variable optical attenuator for the wavelength at which said loss of light has been detected at an attenuation quantity before said loss of light is detected and controlled.

4. A method of adjusting optical level of an individual wavelength component of a wavelength division multiplexed optical signal, comprising:

demultiplexing a wavelength division multiplexed signal into optical signals corresponding to each wavelength of the wavelength division multiplexed signal, and supplying each optical signal to a respective variable optical attenuator of a plurality of variable optical attenuators, corresponding to the wavelength of the optical signal, the respective variable optical attenuator maintaining a level of an output optical signal having a constant value;

setting an attenuation of a variable optical attenuator at a reference value when a level of an optical signal directly input to the variable optical attenuator, is lower than a predetermined value; and returning to adjusting the attenuation of said variable optical attenuator for the wavelength component in a feedback loop for maintaining the level of the output optical signal to the constant value, after a predetermined time elapses or after a predetermined trigger occurs.

5. A method of adjusting attenuation of variable optical attenuators, comprising:

demultiplexing an wavelength division multiplexed optical signal into individual wavelength components and inputting each individual wavelength component to a variable optical attenuator which maintains a constant power output;

setting attenuation of a variable optical attenuator, at a reference value, when power of the individual wavelength component directly input to said variable optical attenuator, is lower than a predetermined value; and returning said variable optical attenuator to maintaining the constant power output for the individual wavelength component, after a predetermined time elapses or after a predetermined trigger event occurs.

* * * * *

UNITED STATES PATENT AND TRADEMARK OFFICE
CERTIFICATE OF CORRECTION

PATENT NO. : 7,466,478 B2
APPLICATION NO. : 11/079426
DATED : December 16, 2008
INVENTOR(S) : Takuji Maeda et al.

It is certified that error appears in the above-identified patent and that said Letters Patent is hereby corrected as shown below:

Column 40, Line 5, change "an" to --a--.

Signed and Sealed this

Twenty-fourth Day of March, 2009

JOHN DOLL
*Acting Director of the United States Patent and Trademark Office*